(12) United States Patent
Spruce

(10) Patent No.: US 12,359,628 B2
(45) Date of Patent: Jul. 15, 2025

(54) HIGH POWER EPICYCLIC GEARBOX AND OPERATION THEREOF

(71) Applicant: ROLLS-ROYCE PLC, London (GB)

(72) Inventor: Mark Spruce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/829,971

(22) Filed: Sep. 10, 2024

(65) Prior Publication Data

US 2024/0426252 A1 Dec. 26, 2024

Related U.S. Application Data

(63) Continuation of application No. 18/131,493, filed on Apr. 6, 2023, now Pat. No. 12,116,938, which is a continuation of application No. 17/576,218, filed on Jan. 14, 2022, now Pat. No. 11,725,591, which is a continuation of application No. 17/066,713, filed on Oct. 9, 2020, now Pat. No. 11,268,452, which is a continuation of application No. 16/821,227, filed on Mar. 17, 2020, now Pat. No. 10,851,715.

(30) Foreign Application Priority Data

May 12, 2019 (GB) ..................... 1917773

(51) Int. Cl.
  *F02K 3/06* (2006.01)
  *F02C 7/36* (2006.01)

(52) U.S. Cl.
  CPC .................. *F02C 7/36* (2013.01); *F02K 3/06* (2013.01); *F05D 2200/14* (2013.01); *F05D 2220/323* (2013.01); *F05D 2220/36* (2013.01); *F05D 2260/40311* (2013.01)

(58) Field of Classification Search
  CPC .......... F02C 7/36; F02K 3/06; F05D 2200/14; F05D 2220/323; F05D 2220/36; F05D 2260/40311
  See application file for complete search history.

(56) References Cited

U.S. PATENT DOCUMENTS

| | | |
|---|---|---|
| 7,097,413 B2 | 8/2006 | VanDuyn |
| 7,728,477 B2 | 6/2010 | Birdi et al. |
| 7,791,235 B2 | 9/2010 | Kern et al. |

(Continued)

FOREIGN PATENT DOCUMENTS

| | | |
|---|---|---|
| CN | 104213985 A | 12/2014 |
| CN | 106661959 A | 5/2017 |

(Continued)

*Primary Examiner* — Elton K Wong
*Assistant Examiner* — Theodore C Ribadeneyra
(74) *Attorney, Agent, or Firm* — Oliff PLC

(57) ABSTRACT

A gas turbine engine for an aircraft including: an engine core including a turbine, a compressor, and a core shaft connecting the turbine to the compressor; a fan located upstream of the engine core, the fan including a plurality of fan blades; a gearbox that can receive an input from the core shaft, and can output drive to a fan shaft via an output of the gearbox so as to drive the fan at a lower rotational speed than the core shaft; and a fan shaft mounting structure arranged to mount the fan shaft within the engine, the fan shaft mounting structure including at least two supporting bearings connected to the fan shaft.

20 Claims, 13 Drawing Sheets

(56) References Cited

U.S. PATENT DOCUMENTS

| | | |
|---|---|---|
| 8,747,055 B2 | 6/2014 | McCune et al. |
| 8,911,203 B2 | 12/2014 | Reinhardt et al. |
| 10,190,496 B2 | 1/2019 | Schwarz et al. |
| 10,436,035 B1 | 10/2019 | Baralon et al. |
| 2009/0031732 A1 | 2/2009 | Wilson, Jr. et al. |
| 2010/0331139 A1 | 12/2010 | McCune |
| 2012/0257960 A1 | 10/2012 | Reinhardt et al. |
| 2013/0108440 A1 | 5/2013 | Do et al. |
| 2013/0331223 A1 | 12/2013 | McCune et al. |
| 2013/0336791 A1 | 12/2013 | McCune et al. |
| 2014/0060083 A1 | 3/2014 | Savela |
| 2014/0140819 A1 | 5/2014 | McCune et al. |
| 2014/0196472 A1* | 7/2014 | Kupratis ............... F02C 7/32 60/805 |
| 2014/0283500 A1 | 9/2014 | Sabnis |
| 2016/0160993 A1 | 6/2016 | Venter |
| 2016/0186604 A1 | 6/2016 | Ertas |
| 2016/0298751 A1 | 10/2016 | McCune |
| 2016/0369702 A1 | 12/2016 | Otto et al. |
| 2017/0096942 A1 | 4/2017 | Curlier et al. |
| 2017/0219080 A1 | 8/2017 | Niergarth et al. |
| 2017/0261096 A1 | 9/2017 | Bradley et al. |
| 2017/0298767 A1* | 10/2017 | Schwarz ............... F02C 7/36 |
| 2017/0342858 A1 | 11/2017 | McCune et al. |
| 2017/0343015 A1* | 11/2017 | Nolcheff ............. F04D 17/025 |
| 2017/0356388 A1 | 12/2017 | Sheridan |
| 2018/0016938 A1 | 1/2018 | Doorbar et al. |
| 2018/0171816 A1 | 6/2018 | Moniz et al. |
| 2018/0195601 A1 | 7/2018 | Hallman |
| 2018/0230902 A1* | 8/2018 | Desjardins ............. F02C 6/206 |
| 2018/0298822 A1 | 10/2018 | Ac et al. |
| 2018/0306308 A1 | 10/2018 | Uhkoetter et al. |
| 2018/0328286 A1 | 11/2018 | Nayak et al. |
| 2019/0153946 A1 | 5/2019 | Duffy et al. |
| 2019/0186598 A1 | 6/2019 | Fisher et al. |
| 2019/0257213 A1 | 8/2019 | Zilli |
| 2019/0292989 A1* | 9/2019 | Ingley .................... F01D 25/12 |
| 2019/0309688 A1 | 10/2019 | Stretton et al. |
| 2019/0316488 A1 | 10/2019 | Menczykalski et al. |
| 2020/0116081 A1 | 4/2020 | Levisse et al. |
| 2020/0116104 A1 | 4/2020 | Levisse et al. |
| 2020/0124002 A1 | 4/2020 | Uhkoetter et al. |
| 2020/0124139 A1 | 4/2020 | Harvey |
| 2020/0158226 A1 | 5/2020 | McCune et al. |
| 2020/0165978 A1 | 5/2020 | Saddawi |
| 2020/0166005 A1 | 5/2020 | Schreiber et al. |

FOREIGN PATENT DOCUMENTS

| | | |
|---|---|---|
| CN | 108131322 A | 6/2018 |
| CN | 110173351 A | 8/2019 |

\* cited by examiner

HIGH POWER EPICYCLIC GEARBOX AND OPERATION THEREOF

This is a Continuation of application Ser. No. 18/131,493, filed Apr. 6, 2023, which is a Continuation of application Ser. No. 17/576,218, filed Jan. 14, 2022, which is a Continuation of application Ser. No. 17/066,713 filed Oct. 9, 2020, which in turn is a Continuation of application Ser. No. 16/821,227 filed Mar. 17, 2020, which in turn claims the benefit of GB 1917773.2 filed Dec. 5, 2019. The disclosure of the prior applications is hereby incorporated by reference herein in its entirety.

The present disclosure relates to gas turbine engines, specifically gas turbine engines for aircraft. Aspects of the present disclosure relate to an aircraft comprising the gas turbine engine, and a method of operating the gas turbine engine.

Gas turbine engines for aircraft propulsion have many design factors that affect the overall efficiency and power output or thrust. A general aim for a gas turbine engine is to provide low specific fuel consumption (SFC). To enable a higher thrust at a high efficiency, a larger diameter fan may be used. In order to facilitate use of a larger fan size, a gearbox is provided having an output to a fan shaft via which the fan is driven. The gearbox receives drive from a core shaft connected to a turbine system of the engine core. The gearbox allows the fan to operate at a reduced rotational speed compared to if a direct drive were used.

When making an engine having a larger fan diameter however, simply scaling up components of a known engine type may not lead to an efficient design. For example, there may be problems associated with mounting the fan shaft within the engine. Consideration of the properties of components used to mount the fan shaft, the properties of the fan shaft itself, and the properties of the gearbox components are therefore required.

According to a first aspect there is provided a gas turbine engine for an aircraft comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

- a fan-gearbox axial distance is defined as the axial distance between the output of the gearbox and the fan axial centreline, the fan-gearbox axial distance being greater than or equal to 0.35 m;
- a system radial bending stiffness is defined as:

$$\cfrac{1}{\left(\cfrac{1}{\text{the radial bending stiffness of the fan shaft mounting structure}}\right) + \left(\cfrac{1}{\text{the radial bending stiffness of the fan shaft at the output of the gearbox}}\right)};$$

and a fan shaft mounting radial bending stiffness ratio of:

$$\cfrac{\text{the system radial bending stiffness}}{\text{the radial bending stiffness of the fan shaft mounting structure}}$$

is greater than or equal to $1.0 \times 10^{-3}$.

The fan shaft mounting radial bending stiffness ratio may be greater than or equal to $5.0 \times 10^{-3}$. The fan shaft mounting radial bending stiffness ratio may be greater than or equal to $2.0 \times 10^{-2}$. The fan shaft mounting radial bending stiffness ratio may be in the range from $1.0 \times 10^{-3}$ to $4.0 \times 10^{-1}$. The fan shaft mounting radial bending stiffness ratio may be in the range from $5.0 \times 10^{-3}$ to $1.5 \times 10^{-1}$. The fan shaft mounting radial bending stiffness ratio may be in the range from $5.0 \times 10^{-3}$ to $2.0 \times 10^{-2}$. The fan shaft mounting radial bending stiffness ratio may be in the range from $2.0 \times 10^{-2}$ to $1.5 \times 10^{-1}$.

The system radial bending stiffness may be greater than or equal to $3.90 \times 10^{6}$ N/m. The system radial bending stiffness may be greater than or equal to $3.6 \times 10^{7}$ N/m. The system radial bending stiffness may be in the range from $3.90 \times 10^{6}$ N/m to $1.40 \times 10^{9}$ N/m. The system radial bending stiffness may be in the range from $3.6 \times 10^{7}$ N/m to $6.8 \times 10^{8}$ N/m.

The radial bending stiffness of the fan shaft mounting structure may be greater than or equal to $7.00 \times 10^{8}$ N/m. The radial bending stiffness of the fan shaft mounting structure may be greater than or equal to $1.25 \times 10^{9}$ N/m. The radial bending stiffness of the fan shaft mounting structure may be in the range from $7.00 \times 10^{8}$ N/m to $6.00 \times 10^{11}$ N/m. The radial bending stiffness of the fan shaft mounting structure may be in the range from $1.25 \times 10^{9}$ N/m to $2.0 \times 10^{11}$ N/m.

The radial bending stiffness of the fan shaft at the output of the gearbox may be greater than or equal to $4.00 \times 10^{6}$ N/m. The radial bending stiffness of the fan shaft at the output of the gearbox may be greater than or equal to $3.7 \times 10^{7}$ N/m. The radial bending stiffness of the fan shaft at the output of the gearbox may be in the range from $4.00 \times 10^{6}$ N/m to $1.5 \times 10^{9}$ N/m. The radial bending stiffness of the fan shaft at the output of the gearbox may be in the range from $3.7 \times 10^{7}$ N/m to $1.0 \times 10^{9}$ N/m.

The product of the system radial bending stiffness and the radial bending stiffness of the fan shaft mounting structure may be greater than or equal to $2.7 \times 10^{15}$ (N/m)$^2$. The product of the system radial bending stiffness and the radial bending stiffness of the fan shaft mounting structure may be greater than or equal to $4.0 \times 10^{15}$ (N/m)$^2$. The product of the system radial bending stiffness and the radial bending stiffness of the fan shaft mounting structure may be in the range from $2.7 \times 10^{15}$ (N/m)$^2$ to $9.0 \times 10^{19}$ (N/m)$^2$. The product of the system radial bending stiffness and the radial bending stiffness of the fan shaft mounting structure may be in the range from $4.0 \times 10^{15}$ (N/m)$^2$ to $1.5 \times 10^{19}$ (N/m)$^2$.

A system tilt stiffness may be defined as:

$$\cfrac{1}{\left(\cfrac{1}{\text{the tilt stiffness of the fan shaft mounting structure}}\right) + \left(\cfrac{1}{\text{the tilt stiffness of the fan shaft at the output of the gearbox}}\right)};$$

and fan shaft mounting tilt stiffness ratio of:

$$\cfrac{\text{the system tilt stiffness}}{\text{the tilt stiffness of the fan shaft mounting structure}}$$

may be greater than or equal to $1.5 \times 10^{-3}$. The fan shaft mounting tilt stiffness ratio may be greater than or equal to $6.0\times10^{-3}$. The fan shaft mounting tilt stiffness ratio may be greater than or equal to $2.5\times10^{-2}$. The fan shaft mounting tilt stiffness ratio may be in the range from $1.5\times10^{-3}$ to $5.0\times10^{-1}$. The fan shaft mounting tilt stiffness ratio may be in the range from $6.0\times10^{-3}$ to $2.0\times10^{-1}$. The fan shaft mounting tilt stiffness ratio may be in the range from $6.0\times10^{-3}$ to $2.5\times10^{-2}$. The fan shaft mounting tilt stiffness ratio may be in the range from $2.5\times10^{-2}$ to $2.0\times10^{-1}$.

According to a second aspect there is provided a gas turbine engine for an aircraft comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system tilt stiffness is defined as:

$$\dfrac{1}{\left(\dfrac{1}{\text{the tilt stiffness of the fan shaft mounting structure}}\right) + \left(\dfrac{1}{\text{the tilt stiffness of the fan shaft at the output of the gearbox}}\right)};$$

and a fan shaft mounting tilt stiffness ratio of:

$$\dfrac{\text{the system tilt stiffness}}{\text{the tilt stiffness of the fan shaft mounting structure}}$$

is greater than or equal to $1.5\times10^{-3}$.

The fan shaft mounting tilt stiffness ratio may be greater than or equal to $6.0\times10^{-3}$. The fan shaft mounting tilt stiffness ratio may be greater than or equal to $2.5\times10^{-2}$. The fan shaft mounting tilt stiffness ratio may be in the range from $1.5\times10^{-3}$ to $5.0\times10^{-1}$. The fan shaft mounting tilt stiffness ratio may be in the range from $6.0\times10^{-3}$ to $2.0\times10^{-1}$. The fan shaft mounting tilt stiffness ratio may be in the range from $6.0\times10^{-3}$ to $2.5\times10^{-2}$. The fan shaft mounting tilt stiffness ratio may be in the range from $2.5\times10^{-2}$ to $2.0\times10^{-1}$.

The system tilt stiffness may be greater than or equal to $1.10\times10^5$ Nm/rad. The system tilt stiffness may be greater than or equal to $8.5\times10^5$ Nm/rad. The system tilt stiffness may be in the range from $1.10\times10^5$ Nm/rad to $6.80\times10^7$ Nm/rad. The system tilt stiffness may be in the range from $8.5\times10^5$ Nm/rad to $3.4\times10^7$ Nm/rad.

The tilt stiffness of the fan shaft mounting structure may be greater than or equal to $1.50\times10^7$ Nm/rad. The tilt stiffness of the fan shaft mounting structure may be greater than or equal to $2.1\times10^7$ Nm/rad. The tilt stiffness of the fan shaft mounting structure may be in the range from $1.5\times10^7$ Nm/rad to $2.70\times10^{10}$ Nm/rad. The tilt stiffness of the fan shaft mounting structure may be in the range from $2.1\times10^7$ Nm/rad to $1\times10^{10}$ Nm/rad.

The tilt stiffness of the fan shaft at the output of the gearbox may be greater than or equal to $7.00\times10^4$ Nm/rad. The tilt stiffness of the fan shaft at the output of the gearbox may be greater than or equal to $9.5\times10^5$ Nm/rad. The tilt stiffness of the fan shaft at the output of the gearbox may be in the range from $7.00\times10^4$ Nm/rad to $7.00\times10^7$ Nm/rad. The tilt stiffness of the fan shaft at the output of the gearbox may be in the range from $9.5\times10^5$ Nm/rad to $3.5\times10^7$ Nm/rad.

The product of the system tilt stiffness and the tilt stiffness of the fan shaft mounting structure may be greater than or equal to $1.7\times10^{12}$ (Nm/rad)$^2$. The product of the system tilt stiffness and the tilt stiffness of the fan shaft mounting structure may be greater than or equal to $1.6\times10^{13}$ (Nm/rad)$^2$. The product of the system tilt stiffness and the tilt stiffness of the fan shaft mounting structure may be in the range from $1.7\times10^{12}$ (Nm/rad)$^2$ to $3.0\times10^{17}$ (Nm/rad)$^2$. The product of the system tilt stiffness and the tilt stiffness of the fan shaft mounting structure may be in the range from $1.6\times10^{13}$ (Nm/rad)$^2$ to $3.0\times10^{16}$ (Nm/rad)$^2$.

One or more of the following features may apply to either or both of the first and second aspects above:

The fan shaft may be defined as the torque transfer component extending from the output of the gearbox to the input to the fan. The fan shaft may comprise at least part of a gearbox output shaft and at least part of a fan input shaft.

The input to the fan may be a fan input position defined as a point on the fan shaft at the axial midpoint of the interface between the fan and the fan shaft.

The output of the gearbox may be defined as the point of connection between the fan shaft and the gearbox. The gearbox may be in a star configuration and the output of the gearbox may be a gearbox output position defined as the point of connection between the ring gear and the fan shaft. Alternatively, the gearbox may be in a planetary configuration and the output of the gearbox may be a gearbox output position at the interface between the fan shaft and the planet carrier.

The at least two supporting bearings may comprise a first supporting bearing and second supporting bearing.

Both of the first and the second supporting bearings may be located at positions forward of the gearbox. Alternatively, the first supporting bearing may be located at a position forward of the gearbox and the second supporting bearing may be located at a position rearward of the gearbox.

The fan shaft mounting structure may further comprise a third supporting bearing. The third supporting bearing may be located between the fan and the gearbox. The fan shaft may comprise a gearbox output shaft forming a relatively flexible portion of the fan shaft, and the fan shaft mounting structure may comprises a gearbox output shaft support structure having at least one gearbox output shaft bearing arranged to support the gearbox output shaft. The fan shaft mounting structure may further comprise one or more non-supporting softly mounted bearings. Any one or more of the bearings provided as part of the fan shaft mounting structure may be double bearings.

The axial distance, $d_1$, between the input to the fan and the closest bearing of the at least two supporting bearings in a rearward direction from the fan may be greater than or equal to 0.12 m. The axial distance $d_1$ may be greater than or equal to 0.13 m. The axial distance $d_1$ may be in the range from 0.12 m to 0.40 m. The axial distance $d_1$ may be in the range from 0.13 m to 0.30 m.

The axial distance, $d_2$, between the output of the gearbox and the closest bearing of the at least two supporting bearings in a forward direction from the gearbox may be greater than or equal to 0.15 m. The axial distance $d_2$ may be greater than or equal to 0.16 m. The axial distance $d_2$ may be in the range from 0.15 m to 0.45 m. The axial distance $d_2$ may be in the range from 0.16 m to 0.40 m.

The fan-gearbox axial distance may be greater than or equal to 0.37 m. The fan-gearbox axial distance may be in the range from 0.35 m to 0.8 m. The fan-gearbox axial distance may be in the range from 0.37 m to 0.75 m.

The gearbox may be an epicyclic gearbox comprising a sun gear, a plurality of planet gears, a ring gear, and a planet carrier arranged to have the plurality of planet gears mounted thereon.

According to a third aspect there is provided a propulsor for an aircraft, comprising: a fan comprising a plurality of fan blades, the fan having a fan axial centreline; a gearbox; a power unit for driving the fan via the gearbox, wherein the gearbox is arranged to receive an input from the power unit via a core shaft and output drive to a fan shaft via an output of the gearbox so as to drive the fan at a lower rotational speed than the core shaft; and a fan shaft mounting structure arranged to mount the fan shaft within the propulsor, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system radial bending stiffness is defined as:

$$\cfrac{1}{\left(\cfrac{1}{\text{the radial bending stiffness of the fan shaft mounting structure}}\right) + \left(\cfrac{1}{\text{the radial bending stiffness of the fan shaft at the output of the gearbox}}\right)};$$

and a fan shaft mounting radial bending stiffness ratio of:

$$\cfrac{\text{the system radial bending stiffness}}{\text{the radial bending stiffness of the fan shaft mounting structure}}$$

is greater than or equal to $1.0 \times 10^{-3}$.

The propulsor of the third aspect may have some or all of the features described above with respect to the gas turbine engine of the first aspect, and may be a gas turbine engine in some embodiments.

According to a fourth aspect there is provided a propulsor for an aircraft, comprising: a fan comprising a plurality of fan blades, the fan having a fan axial centreline; a gearbox; a power unit for driving the fan via the gearbox, wherein the gearbox is arranged to receive an input from the power unit via the core shaft and output drive to a fan shaft via an output of the gearbox so as to drive the fan at a lower rotational speed than the core shaft; and a fan shaft mounting structure arranged to mount the fan shaft within the propulsor, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system tilt stiffness is defined as $$\cfrac{1}{\left(\cfrac{1}{\text{the tilt stiffness of the fan shaft mounting structure}}\right) + \left(\cfrac{1}{\text{the tilt stiffness of the fan shaft at the output of the gearbox}}\right)};$$

and a fan shaft mounting tilt stiffness ratio of:

$$\cfrac{\text{the system tilt stiffness}}{\text{the tilt stiffness of the fan shaft mounting structure}}$$

is greater than or equal to $1.5 \times 10^{-3}$.

The propulsor of the fourth aspect may have some or all of the features described above with respect to the gas turbine engine of the second aspect, and may be a gas turbine engine in some embodiments.

The third and fourth aspects may be combined. In such an aspect, there is provided a propulsor for an aircraft, comprising: a fan comprising a plurality of fan blades, the fan having a fan axial centreline; a gearbox; a power unit for driving the fan via the gearbox, wherein the gearbox is arranged to receive an input from the power unit via a core shaft and output drive to a fan shaft via an output of the gearbox so as to drive the fan at a lower rotational speed than the core shaft; and a fan shaft mounting structure arranged to mount the fan shaft within the propulsor, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system radial bending stiffness is defined as:

$$\cfrac{1}{\left(\cfrac{1}{\text{the radial bending stiffness of the fan shaft mounting structure}}\right) + \left(\cfrac{1}{\text{the radial bending stiffness of the fan shaft at the output of the gearbox}}\right)};$$

and a fan shaft mounting radial bending stiffness ratio of:

$$\cfrac{\text{the system radial bending stiffness}}{\text{the radial bending stiffness of the fan shaft mounting structure}}$$

is greater than or equal to $1.0 \times 10^{-3}$; and/or
a system tilt stiffness is defined as $$\frac{1}{\left(\frac{1}{\text{the tilt stiffness of the fan shaft mounting structure}}\right)+\left(\frac{1}{\text{the tilt stiffness of the fan shaft at the output of the gearbox}}\right)};$$

and a fan shaft mounting tilt stiffness ratio of:

$$\frac{\text{the system tilt stiffness}}{\text{the tilt stiffness of the fan shaft mounting structure}}$$

is greater than or equal to $1.5 \times 10^{-3}$. The propulsor of this aspect may have some or all of the features described above with respect to the gas turbine engine of the first and second aspect, and may be a gas turbine engine in some embodiments.

According to a fifth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system radial bending stiffness is defined as:

$$\frac{1}{\left(\frac{1}{\text{the radial bending stiffness of the fan shaft mounting structure}}\right)+\left(\frac{1}{\text{the radial bending stiffness of the fan shaft at the output of the gearbox}}\right)};$$

and a fan shaft mounting radial bending stiffness ratio of:

$$\frac{\text{the system radial bending stiffness}}{\text{the radial bending stiffness of the fan shaft mounting structure}}$$

is greater than or equal to $3.9 \times 10^6$. The method comprises operating the gas turbine engine to provide propulsion for the aircraft under cruise conditions.

The method of the fifth aspect may be a method of operating the gas turbine engine or the propulsor of the first aspect or third aspect respectively. Any of the features, ratios and parameters introduced above in connection with the first aspect or third aspect may also therefore apply to the fifth aspect.

According to a sixth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system tilt stiffness is defined as:

$$\frac{1}{\left(\frac{1}{\text{the tilt stiffness of the fan shaft mounting structure}}\right)+\left(\frac{1}{\text{the tilt stiffness of the fan shaft at the output of the gearbox}}\right)};$$

and a fan shaft mounting tilt stiffness ratio of:

$$\frac{\text{the system tilt stiffness}}{\text{the tilt stiffness of the fan shaft mounting structure}}$$

is greater than or equal to $1.5 \times 10^{-3}$. The method comprises operating the gas turbine engine to provide propulsion for the aircraft under cruise conditions.

The method of the sixth aspect may be a method of operating the gas turbine engine or the propulsor of the second aspect or fourth aspects respectively. Any of the features, ratios and parameters introduced above in connection with the second aspect or fourth aspect may also therefore apply to the sixth aspect.

The fifth and sixth aspects may be combined. Such an aspect may provide a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system radial bending stiffness is defined as:

$$\frac{1}{\left(\dfrac{1}{\text{the radial bending stiffness of the fan shaft mounting structure}}\right) + \left(\dfrac{1}{\text{the radial bending stiffness of the fan shaft at the output of the gearbox}}\right)};$$

and a fan shaft mounting radial bending stiffness ratio of:

$$\frac{\text{the system radial bending stiffness}}{\text{the radial bending stiffness of the fan shaft mounting structure}}$$

is greater than or equal to $3.9 \times 10^6$; and/or
a system tilt stiffness is defined as:

$$\frac{1}{\left(\dfrac{1}{\text{the tilt stiffness of the fan shaft mounting structure}}\right) + \left(\dfrac{1}{\text{the tilt stiffness of the fan shaft at the output of the gearbox}}\right)};$$

and a fan shaft mounting tilt stiffness ratio of:

$$\frac{\text{the system tilt stiffness}}{\text{the tilt stiffness of the fan shaft mounting structure}}$$

is greater than or equal to $1.5 \times 10^{-3}$. The method comprises operating the gas turbine engine to provide propulsion for the aircraft under cruise conditions. This aspect may be a method of operating the gas turbine or propulsor of any preceding aspect.

The inventor has discovered that designing the fan shaft and fan shaft mounting structure so that the fan shaft mounting radial bending/tilt stiffness ratio is within the specified range allows for improved isolation from loads transmitted from the fan while maintaining sufficient location of the fan within the engine. The inventor has found that if the stiffness of the fan shaft mounting structure is reduced so that the fan shaft mounting stiffness ratio is outside of the specified range the fan will not be adequately located within the engine, leading to problems with fan tip clearance control. For example, movement of the fan relative to its surrounding structure may lead to a higher fan tip clearance being required, which would reduce the overall efficiency of the engine. The inventor has also found that further increasing the stiffness of the fan shaft mounting structure so that the fan shaft mounting stiffness ratio is outside of the specified ranged there would be little or no practical benefit in terms of locating the fan, but would instead lead to undesirable increases in weight of the mounting structure. The inventor has found that increasing the stiffness of the fan shaft so that the fan shaft mounting stiffness ratio is outside of the specified limit would result in excessive loads being transmitted to the gearbox from the fan. While decreasing the fan shaft stiffness is therefore advantageous, the inventor has found that further reducing the stiffness of the fan shaft so that the fan shaft mounting stiffness ratio is outside of the range above would cause undesired low modal lateral vibrations in the fan shaft with excessive amplitude.

In other aspects, value ranges for the product of the components of the fan shaft mounting radial bending/tilt stiffness ratios may be specified instead of, or as well as, value ranges for the ratios.

According to one such aspect, the first aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system radial bending stiffness is defined as:

$$\frac{1}{\left(\dfrac{1}{\text{the radial bending stiffness of the fan shaft mounting structure}}\right) + \left(\dfrac{1}{\text{the radial bending stiffness of the fan shaft at the output of the gearbox}}\right)}$$

and the product of the system radial bending stiffness and the radial bending stiffness of the fan shaft mounting structure may be may be greater than or equal to $2.7 \times 10^{15}$ (N/m)$^2$, greater than or equal to $4.0 \times 10^{15}$ (N/m)$^2$, in the range from $2.7 \times 10^{15}$ (N/m)$^2$ to $9.0 \times 10^{19}$ (N/m)$^2$, or in the range from $4.0 \times 10^{15}$ (N/m)$^2$ to $1.5 \times 10^{19}$ (N/m)$^2$.

According to another such aspect, the second aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades, the fan having a fan axial centreline; a gearbox that receives an input from the core shaft and outputs drive to a fan shaft via an output of the gearbox so as to drive the fan at a lower rotational speed than the core shaft; and a fan shaft mounting structure arranged to mount the fan shaft within the engine, the fan shaft mounting structure comprising at least two supporting bearings connected to the fan shaft, and wherein:

a fan-gearbox axial distance is defined as the axial distance between the output of the gearbox and the fan axial centreline, the fan-gearbox axial distance being greater than or equal to 0.35 m;

a system tilt stiffness is defined as:

$$\frac{1}{\left(\dfrac{1}{\text{the radial bending stiffness of the fan shaft mounting structure}}\right) + \left(\dfrac{1}{\text{the radial bending stiffness of the fan shaft at the output of the gearbox}}\right)};$$

and the product of the system tilt stiffness and the tilt stiffness of the fan shaft mounting structure may be greater than or equal to $1.7 \times 10^{12}$ (Nm/rad)$^2$, greater than or equal to $1.6 \times 10^{13}$ (Nm/rad)$^2$, in the range from $1.7 \times 10^{12}$ (Nm/rad)$^2$ to $3.0 \times 10^{17}$ (Nm/rad)$^2$, or in the range from $1.6 \times 10^{13}$ (Nm/rad)$^2$ to $3.0 \times 10^{16}$ (Nm/rad)$^2$ The skilled person would appreciate that method and propulsor aspects may be formulated accordingly.

According to a seventh aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, and wherein:

a fan-gearbox axial distance is defined as the axial distance between the output of the gearbox and the axial centreline of the fan, the fan-gearbox axial distance being greater than or equal to 0.35 m, and a fan shaft radial bending stiffness ratio of:

$$\frac{\text{the radial bending stiffness of the fan shaft at the input to the fan}}{\text{the radial bending stiffness of the fan shaft at the output of the gearbox}}$$

is greater than or equal to $6.0 \times 10^{-3}$.

The fan shaft radial bending stiffness ratio may be greater than or equal to 0.015. The fan shaft radial bending stiffness ratio may be in the range from $6.0 \times 10^{-3}$ to $2.5 \times 10^{1}$. The fan shaft radial bending stiffness ratio may be in the range from 0.015 to 2.5.

The radial bending stiffness of the fan shaft at the input to the fan may be greater than or equal to $3.00 \times 10^{6}$ N/m. The radial bending stiffness of the fan shaft at the input to the fan may be greater than or equal to $6.3 \times 10^{6}$ N/m. The radial bending stiffness of the fan shaft at the input to the fan may be in the range from $3.00 \times 10^{6}$ N/m to $2.00 \times 10^{9}$ N/m. The radial bending stiffness of the fan shaft at the input to the fan may be in the range from $6.3 \times 10^{6}$ N/m to $1.0 \times 10^{9}$ N/m.

The radial bending stiffness of the fan shaft at the output of the gearbox may be greater than or equal to $4.00 \times 10^{6}$ N/m. The radial bending stiffness of the fan shaft at the output of the gearbox may be greater than or equal to $3.7 \times 10^{7}$ N/m. The radial bending stiffness of the fan shaft at the output of the gearbox may be in the range from $4.00 \times 10^{6}$ N/m to $1.5 \times 10^{9}$ N/m. The radial bending stiffness of the fan shaft at the output of the gearbox may be in the range from $3.7 \times 10^{7}$ N/m to $1.0 \times 10^{9}$ N/m.

The diameter of the fan may be in the range from 240 cm to 280 cm. In such an embodiment, the fan shaft radial bending stiffness ratio may be greater than or equal to 0.03, or in the range from 0.03 to 0.85.

The diameter of the fan may be in the range from 330 cm to 380 cm. In such an embodiment, the fan shaft radial bending stiffness ratio may be greater than or equal to 0.02 or in the range from 0.02 to 1.5.

A fan shaft tilt stiffness ratio of:

$$\frac{\text{the tilt stiffness of the fan shaft at the input to the fan}}{\text{the tilt stiffness of the fan shaft at the output of the gearbox}}$$

may be greater than or equal to $2.5 \times 10^{-2}$.

The fan shaft tilt stiffness ratio may be greater than or equal to 0.05. The fan shaft tilt stiffness ratio may be in the range from $2.5 \times 10^{-2}$ to $3.7 \times 10^{2}$. The fan shaft tilt stiffness ratio may be in the range from 0.05 to $4.0 \times 10^{1}$.

A product of:

$$(\text{the radial bending stiffness of the fan shaft at the input to the fan}) \times (\text{the radial bending stiffness of the fan shaft at the output of the gearbox})$$

may be greater than or equal to $1.2 \times 10^{13}$ (N/m)$^2$, greater than or equal to $2.4 \times 10^{14}$ (N/m)$^2$, in the range from $1.2 \times 10^{13}$ (N/m)$^2$ to $3.0 \times 10^{18}$ (N/m)$^2$, or in the range from $2.4 \times 10^{14}$ (N/m)$^2$ to $3.0 \times 10^{17}$ (N/m)$^2$.

According to an eighth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, wherein:

a fan-gearbox axial distance is defined as the axial distance between the output of the gearbox and the axial centreline of the fan, the fan-gearbox axial distance being greater than or equal to 0.35, and a fan shaft tilt stiffness ratio of:

$$\frac{\text{the tilt stiffness of the fan shaft at the input to the fan}}{\text{the tilt stiffness of the fan shaft at the output of the gearbox}}$$

is greater than or equal to $2.5 \times 10^{-2}$.

The fan shaft tilt stiffness ratio may be greater than or equal to 0.05. The fan shaft tilt stiffness ratio may be in the range from $2.5 \times 10^{-2}$ to $3.7 \times 10^{2}$. The fan shaft tilt stiffness ratio may be in the range from 0.05 to $4.0 \times 10^{1}$.

The tilt stiffness of the fan shaft at the input to the fan may be greater than or equal to $5.00 \times 10^{5}$ Nm/rad. The tilt stiffness of the fan shaft at the input to the fan may be greater than or equal to $9.0 \times 10^{5}$ Nm/rad. The tilt stiffness of the fan shaft at the input to the fan may be in the range from $5.00 \times 10^{5}$ Nm/rad to $7.00 \times 10^{8}$ Nm/rad. The tilt stiffness of the fan shaft at the input to the fan may be in the range from $9.0 \times 10^{5}$ Nm/rad to $3.5 \times 10^{8}$ Nm/rad.

The tilt stiffness of the fan shaft at the output of the gearbox may be greater than or equal to $7.00 \times 10^{4}$ Nm/rad. The tilt stiffness of the fan shaft at the output of the gearbox may be greater than or equal to $9.5 \times 10^{5}$ Nm/rad. The tilt stiffness of the fan shaft at the output of the gearbox may be in the range from $7.00 \times 10^{4}$ Nm/rad to $7.00 \times 10^{7}$ Nm/rad. The tilt stiffness of the fan shaft at the output of the gearbox may be in the range from $9.5 \times 10^{5}$ Nm/rad to $3.5 \times 10^{7}$ Nm/rad.

The diameter of the fan may be in the range from 240 cm to 280 cm. In such an embodiment, the fan shaft tilt stiffness ratio may be greater than or equal to 0.2 or in the range from 0.2 to 5.0.

The diameter of the fan may be in the range from 330 cm to 380 cm. In such an embodiment, the fan shaft tilt stiffness ratio may be greater than or equal to 0.1 or in the range from 0.1 to $1.0 \times 10^{1}$.

A fan shaft radial bending stiffness ratio of:

$$\frac{\text{the radial bending stiffness of the fan shaft at the input to the fan}}{\text{the radial bending stiffness of the fan shaft at the output of the gearbox}}$$

may be greater than or equal to $6.0\times10^{-3}$. The fan shaft radial bending stiffness ratio may be greater than or equal to 0.015. The fan shaft radial bending stiffness ratio may be in the range from $6.0\times10^{-3}$ to $2.5\times10^{1}$. The fan shaft radial bending stiffness ratio may be in the range from 0.015 to 2.5.

A product of:

$$(\text{the tilt stiffness of the fan shaft at the input to the fan})\times(\text{the tilt stiffness of the fan shaft at the output of the gearbox})$$

may be greater than or equal to $3.5\times10^{10}$ (Nm/rad)$^2$, greater than or equal to $7.2\times10^{11}$ (Nm/rad)$^2$, in the range from $3.5\times10^{10}$ (Nm/rad)$^2$ to $5.0\times10^{16}$ (Nm/rad)$^2$, or in the range from $7.2\times10^{11}$ (Nm/rad)$^2$ to $5.0\times10^{15}$ (Nm/rad)$^2$.

One or more of the following features may apply to either or both of the preceding two aspects (e.g. the seventh and eighth aspects):

The fan-gearbox axial distance may be greater than or equal to 0.37 m. The fan-gearbox axial distance may be in the range from 0.35 m to 0.8 m. The fan-gearbox axial distance may be in the range from 0.37 m to 0.75 m.

The fan shaft may be defined as the torque transfer component extending from the output of the gearbox to the input to the fan. The fan shaft may comprise at least part (or all) of a gearbox output shaft and at least part (or all) of a fan input shaft.

The input to the fan may be a fan input position defined as a point on the fan shaft at the axial midpoint of the interface between the fan and the fan shaft.

The output of the gearbox may be defined as the point of connection between the fan shaft and the gearbox. The gearbox may be in a star configuration and the output of the gearbox may be a gearbox output position defined as the point of connection between the ring gear and the fan shaft. The gearbox may be in a planetary configuration and the output of the gearbox may be a gearbox output position at the interface between the fan shaft and the planet carrier.

The gas turbine engine may further comprise a fan shaft mounting structure arranged to mount the fan shaft within the engine. The fan shaft mounting structure may comprise at least two supporting bearings connected to the fan shaft.

The at least two supporting bearings may comprise a first supporting bearing and second supporting bearing. Both of the first and the second supporting bearings may be located at positions forward of the gearbox. Alternatively, the first supporting bearing may be located at a position forward of the gearbox and the second supporting bearing may be located at a position rearward of the gearbox.

The fan shaft mounting structure may comprise a third supporting bearing. The third supporting bearing may be located between the fan and the gearbox.

The fan shaft may comprise a gearbox output shaft forming a relatively flexible portion of the fan shaft. The fan shaft mounting structure may comprise gearbox output shaft support structure having at least one gearbox output shaft bearing arranged to support the gearbox output shaft.

The fan shaft mounting structure may further comprise one or more non-supporting softly mounted bearings.

Any one or more of the bearings provided as part of the fan shaft mounting structure may be double bearings.

The axial distance, $d_1$, between the input to the fan and the closest bearing of the at least two supporting bearings in a rearward direction from the fan may be greater than or equal to 0.12 m, greater than or equal to 0.13 m, in the range from 0.12 m to 0.40 m, or in the range from 0.13 m to 0.30 m.

The axial distance, $d_2$, between the output of the gearbox and the closest bearing of the at least two supporting bearings in a forward direction from the gearbox may be greater than or equal to 0.15 m, greater than or equal to 0.16 m, in the range from 0.15 m to 0.45 m, or in the range from 0.16 m to 0.40 m.

The gearbox may be an epicyclic gearbox comprising a sun gear, a plurality of planet gears, a ring gear, and a planet carrier arranged to have the plurality of planet gears mounted thereon.

According to a ninth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft via an output of the gearbox so as to drive the fan via an input to the fan at a lower rotational speed than the core shaft, and wherein
  a fan-gearbox axial distance is defined as the axial distance between the output of the gearbox and the axial centreline of the fan, the fan-gearbox axial distance being greater than or equal to 0.35 m; and wherein:
  a fan shaft radial bending stiffness ratio of:

$$\frac{\text{the radial bending stiffness of the fan shaft at the input to the fan}}{\text{the radial bending stiffness of the fan shaft at the output of the gearbox}}$$

is greater than or equal to $6.0\times10^{-3}$.

The propulsor of the ninth aspect may have some or all of the features described above with respect to the gas turbine engine of the seventh aspect, and may be a gas turbine engine in some embodiments.

According to a tenth aspect there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft via an output of the gearbox so as to drive the fan via an input to the fan at a lower rotational speed than the core shaft, and wherein
  a fan-gearbox axial distance is defined as the axial distance between the output of the gearbox and the axial centreline of the fan, the fan-gearbox axial distance being greater than or equal to 0.35 m; and wherein:
  a fan shaft tilt stiffness ratio of:

$$\frac{\text{the tilt stiffness of the fan shaft at the input to the fan}}{\text{the tilt stiffness of the fan shaft at the output of the gearbox}}$$

is greater than or equal to $2.5\times10^{-2}$.

The propulsor of the tenth aspect may have some or all of the features described above with respect to the gas turbine engine of the eighth aspect, and may be a gas turbine engine in some embodiments.

The ninth and tenth aspect may be combined. According to an eleventh aspect, there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft via an output of the gearbox so as to drive the fan via an input to the fan at a lower rotational speed than the core shaft, and wherein
- a fan-gearbox axial distance is defined as the axial distance between the output of the gearbox and the axial centreline of the fan, the fan-gearbox axial distance being greater than or equal to 0.35 m; and wherein:
- a) a fan shaft radial bending stiffness ratio of:

$$\frac{\text{the radial bending stiffness of the fan shaft at the input to the fan}}{\text{the radial bending stiffness of the fan shaft at the output of the gearbox}}$$

is greater than or equal to $6.0 \times 10^{-3}$; and/or
b) a fan shaft tilt stiffness ratio of:

$$\frac{\text{the tilt stiffness of the fan shaft at the input to the fan}}{\text{the tilt stiffness of the fan shaft at the output of the gearbox}}$$

is greater than or equal to $2.5 \times 10^{-2}$.

The propulsor of the eleventh aspect may have some or all of the features described above with respect to the gas turbine engine of the seventh or eighth aspect, and may be a gas turbine engine in some embodiments.

According to a twelfth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, and wherein
- a fan-gearbox axial distance is defined as the axial distance between the output of the gearbox and the axial centreline of the fan, the fan-gearbox axial distance being greater than or equal to 0.35 m, wherein:
- a fan shaft radial bending stiffness ratio of:

$$\frac{\text{the radial bending stiffness of the fan shaft at the input to the fan}}{\text{the radial bending stiffness of the fan shaft at the output of the gearbox}}$$

is greater than or equal to $6.0 \times 10^{-3}$. The method comprises operating the gas turbine engine to provide propulsion for the aircraft under cruise conditions.

The method of the twelfth aspect may be a method of operating the gas turbine engine or the propulsor of the seventh aspect or ninth aspect respectively. Any of the features, ratios and parameters introduced above in connection with the seventh or ninth aspect may also therefore apply to the twelfth aspect.

According to a thirteenth aspect there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, and wherein
- a fan-gearbox axial distance is defined as the axial distance between the output of the gearbox and the axial centreline of the fan, the fan-gearbox axial distance being greater than or equal to 0.35 m, wherein:
- a fan shaft tilt stiffness ratio of:

$$\frac{\text{the tilt stiffness of the fan shaft at the input to the fan}}{\text{the tilt stiffness of the fan shaft at the output of the gearbox}}$$

is greater than or equal to $2.5 \times 10^{-2}$. The method comprises operating the gas turbine engine to provide propulsion for the aircraft under cruise conditions.

The method of the thirteenth aspect may be a method of operating the gas turbine engine or the propulsor of the eighth aspect or tenth aspect respectively. Any of the features, ratios and parameters introduced above in connection with the eighth aspect or tenth aspect may also therefore apply to the thirteenth aspect.

The twelfth and thirteenth aspects may be combined. According to a fourteenth aspect, there is provided a method of operating a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, and wherein:
- a fan-gearbox axial distance is defined as the axial distance between the output of the gearbox and the axial centreline of the fan, the fan-gearbox axial distance being greater than or equal to 0.35 m, wherein:
- a) a fan shaft radial bending stiffness ratio of:

$$\frac{\text{the radial bending stiffness of the fan shaft at the input to the fan}}{\text{the radial bending stiffness of the fan shaft at the output of the gearbox}}$$

is greater than or equal to $6.0 \times 10^{-3}$; and/or
b) a fan shaft tilt stiffness ratio of:

$$\frac{\text{the tilt stiffness of the fan shaft at the input to the fan}}{\text{the tilt stiffness of the fan shaft at the output of the gearbox}}$$

is greater than or equal to $2.5 \times 10^{-2}$, the method comprising operating the gas turbine engine to provide propulsion for the aircraft under cruise conditions.

The method of the fourteenth aspect may be a method of operating the gas turbine engine or the propulsor of the seventh, eighth or eleventh aspect. Any of the features, ratios and parameters introduced above in connection with the seventh, eighth or eleventh aspect may also therefore apply to the fourteenth aspect.

The inventor has discovered that by designing the comparative stiffness of the fan shaft at the fan input compared to the gearbox output, within other constraints of the engine, the fan can be accurately located within the engine while also isolating the gearbox from loads transmitted from the fan. The inventor has found that if the stiffness of the fan shaft at the fan input is such that the fan shaft radial bending/tilt stiffness ratio is below the specified range the fan would not be adequately located (leading to fan tip control problems) and there would be undesirable low modal vibrations with high amplitude. The inventor has found that if the fan shaft is designed so that the stiffness at the fan input was further increased so that the fan shaft radial bending/tilt stiffness ratio is outside of the above range there would be little or no practical benefit in terms of improved location of the fan without undesirable increases in overall weight. The inventor has also found that increasing the stiffness of the fan shaft at the output of the gearbox so that the fan shaft radial bending/tilt stiffness ratio is outside of the specified range would lead to excess load transmission into the gearbox from the fan. The inventor has also found that reducing the stiffness of the fan shaft at the gearbox output so that the fan shaft radial bending/tilt stiffness ratio is outside of the range above would cause undesirable low modal lateral vibrations in the fan shaft with excessive amplitude.

In other aspects, value ranges for the product of the components of the fan shaft radial bending stiffness ratio and the fan shaft tilt stiffness ratio may be specified instead of, or as well as, value ranges for the ratios.

According to one such aspect, the seventh aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, and wherein:
a fan-gearbox axial distance is defined as the axial distance between the output of the gearbox and the axial centreline of the fan, the fan-gearbox axial distance being greater than or equal to 0.35 m, and a product of:

(the radial bending stiffness of the fan shaft at the input to the fan)×(the radial bending stiffness of the fan shaft at the output of the gearbox)

may be greater than or equal to $1.2 \times 10^{13}$ (N/m)$^2$, greater than or equal to $2.4 \times 10^{14}$ (N/m)$^2$, in the range from $1.2 \times 10^{13}$ (N/m)$^2$ to $3.0 \times 10^{18}$ (N/m)$^2$, or in the range from $2.4 \times 10^{14}$ (N/m)$^2$ to $3.0 \times 10^{17}$ (N/m)$^2$.

According to another such aspect, the eighth aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft via an output of the gearbox so as to drive the fan via an input to the fan at a lower rotational speed than the core shaft, wherein:
a fan-gearbox axial distance is defined as the axial distance between the output of the gearbox and the axial centreline of the fan, the fan-gearbox axial distance being greater than or equal to 0.35, and a product of:

(the tilt stiffness of the fan shaft at the input to the fan)×(the tilt stiffness of the fan shaft at the output of the gearbox)

may be greater than or equal to $3.5 \times 10^{10}$ (Nm/rad)$^2$, greater than or equal to $7.2 \times 10^{11}$ (Nm/rad)$^2$, in the range from $3.5 \times 10^{10}$ (Nm/rad)$^2$ to $5.0 \times 10^{16}$ (Nm/rad)$^2$, or in the range from $7.2 \times 10^{11}$ (Nm/rad)$^2$ to $5.0 \times 10^{15}$ (Nm/rad)$^2$.

The skilled person would appreciate that method and propulsor aspects may be formulated accordingly.

According to a fifteenth aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive via an output of the gearbox to a fan shaft so as to drive the fan, via an input to the fan, at a lower rotational speed than the core shaft; and
a fan shaft mounting structure arranged to mount the fan shaft within the engine, wherein the fan shaft mounting structure comprises at least two supporting bearings connected to the fan shaft, wherein:
the output of the gearbox is at a gearbox output position and the input to the fan is at a fan input position;
a first bearing separation distance, $d_1$, is defined as the axial distance between the input to the fan and the closest bearing of the at least two supporting bearings in a rearward direction from the fan; and
a first bearing separation ratio of:

$$\frac{\text{the first bearing separation distance } (d_1)}{\text{the axial distance between the fan input position and the gearbox output position } (d_4)}$$

is greater than or equal to $1.6 \times 10^{-1}$, and the axial distance between the fan input position and the gearbox output position, $d_4$, is greater than or equal to 0.43 m.

The first bearing separation ratio may be greater than or equal to $1.8 \times 10^{-1}$. The first bearing separation ratio may be greater than or equal to $1.6 \times 10^{-1}$. The first bearing separation ratio may be greater than or equal to $2.2 \times 10^{-1}$. The first bearing separation ratio may be in the range from $1.6 \times 10^{-1}$ to $3.3 \times 10^{-1}$. The first bearing separation ratio may be in the range from $1.8 \times 10^{-1}$ to $3.0 \times 10^{-1}$. The first bearing separation ratio may be in the range from $1.6 \times 10^{-1}$ to $2.2 \times 10^{-1}$. The first bearing separation ratio may be in the range from $2.2 \times 10^{-1}$ to $3.3 \times 10^{-1}$.

The first bearing separation distance, $d_1$, may be greater than or equal to 0.12 m, greater than or equal to 0.13 m, in the range from 0.12 m to 0.40 m, or in the range from 0.13 m to 0.30 m.

A second bearing separation distance, $d_2$, is defined as the axial distance between the output of the gearbox and the closest bearing of the at least two supporting bearings in a forward direction from the gearbox. The second bearing separation distance, $d_2$, maybe greater than or equal to 0.15 m, greater than or equal to 0.16 m, in the range from 0.15 m to 0.45 m, or in the range from 0.16 m to 0.40 m.

The axial distance between the fan input position and the gearbox output position, $d_4$, may be greater than or equal to 0.46 m, in the range from 0.43 m to 0.95 m, or in the range from 0.46 m to 0.85 m.

A first bearing separation product defined as:

the first bearing separation distance ($d_1$)×the axial distance between the fan input position and the gearbox output position ($d_4$)

may be greater than or equal to $5.2 \times 10^{-2}$ m². The first bearing separation product may be greater than or equal to $5.7 \times 10^{-2}$ m². The first bearing separation product may be in the range from $5.2 \times 10^{-2}$ m² to $2.6 \times 10^{-1}$ m². The first bearing separation product may be in the range from $5.7 \times 10^{-2}$ m² to $2.4 \times 10^{-1}$ m².

Both of the at least two supporting bearings may be located at positions forward of the gearbox. A bearing axial separation, $d_3$, may be defined as the axial distance between the supporting bearing that is the closest bearing of the at least two supporting bearings in a rearward direction from the fan and the supporting bearing that is the closest bearing of the at least two supporting bearings in a forward direction from the gearbox. A second bearing separation ratio defined as:

$$\frac{\text{the first bearing separation distance } (d_1)}{\text{the bearing axial separation } (d_3)}$$

may be greater than or equal to $4.1 \times 10^{-1}$. The second bearing separation ratio may be greater than or equal to $4.5 \times 10^{-1}$. The second bearing separation ratio may be greater than or equal to $6.0 \times 10^{-1}$. The second bearing separation ratio may be in the range from $4.1 \times 10^{-1}$ to $8.3 \times 10^{-1}$. The second bearing separation ratio may be in the range from $4.5 \times 10^{-1}$ to $7.7 \times 10^{-1}$. The second bearing separation ratio may be in the range from $4.1 \times 10^{-1}$ to $6.0 \times 10^{-1}$. The second bearing separation ratio may in the range from $6.0 \times 10^{-1}$ to $8.3 \times 10^{-1}$.

One of the at least two supporting bearings may be located at a position forward of the gearbox and another of the at least two supporting bearings may be located at a position rearward of the gearbox.

The at least two supporting bearings may include a first supporting bearing and a second supporting bearing, and the fan shaft mounting structure may comprises a third supporting bearing. The third supporting bearing may be located at a position between the fan and the gearbox.

The fan shaft may comprise a gearbox output shaft forming a relatively flexible portion of the fan shaft. The fan shaft mounting structure may comprise a gearbox output shaft support structure having at least one gearbox output shaft bearing arranged to support the gearbox output shaft.

The fan shaft mounting structure may further comprise one or more non-supporting softly mounted bearings.

Any one or more of the bearings provided as part of the fan shaft mounting structure may be double bearings.

A fan shaft radial bending stiffness ratio of:

$$\frac{\text{the radial bending stiffness of the fan shaft at the input to the fan}}{\text{the radial bending stiffness of the fan shaft at the output of the gearbox}}$$

may be greater than or equal to $6.0 \times 10^{-3}$. The fan shaft radial bending stiffness ratio may be greater than or equal to 0.015. The fan shaft radial bending stiffness ratio may be in the range from $6.0 \times 10^{-3}$ to $2.5 \times 10^{1}$. The fan shaft radial bending stiffness ratio may be in the range from 0.015 to 2.5.

The radial bending stiffness of the fan shaft at the input to the fan may be greater than or equal to $3.00 \times 10^{6}$ N/m. The radial bending stiffness of the fan shaft at the input to the fan may be greater than or equal to $6.3 \times 10^{6}$ N/m. The radial bending stiffness of the fan shaft at the input to the fan may be in the range from $3.00 \times 10^{6}$ N/m to $2.00 \times 10^{9}$ N/m. The radial bending stiffness of the fan shaft at the input to the fan may be in the range from $6.3 \times 10^{6}$ N/m to $1.0 \times 10^{9}$ N/m.

The radial bending stiffness of the fan shaft at the output of the gearbox may be greater than or equal to $4.00 \times 10^{6}$ N/m. The radial bending stiffness of the fan shaft at the output of the gearbox may be greater than or equal to $3.7 \times 10^{7}$ N/m. The radial bending stiffness of the fan shaft at the output of the gearbox may be in the range from $4.00 \times 10^{6}$ N/m to $1.5 \times 10^{9}$ N/m. The radial bending stiffness of the fan shaft at the output of the gearbox may be in the range from $3.7 \times 10^{7}$ N/m to $1.0 \times 10^{9}$ N/m.

The diameter of the fan may be in the range from 240 cm to 280 cm. In such an embodiment, the fan shaft radial bending stiffness ratio may be greater than or equal to 0.03, or in the range from 0.03 to 0.85.

Alternatively, the diameter of the fan may be in the range from 330 cm to 380 cm. In such an embodiment, the fan shaft radial bending stiffness ratio may be greater than or equal to 0.02, or in the range from 0.02 to 1.5.

A fan shaft tilt stiffness ratio of:

$$\frac{\text{the tilt stiffness of the fan shaft at the input to the fan}}{\text{the tilt stiffness of the fan shaft at the output of the gearbox}}$$

may be greater than or equal to $2.5 \times 10^{-2}$. The fan shaft tilt stiffness ratio may be greater than or equal to 0.05. The fan shaft tilt stiffness ratio may be in the range from $2.5 \times 10^{-2}$ to $3.7 \times 10^{2}$. The fan shaft tilt stiffness ratio may be in the range from 0.05 to $4.0 \times 10^{1}$.

The tilt stiffness of the fan shaft at the input to the fan may be greater than or equal to $5.00 \times 10^{5}$ Nm/rad. The tilt stiffness of the fan shaft at the input to the fan may be greater than or equal to $9.0 \times 10^{5}$ Nm/rad. The tilt stiffness of the fan shaft at the input to the fan may be in the range from $5.00 \times 10^{5}$ Nm/rad to $7.00 \times 10^{8}$ Nm/rad. The tilt stiffness of the fan shaft at the input to the fan may be in the range from $9.0 \times 10^{5}$ Nm/rad to $3.5 \times 10^{8}$ Nm/rad.

The tilt stiffness of the fan shaft at the output of the gearbox may be greater than or equal to $7.00 \times 10^{4}$ Nm/rad. The tilt stiffness of the fan shaft at the output of the gearbox may be greater than or equal to $9.5 \times 10^{5}$ Nm/rad. The tilt stiffness of the fan shaft at the output of the gearbox may be in the range from $7.00 \times 10^{4}$ Nm/rad to $7.00 \times 10^{7}$ Nm/rad. The tilt stiffness of the fan shaft at the output of the gearbox may be in the range from $9.5 \times 10^{5}$ Nm/rad to $3.5 \times 10^{7}$ Nm/rad.

The diameter of the fan may be in the range from 240 cm to 280 cm. In such an embodiment the fan shaft tilt stiffness ratio may be greater than or equal to 0.2 or in the range from 0.2 to 5.0.

Alternatively, the diameter of the fan may be in the range from 330 cm to 380 cm. In such an embodiment, the fan shaft tilt stiffness ratio may be greater than or equal to 0.1 or in the range from 0.1 to $1.0 \times 10^{1}$.

The fan shaft may be defined as the torque transfer component extending from the output of the gearbox to the input to the fan. The fan shaft may comprise at least part of a gearbox output shaft and at least part of a fan input shaft.

The input to the fan may be a fan input position defined as a point on the fan shaft at the axial midpoint of the interface between the fan and the fan shaft.

The output of the gearbox may be defined as the point of connection between the fan shaft and the gearbox. The gearbox may be in a star configuration and the output of the gearbox may be a gearbox output position defined as the point of connection between the ring gear and the fan shaft. Alternatively, the gearbox may be in a planetary configuration and the output of the gearbox may be a gearbox output position at the interface between the fan shaft and the planet carrier.

The gearbox may be an epicyclic gearbox comprising a sun gear, a plurality of planet gears, a ring gear, and a planet carrier arranged to have the plurality of planet gears mounted thereon.

According to a sixteenth aspect, there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft; and a fan shaft mounting structure arranged to mount the fan shaft within the propulsor, wherein the fan shaft mounting structure comprises at least two supporting bearings connected to the fan shaft, wherein:

the output of the gearbox is at a gearbox output position and the input to the fan is at a fan input position;

a first bearing separation distance, $d_1$, is defined as the axial distance between the input to the fan and the closest bearing of the at least two supporting bearings in a rearward direction from the fan; and a first bearing separation ratio of:

$$\frac{\text{the first bearing separation distance } (d_1)}{\text{the axial distance between the fan input position and the gearbox output position } (d_4)}$$

is greater than or equal to $1.6 \times 10^{-1}$, and the axial distance between the fan input position and the gearbox output position, $d_4$, is greater than or equal to 0.43 m.

The propulsor may have some or all of the features described above with respect to the gas turbine engine of the fifteenth aspect, and may be a gas turbine engine in some embodiments.

According to a seventeenth aspect, there is provided a method of operating a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive via an output of the gearbox to a fan shaft so as to drive the fan via an input to the fan at a lower rotational speed than the core shaft; and a fan shaft mounting structure arranged to mount the fan shaft within the engine, wherein the fan shaft mounting structure comprises at least two supporting bearings connected to the fan shaft, wherein:

the output of the gearbox is at a gearbox output position and the input to the fan is at a fan input position;

a first bearing separation distance, $d_1$, is defined as the axial distance between the input to the fan and the closest bearing of the at least two supporting bearings in a rearward direction from the fan; and a first bearing separation ratio of:

$$\frac{\text{the first bearing separation distance } (d_1)}{\text{the axial distance between the fan input position and the gearbox output position } (d_4)}$$

is greater than or equal to $1.6 \times 10^{-1}$, and the axial distance between the fan input position and the gearbox output position ($d_4$) is greater than or equal to 0.43 m. The method comprises operating the gas turbine engine to provide propulsion for the aircraft under cruise conditions.

The method of the seventeenth aspect may be a method of operating the gas turbine engine or the propulsor of the fifteenth aspect or sixteenth aspect respectively. Any of the features, ratios and parameters introduced above in connection with the fifteenth or sixteenth aspect also therefore apply to the seventeenth aspect.

The inventor has discovered that by arranging the bearings so that the first bearing separation ratio defined above is within the specified range the fan can be sufficiently located within the engine and the gearbox isolated from loads from the fan, while still providing a suitable fan shaft geometry to fit within the engine. The inventor has found that if the first bearing separation distance were to be increased so that the ratio was outside the specified range the fan would not be adequately located. The inventor has also discovered that if the axial distance between the fan input and gearbox output were to be decreased so that the ratio was outside of the specified range there would be excessive transmission of load into the gearbox from the fan.

In other aspects, value ranges for the product of the components of the first bearing separation ratio may be specified instead of, or as well as, value ranges for the ratios.

According to one such aspect, the fifteenth aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive via an output of the gearbox to a fan shaft so as to drive the fan, via an input to the fan, at a lower rotational speed than the core shaft; and a fan shaft mounting structure arranged to mount the fan shaft within the engine, wherein the fan shaft mounting structure comprises at least two supporting bearings connected to the fan shaft, wherein: the output of the gearbox is at a gearbox output position and the input to the fan is at a fan input position; a first bearing separation distance, $d_1$, is defined as the axial distance between the input to the fan and the closest bearing of the at least two supporting bearings in a rearward direction from the fan; and a first bearing separation product defined as:

$$\text{the first bearing separation distance } (d_1) \times \text{the axial distance between the fan input position and the gearbox output position } (d_4)$$

is greater than or equal to $5.2 \times 10^{-2}$ m², greater than or equal to $5.7 \times 10^{-2}$ m², in the range from $5.2 \times 10^{-2}$ m² to $2.6 \times 10^{-1}$ m², or in the range from $5.7 \times 10^{-2}$ m² to $2.4 \times 10^{-1}$ m², and the axial distance between the fan input position and the gearbox output position, $d_4$, is greater than or equal to 0.43 m.

The skilled person would appreciate that method and propulsor aspects may be formulated accordingly.

According to a eighteenth aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:

the torsional stiffness of the planet carrier is greater than or equal to $1.60 \times 10^8$ Nm/rad; and the radial bending stiffness of the fan shaft mounting structure is greater than or equal to $7.00 \times 10^8$ N/m.

The torsional stiffness of the planet carrier may be greater than or equal to $2.7 \times 10^8$ Nm/rad. The torsional stiffness of the planet carrier may be in the range from $1.60 \times 10^8$ Nm/rad to $1.00 \times 10^{11}$ Nm/rad. The torsional stiffness of the planet carrier may be in the range from $2.7 \times 10^8$ Nm/rad to $1 \times 10^{10}$ Nm/rad.

The radial bending stiffness of the fan shaft mounting structure may be greater than or equal to $1.25 \times 10^9$ N/m. The radial bending stiffness of the fan shaft mounting structure may be in the range from $7.00 \times 10^8$ N/m to $6.00 \times 10^{11}$ N/m. The radial bending stiffness of the fan shaft mounting structure may be in the range from $1.25 \times 10^9$ N/m to $2.0 \times 10^{11}$ N/m.

The fan may have a fan diameter in the range from 240 cm to 280 cm. In such an embodiment, the torsional stiffness of the planet carrier may be greater than or equal to $1.8 \times 10^8$ Nm/rad or in the range from $1.8 \times 10^8$ Nm/rad to $4.8 \times 10^9$ Nm/rad. Additionally, or alternatively, in such an embodiment, the radial bending stiffness of the fan shaft mounting structure may be greater than or equal to $7.0 \times 10^8$ N/m, or in the range from $7.0 \times 10^8$ N/m to $5.0 \times 10^{11}$ N/m.

The fan may have a fan diameter in the range from 330 cm to 380 cm. In such an embodiment, the torsional stiffness of the planet carrier may be greater than or equal to $6.0 \times 10^8$ Nm/rad or in the range from $6.0 \times 10^8$ Nm/rad to $2.2 \times 10^{10}$ Nm/rad. Additionally, or alternatively, in such an embodiment, the radial bending stiffness of the fan shaft mounting structure may be greater than or equal to $1.4 \times 10^9$ N/m, or in the range from $1.4 \times 10^9$ N/m to $6.0 \times 10^{11}$ N/m.

The tilt stiffness of the fan shaft mounting structure may be greater than or equal to $1.50 \times 10^7$ Nm/rad. The tilt stiffness of the fan shaft mounting structure may be greater than or equal to $2.1 \times 10^7$ Nm/rad. The tilt stiffness of the fan shaft mounting structure may be in the range from $1.5 \times 10^7$ Nm/rad to $2.70 \times 10^{10}$ Nm/rad. The tilt stiffness of the fan shaft mounting structure may be in the range from $2.1 \times 10^7$ Nm/rad to $1 \times 10^{10}$ Nm/rad.

According to a nineteenth aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:

the torsional stiffness of the planet carrier is greater than or equal to $1.60 \times 10^8$ Nm/rad; and the tilt stiffness of the fan shaft mounting structure is greater than or equal to $1.50 \times 10^7$ Nm/rad.

The torsional stiffness of the planet carrier may be greater than or equal to $2.7 \times 10^8$ Nm/rad. The torsional stiffness of the planet carrier may be in the range from $1.60 \times 10^8$ Nm/rad to $1.00 \times 10^{11}$ Nm/rad. The torsional stiffness of the planet carrier may be in the range from $2.7 \times 10^8$ Nm/rad to $1 \times 10^{10}$ Nm/rad.

The tilt stiffness of the fan shaft mounting structure may be greater than or equal to $2.1 \times 10^7$ Nm/rad. The tilt stiffness of the fan shaft mounting structure may be in the range from $1.50 \times 10^7$ Nm/rad to $2.70 \times 10^{10}$ Nm/rad. The tilt stiffness of the fan shaft mounting structure may be in the range from $2.1 \times 10^7$ Nm/rad to $1 \times 10^{10}$ Nm/rad.

The fan may have a fan diameter in the range from 240 cm to 280 cm. In such an embodiment, the torsional stiffness of the planet carrier may be greater than or equal to $1.8 \times 10^8$ Nm/rad or in the range from $1.8 \times 10^8$ Nm/rad to $4.8 \times 10^9$ Nm/rad. Additionally, or alternatively, in such an embodiment, the tilt stiffness of the fan shaft mounting structure may be greater than or equal to $2.1 \times 10^7$ Nm/rad or in the range from $2.1 \times 10^7$ Nm/rad to $1.9 \times 10^{10}$ Nm/rad.

Alternatively, the fan may have a fan diameter in the range from 330 cm to 380 cm. In such an embodiment, the torsional stiffness of the planet carrier may be greater than or equal to $6.0 \times 10^8$ Nm/rad or in the range from $6.0 \times 10^8$ Nm/rad to $2.2 \times 10^{10}$ Nm/rad. Additionally or alternatively, in such an embodiment, the tilt stiffness of the fan shaft mounting structure may be greater than or equal to $3.8 \times 10^7$ Nm/rad or in the range from $3.8 \times 10^7$ Nm/rad to $2.7 \times 10^{10}$ Nm/rad.

Any one or more of the following may apply to either of both of the previous two aspects (e.g. the eighteenth and/or nineteenth aspects):

A first planet carrier stiffness ratio of:

$$\frac{\text{the effective linear torsional stiffness of the planet carrier}}{\text{radial bending stiffness of the fan shaft mounting structure}}$$

may be greater than or equal to $7.0 \times 10^{-3}$. The first planet carrier stiffness ratio may be greater than or equal to $7.0 \times 10^{-2}$. The first planet carrier stiffness ratio may be in the range from $7.0 \times 10^{-3}$ to $1.9 \times 10^3$. The first planet carrier stiffness ratio may be in the range from $7.0 \times 10^{-2}$ to $9.0 \times 10^1$.

A first planet carrier stiffness product of:

(the effective linear torsional stiffness of the planet carrier)×(radial bending stiffness of the fan shaft mounting structure)

may be greater than or equal to $2.9 \times 10^{18}$ (N/m)$^2$. The first planet carrier stiffness product may be greater than or equal to $5.0 \times 10^{18}$ (N/m)$^2$. The first planet carrier stiffness product may be in the range from $2.9 \times 10^{18}$ (N/m)$^2$ to $8.0 \times 10^{22}$ (N/m)$^2$. The first planet carrier stiffness product may be in the range from $5.0 \times 10^{18}$ (N/m)$^2$ to $8.0 \times 10^{21}$ (N/m)$^2$.

A second planet carrier stiffness ratio defined as:

$$\frac{\text{the torsional stiffness of the planet carrier}}{\text{tilt stiffness of the fan shaft mounting structure}}$$

may be greater than or equal to $6.0 \times 10^{-3}$. The second planet carrier stiffness ratio may be greater than or equal to $6.0 \times 10^{-2}$. The second planet carrier stiffness ratio may be in the range from $6.0 \times 10^{-3}$ to $7.0 \times 10^3$. The second planet carrier stiffness ratio may be in the range from $6.0 \times 10^{-2}$ to $7.0 \times 10^2$.

A second planet carrier stiffness product is defined as:

(the torsional stiffness of the planet carrier)×(tilt stiffness of the fan shaft mounting structure), and may be greater than or equal to $2.4×10^{15}$ (Nm/rad)². The second planet carrier stiffness product may be greater than or equal to $4.9×10^{15}$ (Nm/rad)². The second planet carrier stiffness product may be in the range from $2.4×10^{15}$ (Nm/rad)² to $2.7×10^{21}$ (Nm/rad)². The second planet carrier stiffness product may be in the range from $4.9×10^{15}$ (Nm/rad)² to $2.0×10^{20}$ (Nm/rad)².

The power transmitted by the gearbox may be greater than or equal to $2.25×10^7$ W. The power transmitted by the gearbox may be greater than or equal to $2.5×10^7$ W. The power transmitted by the gearbox may be in the range from $2.25×10^7$ W to $1.00×10^8$ W. The power transmitted by the gearbox may be in the range from $2.5×10^7$ W to $8.0×10^7$ w.

The moment of inertia of the fan may be greater than or equal to $7.40×10^7$ kgm². The moment of inertia of the fan may be greater than or equal to $8.3×10^7$ kgm². The moment of inertia of the fan may be in the range from $7.40×10^7$ kgm² to $9.00×10^8$ kgm². The moment of inertia of the fan may be in the range from $8.3×10^7$ kgm² to $6.5×10^8$ kgm².

The at least two supporting bearings may comprise a first supporting bearing and second supporting bearing. Both of the first and the second supporting bearings may be located at positions forward of the gearbox. The first supporting bearing may be located at a position forward of the gearbox and the second supporting bearing may be located at a position rearward of the gearbox.

The fan shaft mounting structure may further comprise a third supporting bearing. The third supporting bearing may be located between the fan and the gearbox.

The fan shaft may comprise a gearbox output shaft forming a relatively flexible portion of the fan shaft, and the fan shaft mounting structure may comprise a gearbox output shaft support structure having at least one gearbox output shaft bearing arranged to support the gearbox output shaft.

The fan shaft mounting structure may further comprise one or more non-supporting softly mounted bearings.

Any one or more of the bearings provided as part of the fan shaft mounting structure may be double bearings.

According to an twentieth aspect, there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the propulsor, the fan shaft mounting structure comprising at least two supporting bearings connected to the fan shaft, and wherein:
the torsional stiffness of the planet carrier is greater than or equal to $1.6×10^8$ Nm/rad and the radial bending stiffness of the fan shaft mounting structure is greater than or equal to $7.00×10^8$ N/m.

The propulsor of the twentieth aspect may have some or all of the features described above with respect to the gas turbine engine of the eighteenth aspect, and may be a gas turbine engine in some embodiments.

According to an twenty-first aspect, there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the propulsor, the fan shaft mounting structure comprising at least two supporting bearings connected to the fan shaft, and wherein:
the torsional stiffness of the planet carrier is greater than or equal to $1.6×10^8$ Nm/rad and the tilt stiffness of the fan shaft mounting structure is greater than or equal to $1.50×10^7$ Nm/rad.

The propulsor of the twenty-first aspect may have some or all of the features described above with respect to the gas turbine engine of the nineteenth aspect, and may be a gas turbine engine in some embodiments.

The features of the twentieth and twenty-first aspects may be combined. According to twenty-second aspect, there is provided a propulsor for an aircraft, comprising: a fan comprising a plurality of fan blades; a gearbox; a power unit for driving the fan via the gearbox, wherein the gearbox is arranged to receive an input from the power unit via a core shaft and output drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the propulsor, the fan shaft mounting structure comprising at least two supporting bearings connected to the fan shaft, and wherein:
a) the torsional stiffness of the planet carrier is greater than or equal to $1.6×10^8$ Nm/rad and the radial bending stiffness of the fan shaft mounting structure is greater than or equal to $7.00×10^8$ N/m; and/or
b) the torsional stiffness of the planet carrier is greater than or equal to $1.6×10^8$ Nm/rad and the tilt stiffness of the fan shaft mounting structure is greater than or equal to $1.50×10^7$ Nm/rad.

The propulsor of the twenty-second aspect may have some or all of the features described above with respect to the gas turbine engine of the eighteenth or nineteenth aspects, and may be a gas turbine engine in some embodiments.

According to a twenty-third aspect, there is provided a method of operating a gas turbine engine for an aircraft comprising an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:
the torsional stiffness of the planet carrier is greater than or equal to $1.6×10^8$ Nm/rad and the radial bending stiffness of the fan shaft mounting structure is greater than or equal to $7.00×10^8$ N/m,
the method comprising operating the gas turbine engine to provide propulsion for the aircraft under cruise conditions.

The method of the twenty-third aspect may be a method of operating the gas turbine engine or the propulsor of the eighteenth aspect or twentieth aspect respectively. Any of the features, ratios and parameters introduced above in connection with the eighteenth or twentieth aspect also therefore apply to the twenty-third aspect.

According to a twenty-fourth aspect, there is provided a method of operating a gas turbine engine for an aircraft comprising an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:

the torsional stiffness of the planet carrier is greater than or equal to $1.6 \times 10^8$ Nm/rad and the tilt stiffness of the fan shaft mounting structure is greater than or equal to $1.50 \times 10^7$ Nm/rad, the method comprising operating the gas turbine engine to provide propulsion for the aircraft under cruise conditions.

The method of the twenty-fourth aspect may be a method of operating the gas turbine engine or the propulsor of the nineteenth aspect or twenty-first aspect respectively. Any of the features, ratios and parameters introduced above in connection with the nineteenth or twenty-first aspect also therefore apply to the twenty-fourth aspect.

The twenty-third and twenty fourth aspects may be combined. According to a twenty-fifth aspect, there is provided a method of operating a gas turbine engine for an aircraft comprising an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:

a) the torsional stiffness of the planet carrier is greater than or equal to $1.6 \times 10^8$ Nm/rad and the radial bending stiffness of the fan shaft mounting structure is greater than or equal to $7.00 \times 10^8$ N/m; and/or b) the torsional stiffness of the planet carrier is greater than or equal to $1.6 \times 10^8$ Nm/rad and the tilt stiffness of the fan shaft mounting structure is greater than or equal to $1.50 \times 10^7$ Nm/rad, the method comprising operating the gas turbine engine to provide propulsion for the aircraft under cruise conditions.

The method of the twenty-fifth aspect may be a method of operating the gas turbine engine or the propulsor of the eighteenth, nineteenth, or twenty-second aspect. Any of the features, ratios and parameters introduced above in connection with the eighteenth, nineteenth, or twenty-second aspect also therefore apply to the twenty-fourth aspect.

In the eighteenth and nineteenth aspects above the torsional stiffness of the carrier may alternatively be defined as the effective linear torsional stiffness of the carrier as defined elsewhere herein. The same applies to any of the twentieth to twenty-fifth aspects.

The inventor has discovered that designing the gas turbine engine so that the torsional stiffness of the carrier and the radial bending or tilt stiffness of the fan shaft mounting structure are within the specified ranges a high propulsive efficiency can be achieved. The inventor has found that a stiffness of the fan shaft mounting structure within the specified range provides improved location of the fan so as to reduce any performance loss due to problems with fan tip clearance control. The inventor has also found that by designing the gearbox so that the torsional stiffness of the carrier is in the specified range the overall weight of the gearbox can be minimised so as to help maintain a low specific fuel consumption (SFC).

In other aspects, value ranges for the product or ratio of the torsional stiffness of the carrier and the radial bending or tilt stiffness of the fan shaft mounting structure may be specified instead of, or as well as, absolute value ranges.

According to one such aspect, the eighteenth aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:

a) a first planet carrier stiffness ratio of:

$$\frac{\text{the effective linear torsional stiffness of the planet carrier}}{\text{radial bending stiffness of the fan shaft mounting structure}}$$

is greater than or equal to $7.0 \times 10^{-3}$, greater than or equal to $7.0 \times 10^{-2}$, in the range from $7.0 \times 10^{-3}$ to $1.9 \times 10^3$, or in the range from $7.0 \times 10^{-2}$ to $9.0 \times 10^1$; and/or b) a first planet carrier stiffness product of:

$$(\text{the effective linear torsional stiffness of the planet carrier}) \times (\text{radial bending stiffness of the fan shaft mounting structure})$$

is greater than or equal to $2.9 \times 10^{18}$ (N/m)$^2$, greater than or equal to $5.0 \times 10^{18}$ (N/m)$^2$, in the range from $2.9 \times 10^{18}$ (N/m)$^2$ to $8.0 \times 10^{22}$ (N/m)$^2$, or in the range from $5.0 \times 10^{18}$ (N/m)$^2$ to $8.0 \times 10^{21}$ (N/m)$^2$.

According to another such aspect, the nineteenth aspect introduced above may be formulated as an aspect providing a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon; and a fan shaft mounting structure arranged to mount the fan shaft within the engine, the fan shaft mounting structure comprising at least two supporting bearings connected to the fan shaft, and wherein:

a) a second planet carrier stiffness ratio is defined as:

$$\frac{\text{the torsional stiffness of the planet carrier}}{\text{tilt stiffness of the fan shaft mounting structure}}$$

is greater than or equal to $6.0 \times 10^{-3}$, greater than or equal to $6.0 \times 10^{-2}$, in the range from $6.0 \times 10^{-3}$ to $7.0 \times 10^{3}$, or in the range from $6.0 \times 10^{-2}$ to $7.0 \times 10^{2}$; and/or b) a second planet carrier stiffness product is defined as:

(the torsional stiffness of the planet carrier)×(tilt stiffness of the fan shaft mounting structure), and is greater than or equal to $2.4 \times 10^{15}$ (Nm/rad)$^2$, greater than or equal to $4.9 \times 10^{15}$ (Nm/rad)$^2$, in the range from $2.4 \times 10^{15}$ (Nm/rad)$^2$ to $2.7 \times 10^{21}$ (Nm/rad)$^2$, or in the range from $4.9 \times 10^{15}$ (Nm/rad)$^2$ to $2.0 \times 10^{20}$ (Nm/rad)$^2$.

The skilled person would appreciate that method and propulsor aspects may be formulated accordingly.

In any of the preceding aspects, any one or more of the following may apply as applicable:

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The gearbox may have a gear ratio in any range disclosed herein, for example a gear ratio in the range from 3.2 to 4.5, and optionally from 3.2 to 4.0.

The gas turbine engine may have a specific thrust in any range disclosed herein, for example a specific thrust in the range from 70 to 90 NKg$^{-1}$.

The gas turbine engine may have a bypass ratio at cruise conditions in any range disclosed herein, for example in the range from 12.5 to 18, and optionally from 13 to 16.

The fan may have a fan diameter greater than 240 cm and less than or equal to 380 cm. The fan may have a fan diameter greater than 300 cm and less than or equal to 380 cm. The fan may have a fan diameter in the range from 240 cm to 280 cm. The fan may have a fan diameter in the range from 330 cm to 380 cm.

The method of any of the aspects defined above may further comprise driving the gearbox with an input torque of:

i) greater than or equal to 10,000 Nm, and optionally of 10,000 to 50,000 Nm at cruise; and/or ii) greater than or equal to 28,000 Nm, and optionally of 28,000 to 135,000 Nm at max-take off conditions.

For any parameter or ratio of parameters X claimed or disclosed herein, a limit on the values that X can take that is expressed as "X is greater than or equal to Y" can alternatively be expressed as "1/X is less than or equal to 1/Y". Any of the ratios or parameters defined in the aspects and statements above may therefore be expressed as "1/X is less than or equal to 1/Y" rather than "X is greater than or equal to Y". In such cases, zero can be taken as a lower bound.

Various parameters of the gearbox and its mounting structure, and/or of the engine more generally, may be adjusted to allow the engine to meet the specifications of the various aspects summarised above. Comments on various such parameters are provided below.

The inventor has discovered that decreasing the stiffness (radial bending and/or tilt stiffness) of the fan shaft mounting structure outside of the ranges defined herein would result in undesirable vibrations at low modal frequencies (the skilled person would appreciate that the lower modal vibrations have larger amplitudes/deflections than the higher modes, and so are more important to avoid). This may be a function of the size of the gearbox and its configuration.

The inventor has also found that increasing the fan shaft mounting structure radial bending/tilt stiffness above the ranges defined herein would lead to excessive weight increase with little practical performance benefit. The inventor has appreciated that the maximum stiffness will be affected by the engineering limit of the material from which the fan shaft mounting structure is made. The materials from which the fan shaft mounting structure is made (often steels) may, for example, have a Young's modulus in the range from 100 to 250 GPa, or 105 to 215 GPa, and optionally around 210 GPa-different grades of steel, or other types of metal, may be selected to achieve different stiffnesses for the same size and geometry. For example, steels with a Young's modulus in the range 190 to 215 GPa, titanium alloys with a Young's modulus in the range 105 to 120 GPa, or a metal such as titanium with a Young's modulus of around 110 GPa may be used in various embodiments. The inventor has discovered that increasing the stiffness beyond the ranges defined herein using materials such as these would add excessive weight while providing little or no practical performance benefit (e.g. in locating of the fan as described above).

The inventor has found that decreasing the radial bending and/or tilt stiffness of the fan shaft (at the input to the fan or the output of the gearbox) outside of the ranges defined herein would lead to undesirable dynamic effects such as lateral vibration. In particular, the minimum stiffness defined by the ranged specified herein allows vibrations at low modal frequencies to be reduced or avoided (the skilled person would appreciate that the lower modal vibrations have larger amplitudes/deflections than the higher modes, and so are more important to avoid). This may be a function of the size of the gearbox and its configuration.

The inventor has also found that an upper limit of the fan shaft radial bending and/or tilt stiffness is affected by the fundamental properties of the material or materials from which it is made. For example, a maximum stiffness is affected by the engineering limit of the material from which the fan shaft is made. The materials from which the fan shaft is made (often steels) may, for example, have a Young's modulus in the range from 100 to 250 GPa, or 105 to 215 GPa, and optionally around 210 GPa-different grades of steel, or other types of metal, may be selected to achieve different stiffnesses for the same size and geometry. For example, steels with a Young's modulus in the range 190 to 215 GPa, titanium alloys with a Young's modulus in the range 105 to 120 GPa, or a metal such as titanium with a Young's modulus of around 110 GPa may be used in various embodiments. The inventor has found increasing the stiffness outside of the ranges defined herein using materials such as these would lead to excessive weight with no practical gain in performance (e.g. no further practical gain in locating of the fan as described above).

Regarding the first and second bearing separation distances, the inventor has discovered that increasing distance ($d_1$) outside of the range defined herein results in undesirable lateral vibrations caused by low modal frequency vibrations and inadequate fan tip control. The inventor has also found that decreasing $d_1$ outside of the range defined herein would result in design space problems e.g. making it difficult for the gearbox to fit within the engine architecture. For example, the inventor has taken into account the need to fit other components within the engine. The inventor has found that the ranges for the distances specified herein provide a balance of these factors while giving the desired benefits of gearbox isolation and location of the fan.

The inventor has found that increasing the distance between the gearbox output position and the closest supporting bearing forward of the gearbox ($d_2$) defined herein outside of the claimed range would not provide suitable isolation for the gearbox and so would not avoid transmitting damaging loads into it. As described elsewhere, this may be a function of the size and configuration of the gearbox. The inventor has found that decreasing the distance below the specified range would lead to problems relating to the design space available so that the gearbox can fit in the engine.

Regarding the torsional stiffness of the carrier, the inventor has found that the upper limit of the ranges defined is affected by the engineering limits of typical materials chosen for the carrier, which are often steels, and gearbox size. The materials of which the carrier is made (often steels) may, for example, have a Young's modulus in the range from 100 to 250 GPa, or 105 to 215 GPa, and optionally around 210 GPa—different grades of steel, or other types of metal, may be selected to achieve different stiffnesses for the same size and geometry. For example, steels with a Young's modulus in the range 190 to 215 GPa, titanium alloys with a Young's modulus in the range 105 to 120 GPa, or a metal such as titanium with a Young's modulus of around 110 GPa may be used in various embodiments. The inventor has found that increasing the torsional stiffness beyond the ranges defined herein creates excessive component weight for minimal improvement in operation.

The inventor has also found that for the torsional stiffness of the carrier the lower limit of the ranges defined herein is affected by a maximum allowable deflection—the inventor has appreciated that displacement may create mis-alignment in the gears and bearings and that a certain misalignment may be tolerated but that a larger displacement could deleteriously affect running of the engine—a minimum stiffness may therefore be selected to maintain displacement within acceptable bounds.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The output from the gearbox may be directly to a fan shaft, or indirectly to the fan shaft, for example via a spur shaft and/or gear.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust (for example maximum throttle) for the engine at ISA sea level pressure and temperature +15° C. with a fan inlet velocity of 0.25 Mn.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

Whilst in the arrangements described herein the source of drive for the propulsive fan is provided by a gas turbine engine, the skilled person will appreciate the applicability of the gearbox configurations disclosed herein to other forms of aircraft propulsor comprising alternative drive types. For example, the above-mentioned gearbox arrangements may be utilised in aircraft propulsors comprising a propulsive fan driven by an electric motor. In such circumstances, the electric motor may be configured to operate at higher rotational speeds and thus may have a lower rotor diameter and may be more power-dense. The gearbox configurations of the aforesaid aspects may be employed to reduce the rotational input speed for the fan or propeller to allow it to operate in a more favourable efficiency regime. Thus, according to an aspect, there is provided an electric propulsion unit for an aircraft, comprising an electric machine configured to drive a propulsive fan via a gearbox, the gearbox and/or its inputs/outputs/supports and/or the structure by which the fan shaft driving the fan is supported being as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

As used herein, a range "from value X to value Y" or "between value X and value Y", or the like, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

Embodiments will now be described by way of example only, with reference to the Figures, in which.

Figure 1:
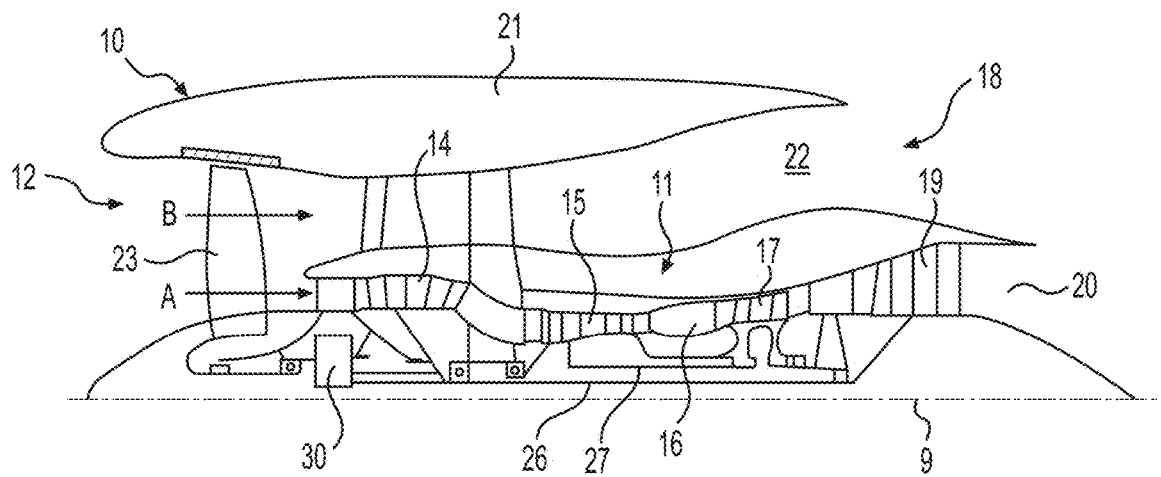
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
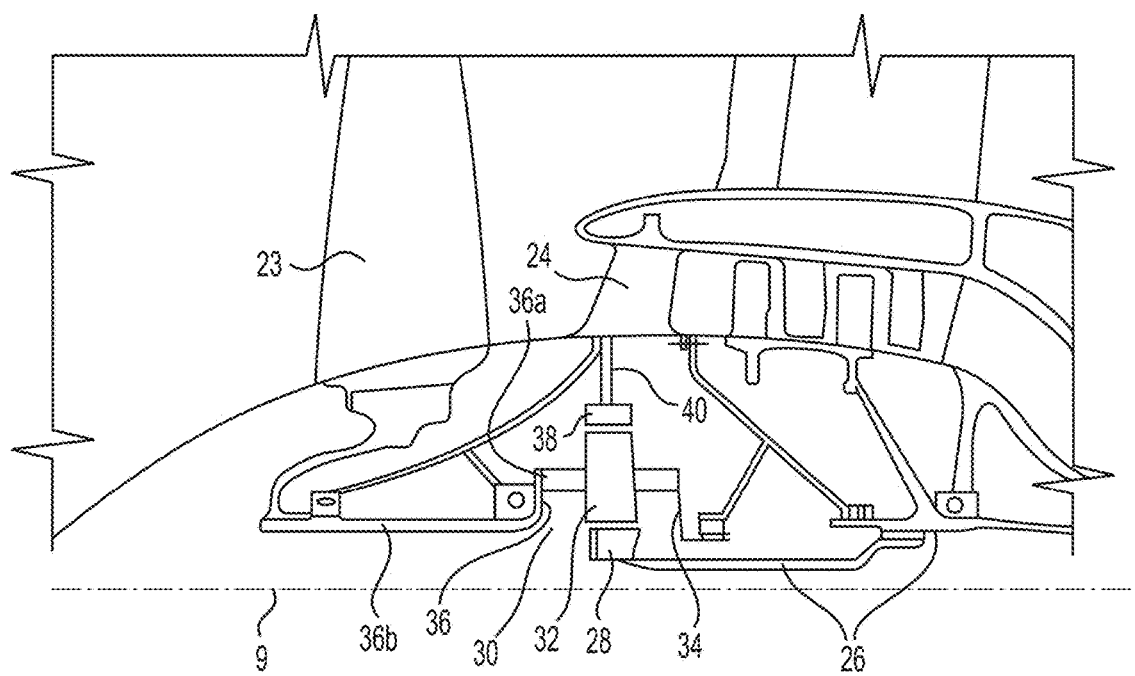
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The linkages 36 may be referred to as a fan shaft 36, the fan shaft 36 optionally comprising two or more shaft portions coupled together. For example, the fan shaft 36 may comprise a gearbox output shaft portion 36a extending from the gearbox 30 and a fan portion 36b extending between the gearbox output shaft portion and the fan 23. In the embodiment shown in FIGS. 1 and 2, the gearbox 30 is a planetary gearbox and the gearbox output shaft portion 36a is connected to the planet carrier 34—it may therefore be referred to as a carrier output shaft 36a. In star gearboxes 30, the gearbox output shaft portion 36a may be connected to the ring gear 38—it may therefore be referred to as a ring output shaft 36a. In the embodiment shown in FIGS. 1 and 2, the fan portion 36b of the fan shaft 36 connects the gearbox output shaft portion 36a to the fan 23. The output of the gearbox 30 is therefore transferred to the fan 23, to rotate the fan, via the fan shaft 36. In alternative embodiments, the fan shaft 36 may comprise a single component, or more than two components. Unless otherwise indicated or apparent to the skilled person, anything described with respect to an engine 10 with a star gearbox 30 may equally be applied to an engine with a planetary gearbox 30, and vice versa.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
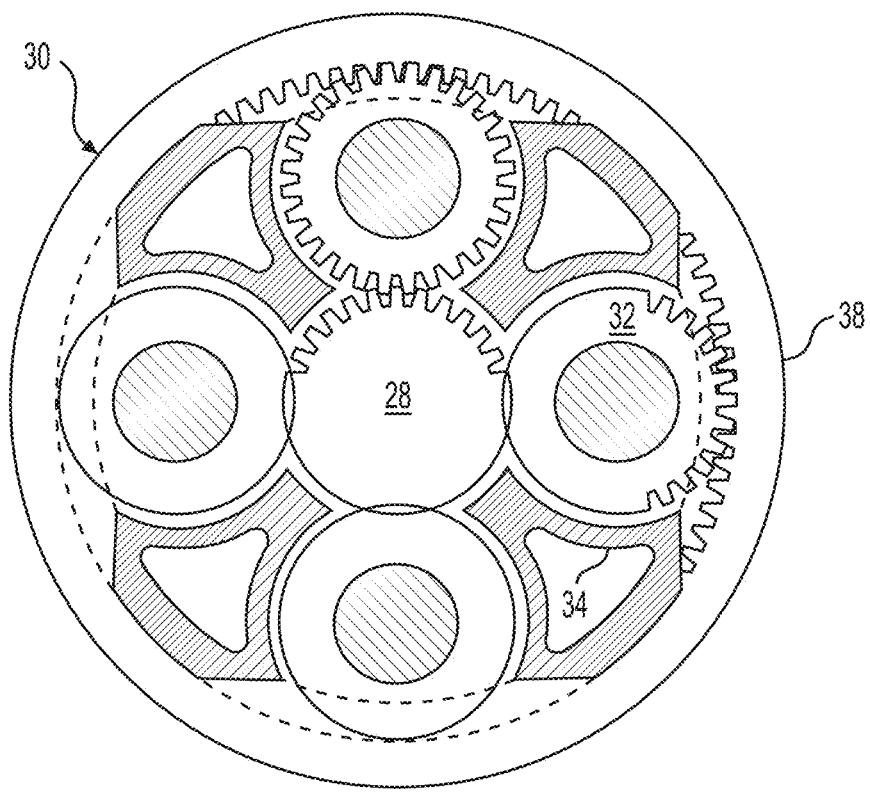
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate. In various other exemplary embodiments the gearbox may be any other type of gearbox, and so may not be an epicyclic gearbox.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility as defined or claimed herein. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2 (for example as described in connection with other embodiments disclosed herein which have a star gearbox arrangement).

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The following general definitions of stiffnesses may be used herein:

Radial Bending Stiffness

Figure 4:
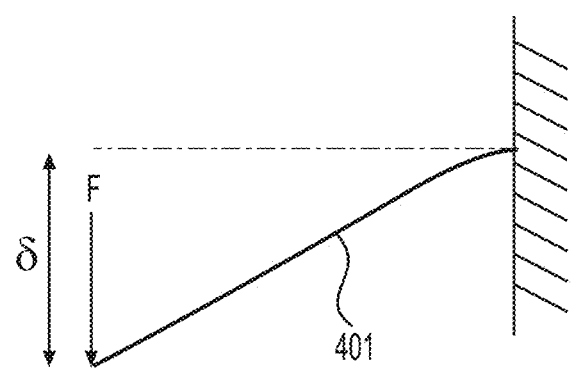
FIG. 4 is a schematic diagram illustrating the radial bending stiffness of a cantilevered beam.

A radial bending stiffness is a measure of deformation for a given force applied in any one selected radial direction (i.e. any direction perpendicular to and passing through the engine axis). The radial bending stiffness is defined with reference to FIG. 4 in terms of the deformation of a cantilevered beam 401. As illustrated in FIG. 4, a force, F, applied at the free end of the beam in a direction perpendicular to the longitudinal axis of the beam causes a linear perpendicular deformation, δ. The radial bending stiffness is the force applied for a given linear deformation i.e. F/δ. In the present application, the radial bending stiffness is taken relative to the rotational axis of the engine 9, and so relates to the resistance to linear deformation in a radial direction of the engine caused by a radial force. The beam, or equivalent cantilevered component, extends along the axis of rotation of the engine, the force, F, is applied perpendicular to the axis of rotation of the engine, along any radial direction, and the displacement δ is measured perpendicular to the axis of rotation, along the line of action of the force. The radial bending stiffness as defined herein has SI units of N/m. In the present application, unless otherwise stated, the radial bending stiffness is taken to be a free-body stiffness i.e. stiffness measured for a component in isolation in a cantilever configuration, without other components present which may affect its stiffness.

When the force is applied perpendicular to the cantilevered beam, and at the free end of the beam, the resultant curvature is not constant but rather increases towards the fixed end of the beam.

Tilt Stiffness

Figure 5:
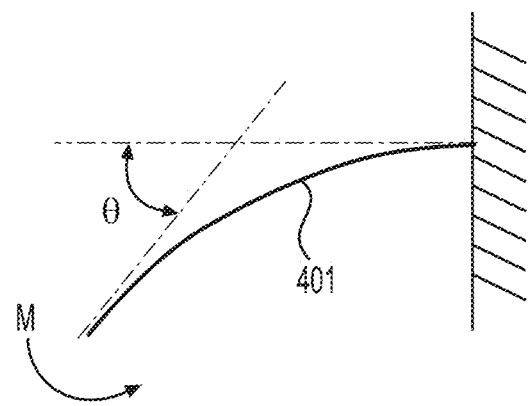
FIG. 5 is a schematic diagram illustrating the tilt stiffness of a cantilevered beam.

A tilt stiffness is defined with reference to FIG. 5, which shows the resulting deformation of a cantilevered beam 401 under a moment M applied at its free end. The tilt stiffness is a measure of the resistance to rotation of a point on the component at which a moment is applied. As can be seen in FIG. 5, an applied moment at the free end of the cantilevered beam induces a constant curvature along the length of the beam between its free and fixed ends. The applied moment M causes a rotation θ of the point at which it is applied. For any component of constant section (like the beam), the angle θ is constant along the length of the component. The tilt stiffness as defined herein therefore has SI units of Nm/rad.

The tilt stiffness may be expressed as an effective linear tilt stiffness for a component having a given radius by expressing the tilt stiffness in terms of a pair of equal and opposite forces, F, acting at either end of that radius (rather than the moment) and the arc displacement at that radius (i.e. displacement measured along a circumference of a circle having that radius). An approximate or overall tilt angle, a, may be defined for the purposes of calculating the effective linear stiffness. The arc displacement may be referred to as rα. The effective linear tilt stiffness is given by the ratio of effective force divided by the displacement, F/rα and has the units N/m.

Torsional Stiffness

Figure 6:
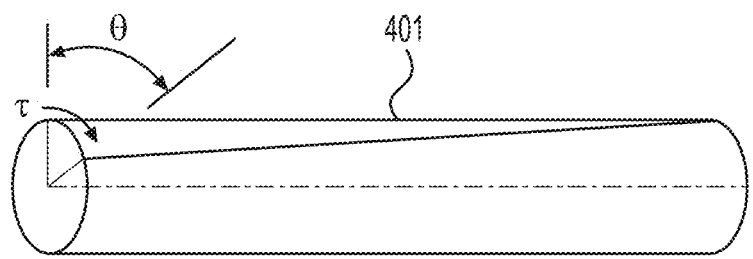
FIG. 6 is a schematic diagram illustrating the torsional stiffness of a shaft.

Torsional stiffness is a measure of deformation for a given torque. FIG. 6 illustrates the definition of the torsional stiffness of a shaft 401 or other body. A torque, τ, applied to the free end of the beam causes a rotational deformation, θ (e.g. twist) along the length of the beam. The torsional stiffness is the torque applied for a given angle of twist i.e. τ/θ. The torsional stiffness has SI units of Nm/rad.

An effective linear torsional stiffness may be determined for a component having a given radius. The effective linear torsional stiffness is defined in terms of an equivalent tangential force applied at a point on that radius (with magnitude of torque divided by the radius) and the distance δ (with magnitude of the radius multiplied by θ) moved by a point corresponding to the rotational deformation θ of the component.

The following general definitions of other parameters may also be used herein:

Torque

Torque, which may also be referred to as moment, is the rotational equivalent of linear force, and can be thought of as a twist to an object.

The magnitude, τ, of torque, τ, of a body depends on three quantities: the force applied (F), the lever arm vector connecting the origin to the point of force application (r), and the angle (A) between the force and lever arm vectors:

$$\tau = r \times F$$
$$\tau = |\tau| = |r \times F| = |r||F|\sin A$$

where

τ is the torque vector and τ is the magnitude of the torque;
r is the position vector or "lever arm" vector (a vector from the selected point on the body to the point where the force is applied);
F is the force vector;
x denotes the cross product; and
A is the angle between the force vector and the lever arm vector (sin (A) is therefore one when the force vector is perpendicular to the position vector, such that τ=rF, i.e. magnitude of the force multiplied by distance between the selected point on the body and the point of application of the force).

Torque has dimensions of [force]×[distance] and may be expressed in units of Newton metres (N·m).

The net torque on a body determines the rate of change of the body's angular momentum.

Moment of Inertia

Moment of inertia, otherwise known as angular mass or rotational inertia, is a quantity that determines the torque needed for a desired angular acceleration of a body about a rotational axis—this is substantially equivalent to how mass determines the force needed for a particular acceleration.

Moment of inertia depends on the body's mass distribution and the axis chosen, with larger moments requiring more torque to change the body's rotation rate. Moment of inertia has dimensions of [mass]×[distance] 2 and may be expressed in units of kilogram meter squared (kg·m²).

Moment of inertia/is defined as the ratio of the net angular momentum L of a body to its angular velocity ω around a principal axis:

$$I = \frac{L}{\omega}$$

Provided that the shape of the body does not change, its moment of inertia appears in Newton's law of motion as the ratio of an applied torque τ on a body to the angular acceleration α around the principal axis:

τ=Iα

For bodies constrained to rotate in a plane, only the moment of inertia about an axis perpendicular to the plane matters, and I can therefore be represented as a scalar value. The skilled person would appreciate that a fan of a gas turbine engine (and more generally a fan rotor of the gas turbine engine comprising the fan disc and blades, and optionally also the fan shaft and/or other related components) is constrained to rotate in only one plane—a plane perpendicular to the engine axis—and that the fan's moment of inertia can therefore be defined by a single, scaler, value.

The fan's moment of inertia about the engine axis can therefore be measured or defined using any standard methodology.

More specific definitions of stiffnesses and other parameters relating to embodiments described herein are provided below for ease of understanding.

Fan Shaft Mounting Structure Stiffness

Figure 7:
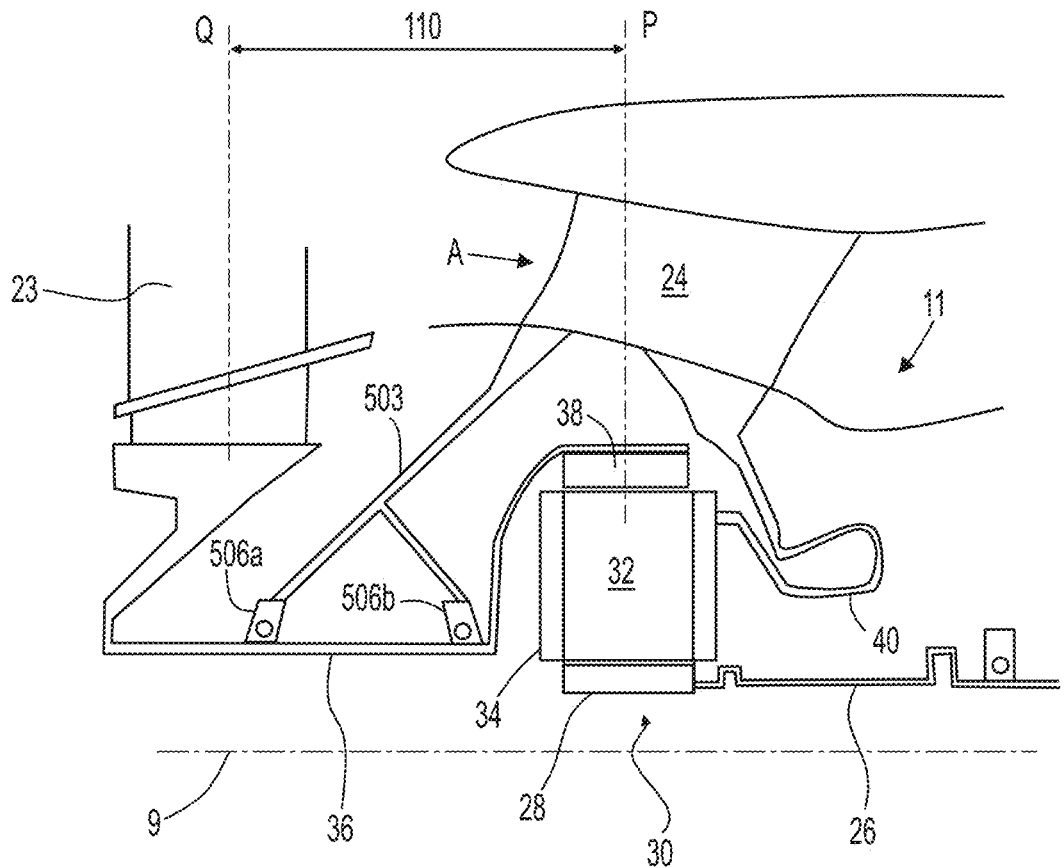
FIG. 7 is a schematic close up sectional side view of a portion of a gas turbine engine around its gearbox.

An embodiment of the gas turbine engine having a star configuration gearbox is shown in FIG. 7. Corresponding reference numbers to those used when describing the embodiment of FIGS. 1 and 2 have been used. FIG. 7 illustrates a close up of the engine core that shows the mounting of the fan shaft 36. The fan shaft 36 is mounted within the engine by a fan shaft mounting structure 503. The fan shaft mounting structure 503 comprises at least two bearings connected to or otherwise in engagement with the fan shaft at points spaced apart axially along the length of the engine. The fan shaft mounting structure 503 may take a number of different forms, and may comprise one or more separate supporting structures provided to support the fan shaft. It may also include other structures provided to support the fan shaft such as inter-shaft bearings. It therefore includes any supporting structure that extends between a bearing in contact with the fan shaft and a stationary structure of the engine (e.g. of the engine core).

In the arrangement shown in FIG. 7, the fan shaft mounting structure 503 comprises two bearings, a first supporting bearing 506a and a second supporting bearing 506b, via which it is coupled to the fan shaft 36. The supporting bearings 506a, 506a are spaced apart along the axial length of the fan shaft 36. In the described arrangement, both supporting bearings 506a, 506b are provided at positions that are forward of the gearbox 30. In other arrangements, one of the two supporting bearing 506a, 506b used to support the fan shaft 36 may be located at a position rearward of the gearbox 30, as will be described later. In yet other arrangements, more than two supporting bearings may be provided as part of the fan shaft mounting structure or fan shaft mounting structure.

In addition to the supporting bearings 506a, 506b described above the fan shaft mounting structure may also comprise additional non-supporting bearings. These may be additional softly mounted bearing or provided as part of a gearbox output shaft supporting structure as described in more detail later. The supporting bearings may be defined as those having a primary function of locating the fan shaft within the engine, rather than having a primary function of aligning other components such as the gearbox components.

The supporting bearings may be considered to be those transmitting an equal share of the total load that is an order of magnitude greater than any non-supporting bearing. More specifically, a supporting bearing may be defined as any bearing that transmits a load greater than 1/(10n) of the total load transmitted by the mounting structure of which it is a part, where n is the total number of bearings provided in that mounting structure. For example, for a mounting structure having three bearings, any that contribute less than ⅓₀th (i.e. (⅓) 10) would be considered insignificant and so not considered to be supporting bearings within the meaning of this application.

FIG. 7 shows a schematic example of a suitable fan shaft mounting structure 503. Other forms of mounting structure may however be used to support the fan shaft. The fan shaft mounting structure 503 is coupled to the stationary support structure 24 of the engine so as to provide a stationary mounting for the fan shaft within the engine (with rotation relative to the static structure of the engine core provided by the bearings 506a, 506b). In the presently described arrangement, the stationary support structure 24 is an engine section stator (ESS) that acts as both a structural component to provide a stationary mounting for components such as the fan shaft 36, and as a guide vane provided to direct airflow from the fan 23. In other embodiments, the stationary supporting structure 24 may comprise a strut extending across the core gas flow path and a separate stator vane provided to direct airflow, or any other suitable stationary structure relative to which the fan shaft may be mounted.

The fan shaft mounting structure 503 is considered to comprise the component or components extending between the point of contact between each of the bearings 506a, 506b and the fan shaft 36 and the stationary support structure 24. Any number of separate components may be provided between these points in order to provide a coupling between the fan shaft 36 and the stationary support structure 24. The fan shaft mounting structure 503 is shown schematically in FIG. 7 for illustration only and other shapes and arrangements may be provided. For example, as discussed above additional bearings may be provided. These may be non-supporting softly mounted bearings, and/or additional bearings provided for redundancy in cases of high load transmission by the support structure. These additional bearings may be provided forward or rearward of each of the first and second bearings 506a, 560b. Any additional bearings provided for redundancy may protect against failure modes of the primary components, either in response to normal operating loads (e.g. fatigue) or higher loads from failure cases (e.g. Fan Blade Off). In some embodiments, any of the bearings (e.g. the first and/or second bearings 506a, 506b) may be double bearings formed by providing a pair of bearings in the same bearing housing. This arrangement may be used, for example, when the magnitude of the normal operating load would exceed that which would give reliable service with the use of single bearings.

The fan shaft mounting structure 503 has a degree of flexibility characterized by its radial stiffness and its tilt stiffness.

Figure 8:
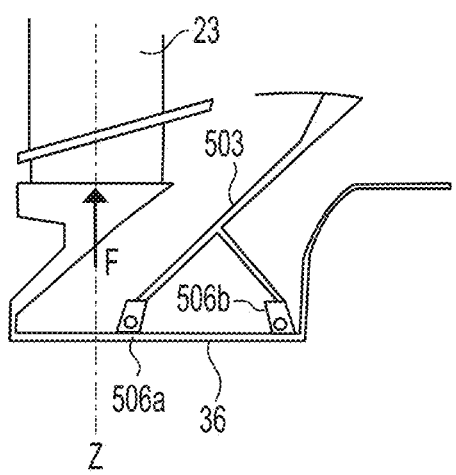
FIGS. 8 and 9 are schematic diagrams illustrating the radial bending stiffness a fan shaft mounting structure.
Figure 9:
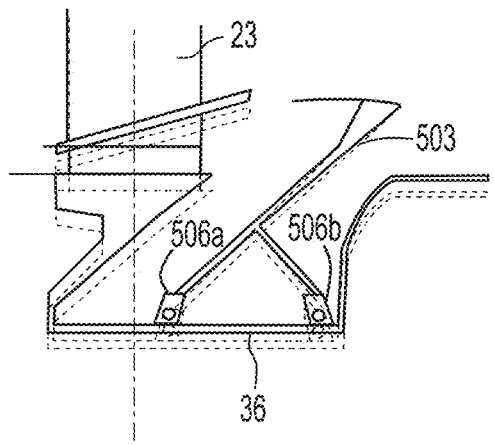

Fan Shaft Mounting Structure Radial Bending Stiffness:

The radial bending stiffness of the fan shaft mounting structure 503 is defined with reference to FIGS. 8 and 9. The radial bending stiffness represents the resistance of the fan shaft mounting structure 503 to a radial force. The radial bending stiffness is determined by treating the components forming the fan shaft mounting structure 503 as a free body that is fixed at its point (or points) of connection with the stationary support structure (or structures) of the engine core (e.g. ESS 24). In order to evaluate the radial bending stiffness of the fan shaft mounting structure 503 a radial force F is applied to a point on the fan (e.g. at the interface between the fan blades and the fan hub) along its axial centreline Z (i.e. along an axial centreline of the blades forming the fan). Specifically, the radial force F is applied along the fan axial centreline (wherein the fan axial centreline is defined as the axial midpoint of the fan blades, e.g. the midpoint of the fan blades in an axial plane of the engine).

Application of this force causes a radial displacement δ of the point of contact between the supporting bearings 506a, 506b and the fan shaft. Deformation of the fan shaft mounting structure 503 caused by the applied force is illustrated in FIG. 9, with the shape when no force is applied shown in broken lines for comparison. The force, F, is shown radially away from the engine axis 9, but could equivalently be a force in a radial direction toward the centreline 9.

Figure 10:
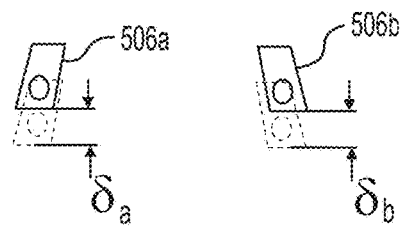
FIG. 10 is a close-up view showing only the bearings supporting the fan shaft to illustrate the measurement of the radial bending stiffness.

The radial bending stiffness of the fan shaft mounting structure 503 is defined as the force F divided by the average displacement at the supporting bearings provided as part of the fan shaft mounting structure forward of the gearbox 30. These displacements are illustrated in the close-up view of FIG. 10 in which only the bearings are shown for ease of explanation. For the arrangement shown in FIGS. 9 and 10, the radial bending stiffness is therefore given by:

$$\frac{F}{1/2(\delta_a + \delta_b)}$$

The radial bending stiffness of the fan shaft mounting structure has units of N/m.

In various embodiments, the radial bending stiffness of the fan shaft mounting structure may be greater than or equal to $7.00 \times 10^8$ N/m and optionally greater than or equal to $1.25 \times 10^9$ N/m.

In some embodiments, for example in embodiments in which the fan diameter is in the range from 240 to 280 cm, the radial bending stiffness of the fan shaft mounting structure may be greater than or equal to $7.0 \times 10^8$ N/m. In some embodiments, for example in embodiments in which the fan diameter is in the range from 330 to 380 cm, the radial bending stiffness of the fan shaft mounting structure may be greater than or equal to $1.4 \times 10^9$ N/m.

In various embodiments, the radial bending stiffness of the fan shaft mounting structure may be in the range from $7.00 \times 10^8$ N/m to $6.00 \times 10^{11}$ N/m, and optionally in the range from $1.25 \times 10^9$ N/m to $2.0 \times 10^{11}$ N/m.

In some embodiments, for example in embodiments in which the fan diameter is in the range from 240 to 280 cm, the radial bending stiffness of the fan shaft mounting structure may be in the range from $7.0 \times 10^8$ N/m to $5.0 \times 10^{11}$ N/m and optionally in the range from $7.0 \times 10^8$ N/m to $2.3 \times 10^9$ N/m (and may be equal to $1.5 \times 10^{11}$ N/m).

In some embodiments, for example in embodiments in which the fan diameter is in the range from 330 to 380 cm, the radial bending stiffness of the fan shaft mounting structure may be in the range from $1.4 \times 10^9$ N/m to $6.0 \times 10^{11}$ N/m, and optionally in the range from $1.4 \times 10^9$ N/m to $3.0 \times 10^9$ N/m (and may be equal to $2.2 \times 10^9$ N/m).

Figure 11:
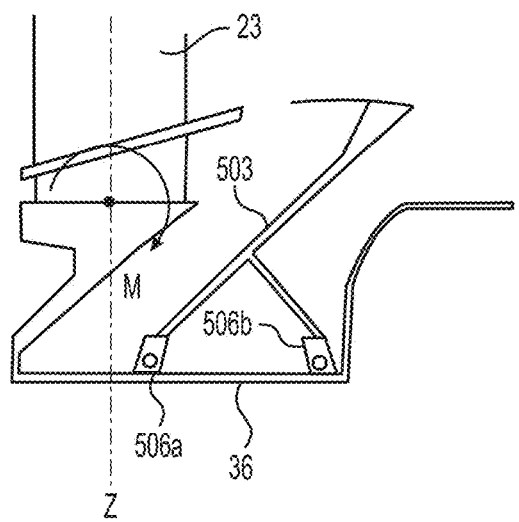
FIGS. 11 and 12 are schematic diagrams illustrating the tilt stiffness the fan shaft mounting structure.
Figure 12:
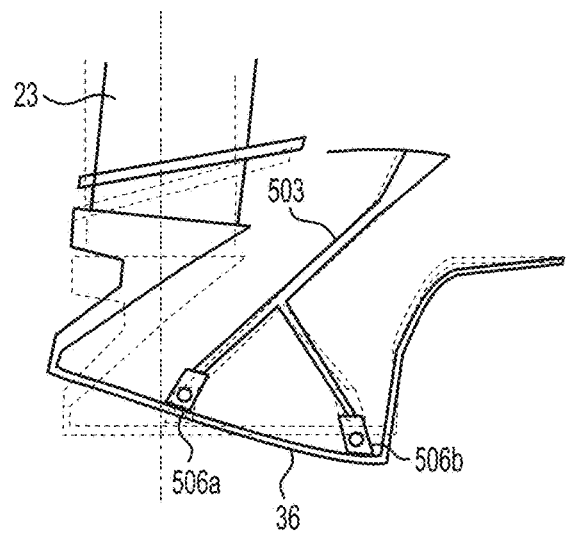
Figure 13:
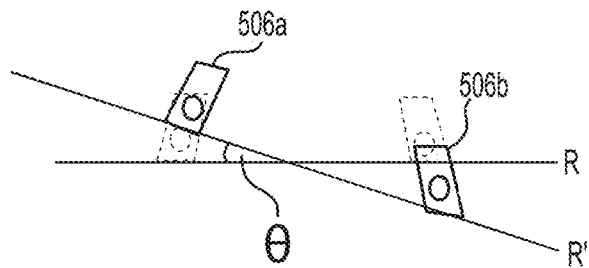
FIG. 13 is a close-up view showing only the bearings supporting the fan shaft to illustrate the measurement of the tilt stiffness.

Fan Shaft Mounting Structure Tilt Stiffness:

The tilt stiffness of the fan shaft mounting structure 503 is determined in a similar way to the radial bending stiffness except that a moment, M, is applied at a point on the fan blade axial centre line in place of the Force, F. An example of how the tilt stiffness can be determined is illustrated in FIGS. 11 and 12. The fan shaft mounting structure tilt stiffness represents its resistance to an applied moment. Referring to FIGS. 11 and 12, moment M is applied to the axial centre line of the fan blades (i.e. the same place as the force, F, in FIG. 8 described above). The tilt stiffness is determined by calculating a straight line shaft angle between a pair of bearing positions at which the fan shaft is supported. The application of the moment M causes displacements in opposite directions at two bearing positions as illustrated in FIG. 13, which shows a close-up view including only the bearings for ease of explanation. The straight line angle θ is defined as the change in angle of an axis R extending through the point of contact between the bearings 506a, 506b and the fan shaft when the moment M is applied. As can be seen in FIG. 13, the angle θ extended between axis R when no moment is applied and R' when moment M is applied. The tilt stiffness is defined as M/θ, and has units of Nm/rad.

The tilt stiffness of the fan shaft mounting structure is defined by measuring the angle θ between the first two supporting bearings in a direction moving reward from the fan. In the arrangement shown in FIGS. 11, 12 and 13 this corresponds to supporting bearings 506a, 506b provided forward of the gearbox. In other arrangements the tilt stiffness may be defined using the displacement at a supporting bearing rearward of the gearbox (e.g. if only one supporting bearing is provided forward of the gearbox).

In various embodiments, the tilt stiffness of the fan shaft mounting structure may be greater than or equal to $1.50 \times 10^7$ Nm/rad, and optionally greater than or equal to $2.1 \times 10^7$ Nm/rad.

In some embodiments, for example in embodiments in which the fan diameter is in the range from 240 to 280 cm, the tilt stiffness of the fan shaft mounting structure may be greater than or equal to $2.1 \times 10^7$ Nm/rad or greater than or equal to $2.3 \times 10^7$ Nm/rad. In some embodiments, for example in embodiments in which the fan diameter is in the range from 330 to 380 cm, the tilt stiffness of the fan shaft mounting structure may be greater than or equal to $3.8 \times 10^7$ Nm/rad or greater than or equal to $7.3 \times 10^7$ Nm/rad.

In various embodiments, the tilt stiffness of the fan shaft mounting structure may be in the range from $1.5 \times 10^7$ Nm/rad to $2.70 \times 10^{10}$ Nm/rad, and optionally in the range from $2.1 \times 10^7$ Nm/rad to $1 \times 10^{10}$ Nm/rad.

In some embodiments, for example in embodiments in which the fan diameter is in the range from 240 to 280 cm, the tilt stiffness of the fan shaft mounting structure may be in the range from $2.1 \times 10^7$ Nm/rad to $1.9 \times 10^{10}$ Nm/rad and optionally in the range from $2.3 \times 10^7$ Nm/rad to $4.3 \times 10^7$ Nm/rad (and may be equal to $3.3 \times 10^7$ Nm/rad).

In some embodiments, for example in embodiments in which the fan diameter is in the range from 330 to 380 cm, the tilt stiffness of the fan shaft mounting structure may be in the range from $3.8 \times 10^7$ Nm/rad to $2.7 \times 10^{10}$ Nm/rad, and optionally in the range from $7.1 \times 10^7$ Nm/rad to $9.1 \times 10^7$ Nm/rad (and may be equal to $8.1 \times 10^7$ Nm/rad).

Equivalent radial and tilt stiffness may be defined for other arrangements of fan shaft mounting structures. Various other arrangements of fan shaft mounting structure 503 are shown in FIGS. 14 to 19. These embodiments are provided as examples. The skilled person will understand that others arrangements are possible and are considered to fall within the scope of the present disclosure.

Figure 14:
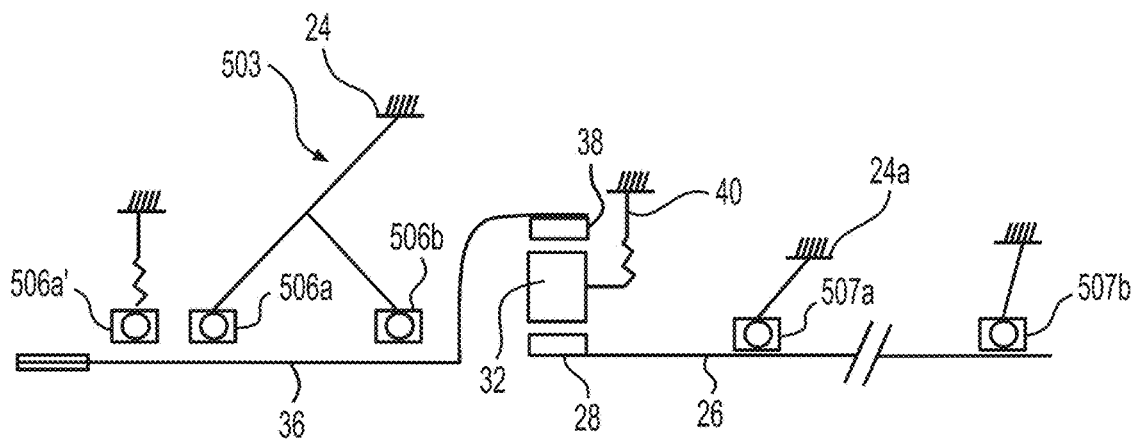
FIGS. 14 to 19 are schematic diagrams illustrating various embodiments of the fan shaft mounting structure.

FIG. 14 shows a schematic representation of an arrangement in which the fan shaft 36 is supported by the fan shaft mounting structure already described having first and second supporting bearings 506a, 506b forward of the gearbox 30. In all of FIGS. 14 to 19 the core shaft 26 is supported by two core shaft bearings 507a, 507b. These bearing are connected to a stationary structure 24a of the engine via a core shaft support structure. In the arrangement of FIG. 14, the fan shaft mounting structure 503 comprises both the first and second bearings 506a, 506b and the structure linking them to the stationary support structure 24 (i.e. the fan shaft support structure 504). Any additional bearing or bearings provided as part of this structure is included in the fan shaft mounting structure 503. In the arrangement of FIG. 14, a non-supporting softly mounted bearing 506a' is also provided. As discussed above, the radial bending or tilt stiffness is determined without considering displacements at this non-supporting bearing 506a'.

Figure 15:
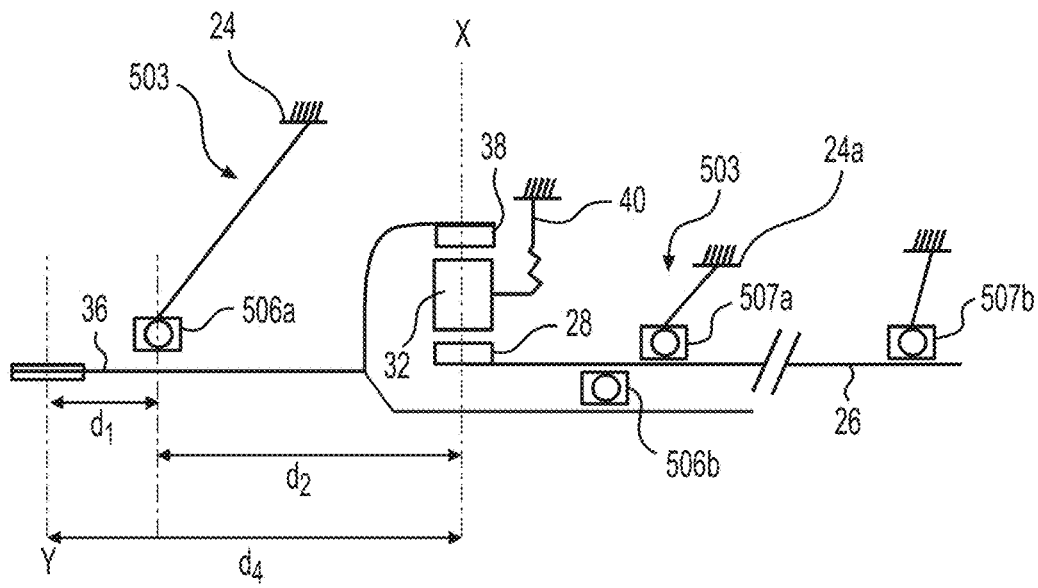

FIG. 15 shows an arrangement in which the fan shaft is supported by a first supporting bearing 506a forward of the gearbox 30 and a second supporting bearing 506b located at a position rearward of the gearbox 30. In this embodiment, the fan shaft 36 extends through the gearbox 30 and is mounted by supporting bearings 506a, 506b either side of the gearbox. The first supporting bearing 506a is therefore located forward of the gearbox 30 and the second supporting bearing 506b is located rearward of the gearbox 30. In this embodiment, the second supporting bearing 506b is an inter-shaft bearing between the fan shaft 36 and the core shaft 26. For this arrangement the radial bending stiffness is determined by measuring the displacement at the first supporting bearing 506a only. The tilt stiffness is however determined by measuring the change in angle of an axis linking the first and second supporting bearings 506a, 506b.

Figure 16:
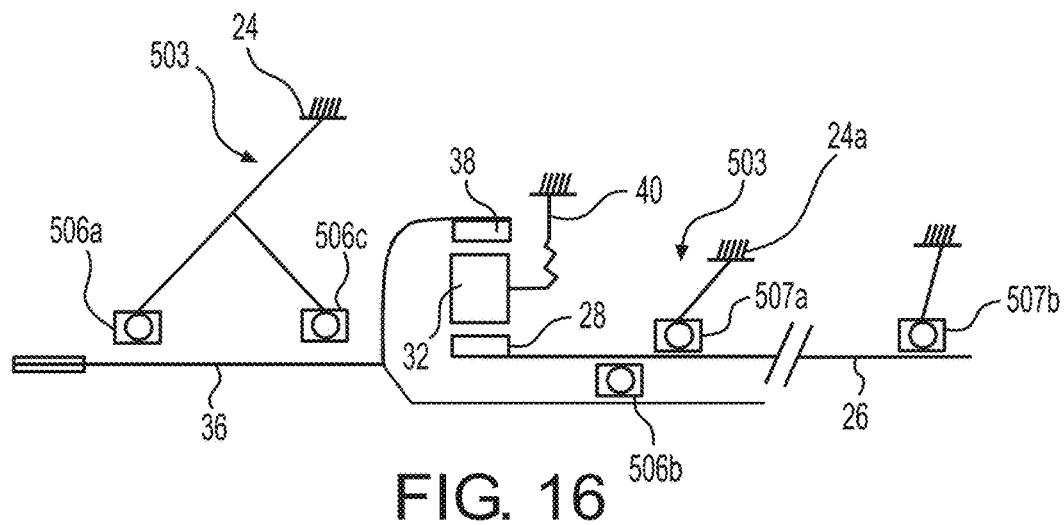

FIG. 16 shows an arrangement in which the fan shaft is supported by the first and second supporting bearings 506a, 506b either side of the gearbox. In this embodiment, the fan shaft mounting structure 503 further comprises a third supporting bearing 506c that is located between the first supporting bearing 506a and the gearbox 30. In this arrangement the radial bending stiffness of the fan shaft mounting structure is determined by measuring an average displacement at the first and third supporting bearings 506a, 506c. Any displacement at of the second supporting bearing 506b is not included as it is not forward of the gearbox 30. The tilt stiffness is determined by measuring the change in angle of an axis linking the first and third supporting bearings 506a, 506c as they are the first two bearings rearward of the fan.

Figure 17:
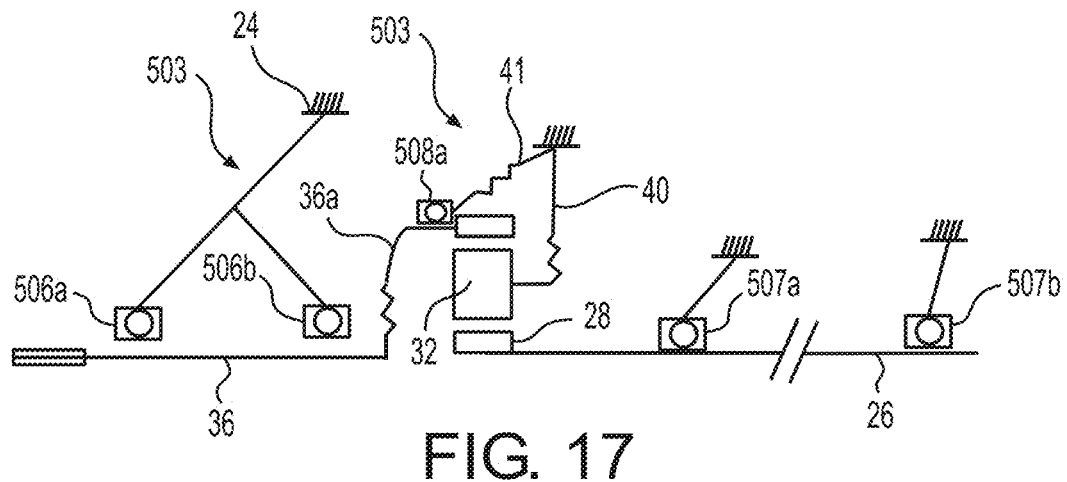

FIG. 17 shows a modification to the arrangement of FIG. 14 in which the fan shaft 36 comprises a gearbox output shaft 36a. The gearbox output shaft 36a forms a flexible portion of the fan shaft 36 (i.e. more flexible relative to an intermediate portion, e.g. the fan portion 36a, of the fan shaft to which it is connected) at the end at which it connects to the gearbox 30. The gearbox output shaft 36a is supported by a bearing 508a forming part of a gearbox output shaft support structure 41. In this embodiment, the fan shaft mounting structure 503 therefore comprises both the first and second bearings 506a, 506b and the structure linking them to the stationary structure 24 (i.e. the fan shaft support structure 504) and the gearbox output shaft support structure 41 including its bearing 508a. As the bearing 508a of the gearbox output shaft support structure is a non-supporting bearing it is not taken into account when measuring the radial bending stiffness. For this arrangement the radial bending stiffness is again determined by measuring the average of the displacement at the first and second supporting bearings 506a, 506b. The tilt stiffness is also measured at the first and second bearings 506a, 506b.

Figure 18:
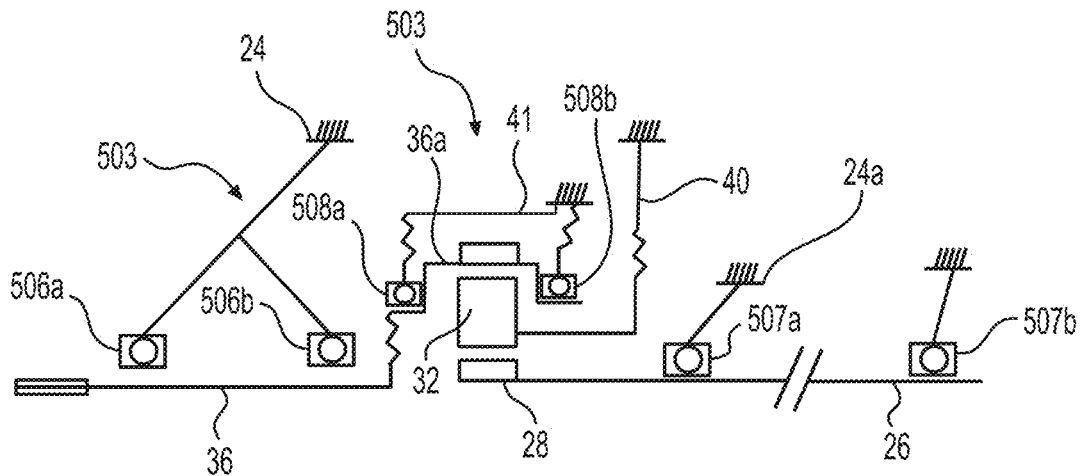

FIG. 18 shows an arrangement in which the gearbox output shaft 36a extends in an axial direction forward and rearwards of the gearbox 30, and is supported either side of the gearbox 30 by a first gearbox output shaft bearing 508a, and a second gearbox output shaft bearing 508b. Both the first and second gearbox output shaft bearings 508a, 508b form part of the gearbox output shaft supporting structure 41 and so are connected to a stationary structure of the engine. In this arrangement, the fan shaft mounting structure 503 comprises both the first and second bearings 506a, 506b and the structure linking them to the stationary support structure 24 (i.e. the fan shaft support structure 504) and the gearbox output shaft support structure 41 including its two bearings. Again the output shaft bearings 508a, 508b are not included in the measurement of the radial bending stiffness of the fan shaft mounting structure as they are non-supporting bearings. The tilt stiffness is also measured at the first and second supporting bearings.

Figure 19:
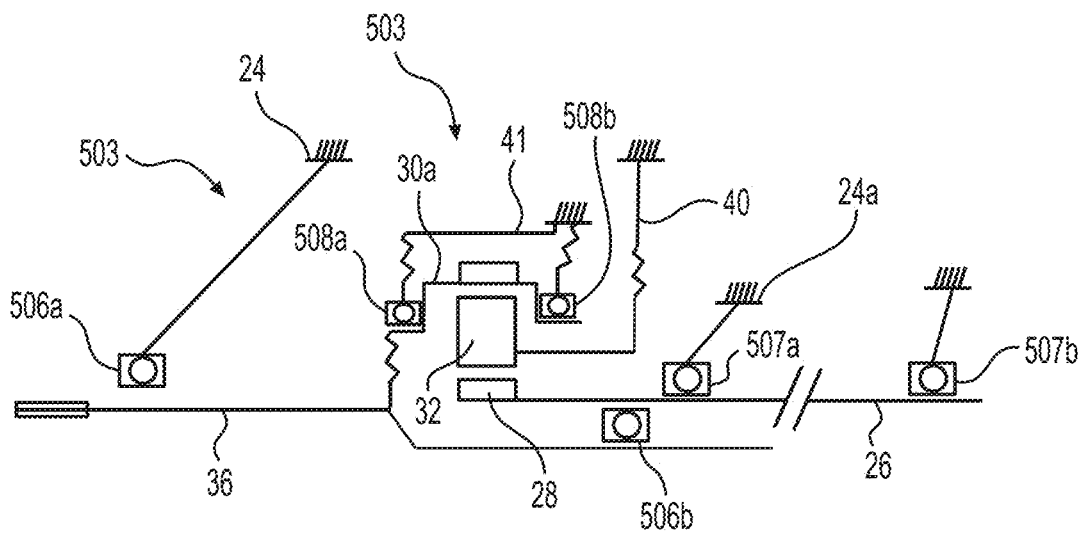

FIG. 19 shows an arrangement having the same gearbox output shaft support as that of FIG. 16, but in which the second bearing 506b provided to support the fan shaft 36 is provided rearward of the gearbox 30 as described in connection with FIG. 16. In this arrangement, the fan shaft mounting structure includes: the fan shaft support structure 504; the gearbox support structure 41 and its bearings; and the inter-shaft bearing 506b and the components linking it to the stationary structure of the engine 24a. The radial bending stiffness is determined by measuring a displacement of the first supporting bearing 506a. Any displacement at the second supporting bearing 506b is not included as it is not forward of the gearbox. Any displacement at the gearbox output shaft bearings 508a, 508b is also not included as they are non-supporting bearings. The tilt stiffness is determined by measuring the angle of an axis linking the first supporting bearing 506a and the second supporting bearing 506b.

Fan Shaft Stiffness

The stiffness of the fan shaft is defined with reference to FIGS. 20 to 26. The fan shaft 36 is defined as the torque transfer component that extends from the output of the gearbox to the fan input. It therefore includes part or all of any gearbox output shaft and fan input shaft that may be provided between those points. For the purposes of defining the stiffness of the fan shaft 36 it is considered to extend between a fan input position and a gearbox output position, and includes all of the torque transfer components between those points. It does not therefore include any components of the gearbox itself (e.g. the planet carrier or connecting plate coupled to it) which transmit discrete forces, rather than the fan shaft torque. The gearbox output position therefore may be defined as the point of connection between the fan shaft 36 and the gearbox 30. The fan input position may be defined as the point of connection between the fan shaft 36 and the fan.

Figure 20:
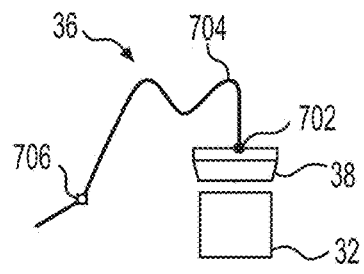
FIG. 20 is a schematic diagram illustrating the gearbox output position for a gearbox in a star configuration.

Referring to FIG. 20, where the gearbox is in a star configuration, the gearbox output position is defined as the point of connection 702 between the ring gear 38 and the fan shaft 36. More specifically, it is the point of connection to the annulus of the ring gear 38 (with any connection component extending from the outer surface of the annulus being considered to be part of the ring gear). Where the point of connection is formed by an interface extending in a direction having an axial component, the point of connection is considered to be the axial centreline of that interface as illustrated in FIG. 22.

Figure 21:
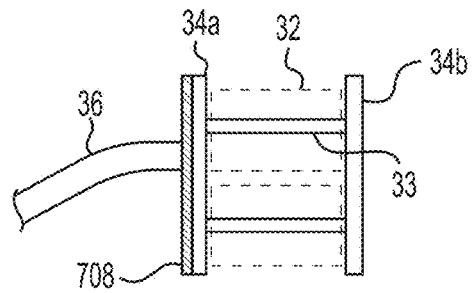
FIG. 21 is a schematic diagram illustrating the gearbox output position for a gearbox in a planetary configuration.

The fan shaft 36 includes all torque transmitting components up to the point of connection 702 with the ring gear 38. It therefore includes any flexible portions or linkages 704 making up the fan shaft 36 that may be provided, and any connection(s) 706 (e.g. spline connections) between them.

Where the gearbox 30 is in a planetary configuration, the gearbox output position is again defined as the point of connection between the fan shaft 36 and the gearbox 30. An example of this is illustrated in FIG. 21, which shows a carrier comprising a forward plate 34a and rearward plate 34b, with a plurality of pins 33 extending between them and on which the planet gears are mounted. The fan shaft 36 is connected to the forward plate 34a via a connection 708 (e.g. a spline connection). In an embodiment such as this, the gearbox output position is taken as any point on the interface between the fan shaft 36 and the forward plate 34a. The forward plate 34a is considered to transmit discrete forces, rather than a single torque, and so is taken to be part of the gearbox 30 rather than the fan shaft. FIG. 21 shows only one example of a type of connection between the fan shaft and planet carrier 34. In embodiments having different connection arrangements, the gearbox output position is still taken to be at the interface between components transmitting a torque (i.e. that are part of the fan shaft) and those transmitting discrete forces (e.g. that are part of the gearbox). The spline connection 708 is only one example of a connection that may be formed between the fan shaft and gearbox (i.e. between the fan shaft and the forward plate 34b in the presently described arrangement). In other embodiments, the interface which forms the gearbox output position may be formed by, for example, a curvic connection, a bolted joint or other toothed or mechanically dogged arrangement.

Figure 22:
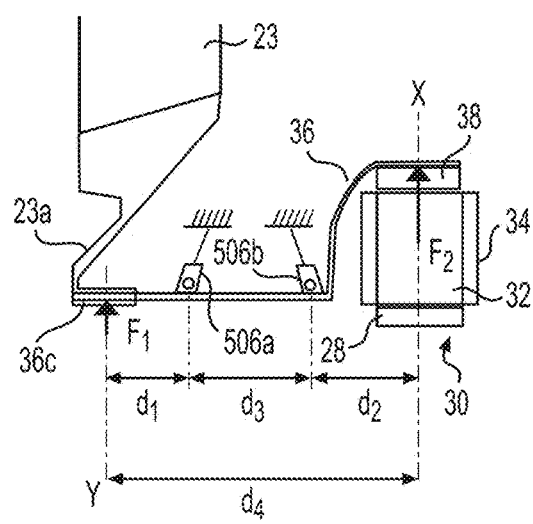
FIGS. 22 and 23 are schematic diagrams illustrating fan shaft end radial bending stiffnesses.

Referring to FIG. 22, the fan input position is defined as a point on the fan shaft at the axial midpoint of the interface between the fan and the fan shaft. In the presently described arrangement, the fan 23 comprises a support arm 23a arranged to connect the fan 23 to the fan shaft 36. The support arm 23a is connected to the fan shaft by a spline coupling 36c (shown in FIG. 22) that extends along the length of a portion of the fan shaft 36. The fan input position is defined as the axial midpoint of the spline coupling as indicated by axis Y in FIG. 22. The spline coupling shown in FIG. 22 is only one example of a coupling that may form the interface between the fan and fan shaft. In other embodiments, for example, a curvic connection, a bolted joint or other toothed or mechanically dogged arrangement may be used.

Figure 26:
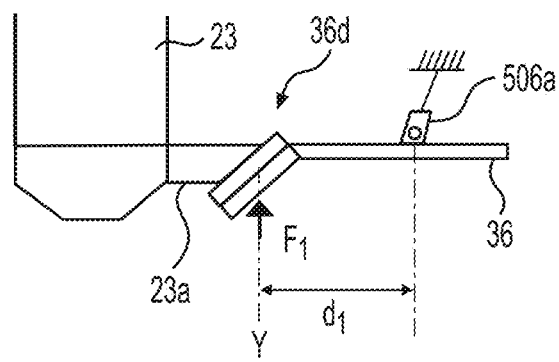
FIG. 26 is a schematic diagram illustrating an alternative interface between a fan shaft and fan.

FIG. 26 illustrates an arrangement in which an alternative coupling is provided between the fan 23 and the fan shaft 36. Similarly to FIG. 22, the fan 23 is coupled to the fan shaft 36 via a support arm 23a. In this arrangement however, a flange coupling 36d is provided between the support arm 23a and the fan shaft 36. In this embodiment, the support arm 23a is connected at the rear of the fan hub. The flange coupling 36d may be a curvic coupling. In other embodiments, other forms of flange coupling may be provided. In the embodiment of FIG. 26, the fan input position is the axial midpoint of the flange coupling.

The fan shaft 36 has a degree of flexibility characterized by its radial bending stiffness and tilt stiffness.

Fan Shaft End Stiffness at Fan Input and Gearbox Output:

The stiffness of each end of the fan shaft where it couples to the fan 23 and the gearbox 30 is defined with reference to FIGS. 22 to 25.

The radial bending stiffness of the fan shaft 36 at the input to the fan 23 is measured by applying a force $F_1$ to the fan shaft at the fan shaft input position defined above (illustrated in FIG. 22). The fan shaft 36 is treated as a free body, and is held fixed at the position of all of bearing positions at which it is supported i.e. the first and second supporting bearings 506a,506b in the embodiment of FIG. 22. As a result of the application of the force $F_1$ the fan shaft 36 deforms so that the fan shaft input position is displaced by a distance of $\delta_1$ (see FIG. 23). The radial bending stiffness of the fan shaft 36 at the input to the fan 23 is then given by $F_1/\delta_1$.

In various embodiments, the radial bending stiffness of the fan shaft at the input to the fan may be greater than or equal to $3.00 \times 10^6$ N/m, and optionally greater than or equal to $6.3 \times 10^6$ N/m.

In some embodiments, for example in embodiments in which the fan diameter is in the range from 240 to 280 cm, the radial bending stiffness of the fan shaft at the input to the fan may be greater than or equal to $6.4 \times 10^6$ N/m. In some embodiments, for example in embodiments in which the fan diameter is in the range from 330 to 380 cm, the radial bending stiffness of the fan shaft at the input to the fan may be greater than or equal to $6.9 \times 10^6$ N/m or greater than or equal to $8.9 \times 10^6$ N/m.

In various embodiments, the radial bending stiffness of the fan shaft at the input to the fan may be in the range from $3.00 \times 10^6$ N/m to $2.00 \times 10^9$ N/m, and optionally in the range from $6.3 \times 10^6$ N/m to $1.0 \times 10^9$ N/m.

In some embodiments, for example in embodiments in which the fan diameter is in the range from 240 to 280 cm, the radial bending stiffness of the fan shaft at the input to the fan may be in the range from $6.4 \times 10^6$ N/m to $1.0 \times 10^9$ N/m and optionally in the range from $6.4 \times 10^6$ N/m to $7.6 \times 10^6$ N/m (and may be equal to $7.0 \times 10^6$ N/m).

In some embodiments, for example in embodiments in which the fan diameter is in the range from 330 to 380 cm, the radial bending stiffness of the fan shaft at the input to the fan may be in the range from $6.9 \times 10^6$ N/m to $2.0 \times 10^9$ N/m, and optionally in the range from $8.9 \times 10^6$ N/m to $1.1 \times 10^7$ N/m (and may be equal to $9.9 \times 10^6$ N/m).

Figure 24:
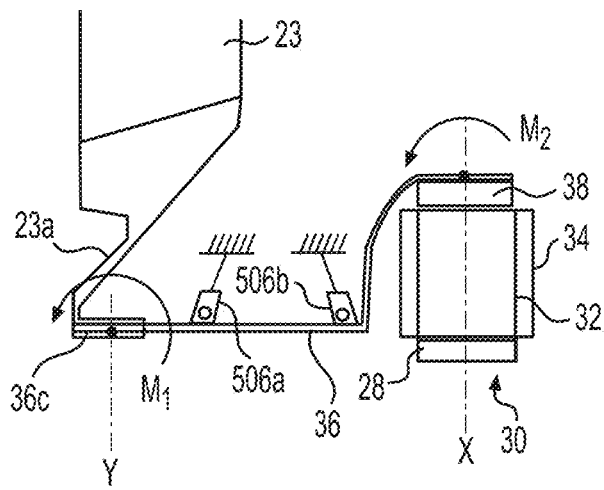
FIGS. 24 and 25 are schematic diagrams illustrating fan shaft end tilt stiffnesses.
Figure 25:
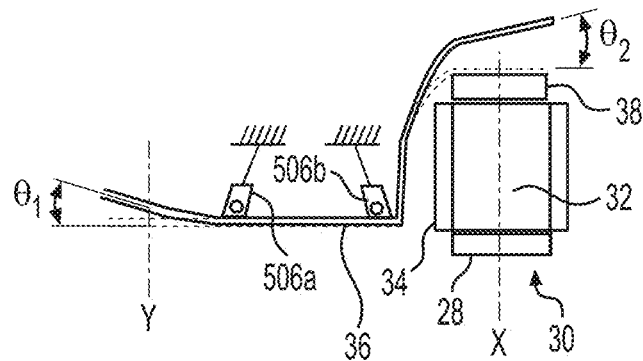

The tilt stiffness of the fan shaft 36 at the input to the fan 23 is measured by applying a moment $M_1$ to the fan shaft at the fan shaft input position defined above (illustrated in FIG. 24). The fan shaft 36 is again treated as a free body, and is held fixed at the position of all of the bearing positions at which it is supported i.e. the first and second supporting bearings 506a,506b in the arrangement of FIG. 24. As a result of moment $M_1$ the fan shaft 36 deforms so that the fan shaft input position is displaced by an angular displacement of $\theta_1$ as illustrated in FIG. 25. The tilt stiffness of the fan shaft 36 at the input to the fan 23 is then given by $M_1/\theta_1$.

In various embodiments, the tilt stiffness of the fan shaft at the input to the fan may be greater than or equal to $5.00 \times 10^5$ Nm/rad, and optionally greater than or equal to $9.0 \times 10^5$ Nm/rad.

In some embodiments, for example in embodiments in which the fan diameter is in the range from 240 to 280 cm, the tilt stiffness of the fan shaft at the input to the fan may be greater than or equal to $9.5 \times 10^5$ Nm/rad. In some embodiments, for example in embodiments in which the fan diameter is in the range from 330 to 380 cm, the tilt stiffness of the fan shaft at the input to the fan may be greater than or equal to $1.5 \times 10^6$ Nm/rad or greater than or equal to $2.5 \times 10^6$ Nm/rad.

In various embodiments, the tilt stiffness of the fan shaft at the input to the fan may be in the range from $5.00 \times 10^5$ Nm/rad to $7.00 \times 10^8$ Nm/rad, and optionally in the range from $9.0 \times 10^5$ Nm/rad to $3.5 \times 10^8$ Nm/rad.

In some embodiments, for example in embodiments in which the fan diameter is in the range from 240 to 280 cm, the tilt stiffness of the fan shaft at the input to the fan may be in the range from $9.5 \times 10^5$ Nm/rad to $3.5 \times 10^8$ Nm/rad and optionally in the range from $9.5 \times 10^5$ Nm/rad to $1.9 \times 10^6$ Nm/rad (and may be equal to $1.2 \times 10^6$ Nm/rad).

In some embodiments, for example in embodiments in which the fan diameter is in the range from 330 to 380 cm, the tilt stiffness of the fan shaft at the input to the fan may be in the range from $1.5 \times 10^6$ Nm/rad to $7.0 \times 10^8$ Nm/rad, and optionally in the range from $2.5 \times 10^6$ Nm/rad to $4.5 \times 10^6$ Nm/rad (and may be equal to $3.5 \times 10^6$ Nm/rad).

Figure 23:
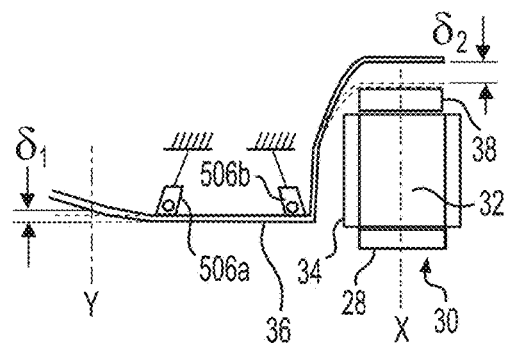

The radial bending stiffness of the fan shaft 36 at the output of the gearbox 30 is measured by applying a force $F_2$ to the fan shaft at the gearbox output position defined above (illustrated in FIG. 22). The fan shaft 36 is treated as a free body, and is held fixed at the position of all of bearing positions at which it is supported i.e. the first and second supporting bearings 506a,506b in the arrangement of FIG. 22. As a result of force $F_2$ the fan shaft 36 deforms so that the gearbox output position is displaced by a distance of $\delta_2$ (as illustrated in FIG. 23). The radial bending stiffness of the fan shaft 36 at the output of the gearbox is then given by $F_2/\delta_2$.

In various embodiments, the radial bending stiffness of the fan shaft at the output of the gearbox may be greater than or equal to $4.00 \times 10^6$ N/m, and optionally greater than or equal to $3.7 \times 10^7$ N/m.

In some embodiments, for example in embodiments in which the fan diameter is in the range from 240 to 280 cm, the radial bending stiffness of the fan shaft at the output of the gearbox may be greater than or equal to $3.7 \times 10^7$ N/m. In some embodiments, for example in embodiments in which the fan diameter is in the range from 330 to 380 cm, the radial bending stiffness of the fan shaft at the output of the gearbox may be greater than or equal to $3.9 \times 10^7$ N/m or greater than or equal to $5.0 \times 10^7$ N/m.

In various embodiments, the radial bending stiffness of the fan shaft at the output of the gearbox may be in the range from $4.00 \times 10^6$ N/m to $1.5 \times 10^9$ N/m, and optionally in the range from $3.7 \times 10^7$ N/m to $1.0 \times 10^9$ N/m.

In some embodiments, for example in embodiments in which the fan diameter is in the range from 240 to 280 cm, the radial bending stiffness of the fan shaft at the output of the gearbox may be in the range from $3.7 \times 10^7$ N/m to $5.0 \times 10^8$ N/m and optionally in the range from $3.7 \times 10^7$ N/m to $5.0 \times 10^7$ N/m (and may be equal to $4.0 \times 10^7$ N/m).

In some embodiments, for example in embodiments in which the fan diameter is in the range from 330 to 380 cm, the radial bending stiffness of the fan shaft at the output of the gearbox may be in the range from $3.9 \times 10^7$ N/m to $1.5 \times 10^9$ N/m, and optionally in the range from $5.0 \times 10^7$ N/m to $9.0 \times 10^7$ N/m (and may be equal to $7.0 \times 10^7$ N/m).

The tilt stiffness of the fan shaft 36 at the output of the gearbox 30 is measured by applying a moment $M_2$ to the fan shaft at the gearbox output position defined above (illustrated in FIG. 24). The fan shaft 36 is again treated as a free body, and is held fixed at the position of all the bearing positions at which it is supported i.e. the first and second supporting bearings 506a,506b in the embodiment of FIG. 24. As a result of moment $M_2$ the fan shaft 36 deforms so that the gearbox output position is displaced by an angular displacement of $\theta_2$ as illustrated in FIG. 25. The tilt stiffness of the fan shaft 36 at the output of the gearbox is then given by $M_2/\theta_2$.

In various embodiments, the tilt stiffness of the fan shaft at the output of the gearbox may be greater than or equal to $7.00 \times 10^4$ Nm/rad, and optionally greater than or equal to $9.5 \times 10^5$ Nm/rad.

In some embodiments, for example in embodiments in which the fan diameter is in the range from 240 to 280 cm, the tilt stiffness of the fan shaft at the output of the gearbox may be greater than or equal to $9.5 \times 10^5$. In some embodiments, for example in embodiments in which the fan diameter is in the range from 330 to 380 cm, the tilt stiffness of the fan shaft at the output of the gearbox may be greater than or equal to $1.1 \times 10^6$ Nm/rad and optionally may be greater than or equal to $2.6 \times 10^6$ Nm/rad.

In various embodiments, the tilt stiffness of the fan shaft at the output of the gearbox may be in the range from $7.00 \times 10^4$ Nm/rad to $7.00 \times 10^7$ Nm/rad, and optionally in the range from $9.5 \times 10^5$ Nm/rad to $3.5 \times 10^7$ Nm/rad.

In some embodiments, for example in embodiments in which the fan diameter is in the range from 240 to 280 cm, the tilt stiffness of the fan shaft at the output of the gearbox may be in the range from $9.5 \times 10^5$ Nm/rad to $2.0 \times 10^7$ Nm/rad and optionally in the range from $9.5 \times 10^5$ Nm/rad to $2.2 \times 10^6$ Nm/rad (and may be equal to $1.2 \times 10^6$ Nm/rad).

In some embodiments, for example in embodiments in which the fan diameter is in the range from 330 to 380 cm, the tilt stiffness of the fan shaft at the output of the gearbox may be in the range from $1.1 \times 10^6$ Nm/rad to $7.0 \times 10^7$ Nm/rad, and optionally in the range from $2.6 \times 10^6$ Nm/rad to $4.6 \times 10^6$ Nm/rad (and may be equal to $3.6 \times 10^6$ Nm/rad).

Relative Distance to and Between Fan Shaft Supporting Bearings

Referring to FIG. 22, the fan shaft end stiffness is at least partly determined according to the respective distance between the fan input position, the gearbox output position and the bearings by which the fan shaft is supported. For example, the stiffness of the fan shaft at the fan input may depend on the axial distance $d_1$ between the fan input position and the closest supporting bearing rearward of the fan i.e. the first supporting bearing 506a in the arrangement of FIG. 22. The axial position of the first supporting bearing 506a is taken to be its axial centreline. The stiffness of the fan shaft at the gearbox output may depend on the axial distance $d_2$ between the gearbox output position and the closest supporting bearing forward of the gearbox i.e. the second supporting bearing 506b in the arrangement of FIG. 22. The axial position of the second supporting bearing 506b is taken to be its axial centreline. The closest supporting bearing forward of the gearbox output position does not include any non-supporting flexible or softly mounted bearings that also may be coupled to the fan shaft as described above in connection with the measurement of the stiffness of the fan shaft mounting structure. It does not, for example, include the gearbox output shaft bearing 508a included in arrangements such as those shown in FIGS. 17, 18 and 19. By 'supporting bearing' we therefore again mean a bearing transmitting a significant amount of the load transmitted by the fan shaft supporting structure during normal operation as defined elsewhere herein.

The gas turbine engine 10 may be configured such that the relative positions of the bearings (e.g. axial distances $d_1$ and $d_2$) provide a fan shaft end stiffness within the desired range.

In various embodiments, distance $d_1$ may be greater than or equal to 0.12 m, and optionally greater than or equal to 0.13 m.

In some embodiments, for example in embodiments in which the fan diameter is in the range from 240 to 280 cm, distance $d_1$ may be greater than or equal to 0.12 m or greater than or equal to 0.13 m. In some embodiments, for example in embodiments in which the fan diameter is in the range from 330 to 380 cm, distance $d_1$ may be greater than or equal to 0.13 m or greater than or equal to 0.15 m.

In various embodiments, distance $d_1$ may be in the range from 0.12 m to 0.40 m, and optionally in the range from 0.13 m to 0.30 m.

In some embodiments, for example in embodiments in which the fan diameter is in the range from 240 to 280 cm, distance $d_1$ may be in the range from 0.12 m to 0.30 m and optionally in the range from 0.13 m to 0.15 m (and may be equal to 0.14 m).

In some embodiments, for example in embodiments in which the fan diameter is in the range from 330 to 380 cm, distance $d_1$ may be in the range from 0.13 m to 0.40 m and optionally in the range from 0.15 m to 0.25 m (and may be equal to 0.20 m).

In various embodiments, distance $d_2$ may be greater than or equal to 0.15 m, and optionally greater than or equal to 0.16 m.

In some embodiments, for example in embodiments in which the fan diameter is in the range from 240 to 280 cm, distance $d_2$ may be greater than or equal to 0.15 m or greater than or equal to 0.16 m. In some embodiments, for example in embodiments in which the fan diameter is in the range from 330 to 380 cm, distance $d_2$ may be greater than or equal to 0.16 m or greater than or equal to 0.20 m.

In various embodiments, distance $d_2$ may be in the range from 0.15 m to 0.45 m, and optionally in the range from 0.16 m to 0.40 m.

In some embodiments, for example in embodiments in which the fan diameter is in the range from 240 to 280 cm, distance $d_2$ may be in the range from 0.15 m to 0.35 m and optionally in the range from 0.16 m to 0.18 m (and may be equal to 0.17 m).

In some embodiments, for example in embodiments in which the fan diameter is in the range from 330 to 380 cm, distance $d_2$ may be in the range from 0.16 m to 0.45 m and optionally in the range from 0.20 m to 0.28 m (and may be equal to 0.24 m).

In the arrangement of FIG. 15, the distance $d_1$ corresponds to the distance between the first supporting bearing 506a and the fan input position. The distance $d_2$ corresponds to the distance between the first supporting bearing 506a and the gearbox input position.

A bearing axial separation $d_3$ is defined as the axial distance between the first supporting bearing 506a and the second supporting bearing 506b as shown in FIG. 22. This distance therefore corresponds to the axial separation between the closest supporting bearing rearward of the fan (i.e. the first supporting bearing 506a) and the closest supporting bearing forward of the gearbox (i.e. the second supporting bearing 506b). Again, the axial position of the first and second supporting bearings 506a,b is taken to be their respective axial centreline.

In various embodiments, distance $d_3$ may be in the range from 0.1 m to 0.4 m, and optionally in the range from 0.18 m to 0.32 mm and further optionally in the range from 0.20 m to 0.30 m.

In some embodiments, for example in embodiments in which the fan diameter is in the range from 240 to 280 cm, distance $d_3$ may be in the range from 0.19 m to 0.23 m (and may be equal to 0.21 m).

In some embodiments, for example in embodiments in which the fan diameter is in the range from 330 to 380 cm, distance $d_3$ may be in the range from 0.26 m to 0.30 m (and may be equal to 0.28 m).

An axial distance $d_4$ is defined as the axial distance between the fan input position and the gearbox output position as can be seen in FIG. 22 (e.g. between Y and X). The axial distance $d_4$ is equal to the sum of distances $d_1$, $d_2$ and $d_3$ defined above.

The axial distance $d_3$ may only be defined for arrangements in which the first and second supporting bearings 506a, 506b are located forward of the gearbox. The axial distance $d_4$ is however defined for all embodiments. Where only one supporting bearing is located forward of the gearbox distance $d_3$ is zero. An example of how $d_1$, $d_2$ and $d_4$ may be defined for an arrangement in which a single supporting bearing is provided forward of the gearbox is shown in FIG. 15.

In various embodiments, distance $d_4$ may be greater than or equal to 0.43 m, and optionally greater than or equal to 0.46 m.

In some embodiments, for example in embodiments in which the fan diameter is in the range from 240 to 280 cm, distance $d_4$ may be greater than or equal to 0.43 m or greater than or equal to 0.48 m. In some embodiments, for example in embodiments in which the fan diameter is in the range from 330 to 380 cm, distance $d_4$ may be greater than or equal to 0.56 m or greater than or equal to 0.65 m.

In various embodiments, distance $d_4$ may be in the range from 0.43 m to 0.95 m, and optionally in the range from 0.46 m to 0.85 m.

In some embodiments, for example in embodiments in which the fan diameter is in the range from 240 to 280 cm, distance $d_4$ may be in the range from 0.43 m to 0.62 m and optionally in the range from 0.48 m to 0.56 m (and may be equal to 0.52 m).

In some embodiments, for example in embodiments in which the fan diameter is in the range from 330 to 380 cm, distance $d_4$ may be in the range from 0.56 m to 0.95 m and optionally in the range from 0.65 m to 0.76 m (and may be equal to 0.71 m).

Relative Fan and Gearbox Positions

Referring again to FIG. 7, a fan-gearbox axial distance 110 is defined as the axial distance between the output of the gearbox (i.e. the axial position P of the gearbox output position) and the fan axial centreline Q. The fan axial centreline is defined as the axial midpoint of the fan blades forming the fan (and may correspond to axis Z). The gearbox output position is defined as the point of connection between the fan shaft 36 and the gearbox as defined elsewhere herein. This may be defined differently for different types of gearbox as described elsewhere herein.

In various embodiments, the fan-gearbox axial distance may be greater than or equal to 0.35 m, and optionally greater than or equal to 0.37 m.

In some embodiments, for example in embodiments in which the fan diameter is in the range from 240 to 280 cm, the fan-gearbox axial distance may be greater than or equal to 0.38 m or greater than or equal to 0.40 m. In some embodiments, for example in embodiments in which the fan diameter is in the range from 330 to 380 cm, the fan-gearbox axial distance may be greater than or equal to 0.48 m or greater than or equal to 0.50 m.

In various embodiments, the fan-gearbox axial distance may be in the range from 0.35 m to 0.8 m, and optionally in the range from 0.37 m to 0.75 m.

In some embodiments, for example in embodiments in which the fan diameter is in the range from 240 to 280 cm, the fan-gearbox axial distance may be in the range from 0.38 m to 0.65 m and optionally in the range from 0.40 m to 0.44 m (and may be equal to 0.42 m).

In some embodiments, for example in embodiments in which the fan diameter is in the range from 330 to 380 cm, the fan-gearbox axial distance may be in the range from 0.48 m to 0.8 m and optionally in the range from 0.50 m to 0.68 m (and may be equal to 0.58 m).

Fan Moment of Inertia

The fan 23 has a moment of inertial $I_F$. The moment of inertia of the fan is measured based on the total mass of the rotor forming the fan, i.e. including the total mass of the plurality of fan blades, the fan hub and any support arm or other linkages provided to connect the fan to the fan shaft. The moment of inertia therefore includes all rotating components apart from the fan shaft. The moment of inertia is the mass moment of inertia or rotational inertia of the fan with respect to rotation around the principal rotational axis 9 of the engine. Rotation of the fan will cause a gyroscopic effect meaning that the fan shaft will tend to maintain a steady direction of its axis of rotation. During maneuvering of the aircraft to which the gas turbine engine is mounted the orientation of the axis of rotation of the fan shaft will however change. The gyroscopic effect will result in a reaction force at the fan shaft mounting structure to resist the tendency of the fan shaft to maintain its orientation. The moment of inertia of the fan will have an effect on the magnitude of the gyroscopic effect produced, and so has an impact on the design of the fan shaft mounting structure as is discussed elsewhere herein.

In various embodiments, the moment of inertia of the fan may be greater than or equal to $7.40 \times 10^7$ kgm$^2$, and optionally greater than or equal to $8.3 \times 10^7$ kgm$^2$.

In some embodiments, for example in embodiments in which the fan diameter is in the range from 240 to 280 cm, the moment of inertia of the fan may be greater than or equal to $7.4 \times 10^7$ kgm$^2$ or $8.6 \times 10^7$ kgm$^2$. In some embodiments, for example in embodiments in which the fan diameter is in the range from 330 to 380 cm, the moment of inertia of the fan may be greater than or equal to $3.0 \times 10^8$ kgm$^2$ or $4.0 \times 10^8$ kgm$^2$.

In various embodiments, the moment of inertia of the fan may be in the range from $7.40 \times 10^7$ kgm$^2$ to $9.00 \times 10^8$ kgm$^2$, and optionally in the range from $8.3 \times 10^7$ kgm$^2$ to $6.5 \times 10^8$ kgm$^2$.

In some embodiments, for example in embodiments in which the fan diameter is in the range from 240 to 280 cm, the moment of inertia of the fan may be in the range from $7.4 \times 10^7$ kgm$^2$ to $1.5 \times 10^8$ kgm$^2$ and optionally in the range from $8.6 \times 10^7$ kgm$^2$ to $9.6 \times 10^7$ kgm$^2$ (and may be equal to $9.1 \times 10^7$ kgm$^2$).

In some embodiments, for example in embodiments in which the fan diameter is in the range from 330 to 380 cm, the moment of inertia of the fan may be in the range from $3.0 \times 10^8$ kgm$^2$ to $9.0 \times 10^8$ kgm$^2$ and optionally in the range from $4.0 \times 10^8$ kgm$^2$ to $5.0 \times 10^8$ kgm$^2$ (and may be equal to $4.5 \times 10^8$ kgm$^2$).

Power Transmitted by the Gearbox

Power is transmitted by the gearbox during operation of the engine. The power values given herein for the power transmitted by the gearbox are the power transmitted by the gearbox at maximum take-off conditions. The maximum take-off conditions are as defined elsewhere herein. The power transmitted by the gearbox is defined as the power at the gearbox output position defined elsewhere herein.

In various embodiments, the power transmitted by the gearbox may be greater than or equal to $2.25 \times 10^7$ W, and optionally greater than or equal to $2.5 \times 10^7$ W.

In some embodiments, for example in embodiments in which the fan diameter is in the range from 240 to 280 cm, power transmitted by the gearbox may be greater than or equal to $2.25 \times 10^7$ W or greater than or equal to $2.7 \times 10^7$ W. In some embodiments, for example in embodiments in which the fan diameter is in the range from 330 to 380 cm, the power transmitted by the gearbox may be greater than or equal to $4.0 \times 10^7$ W or greater than or equal to $5.0 \times 10^7$ w.

In various embodiments, the power transmitted by the gearbox may be in the range from $2.25 \times 10^7$ W to $1.00 \times 10^8$ W, and optionally in the range from $2.5 \times 10^7$ W to $8.0 \times 10^7$ w.

In some embodiments, for example in embodiments in which the fan diameter is in the range from 240 to 280 cm, the power transmitted by the gearbox may be in the range from $2.25 \times 10^7$ W to $3.6 \times 10^7$ W and optionally in the range from $2.7 \times 10^7$ W to $3.3 \times 10^7$ W (and may be equal to $3.0 \times 10^7$ W).

In some embodiments, for example in embodiments in which the fan diameter is in the range from 330 to 380 cm, the power transmitted by the gearbox may be in the range from $4.0 \times 10^7$ W to $1.0 \times 10^8$ W and optionally in the range from $5.0 \times 10^7$ W to $6.0 \times 10^7$ W (and may be equal to $5.5 \times 10^7$ W).

Carrier Torsional Stiffness

Figure 27:
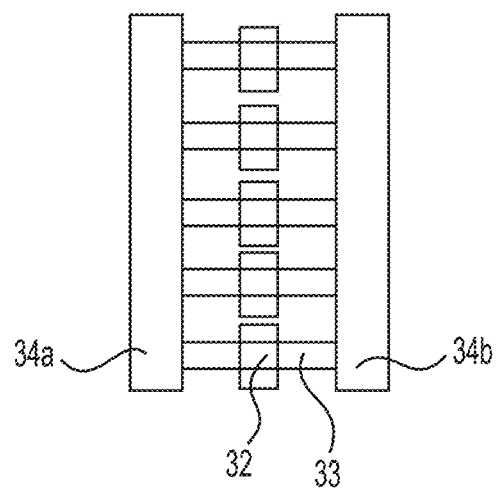
FIG. 27 is a schematic diagram illustrating a planet carrier.
Figure 28:
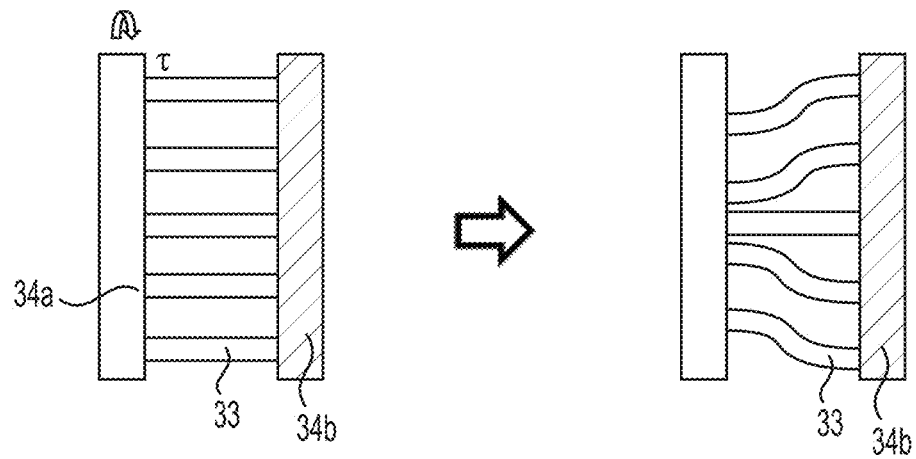
FIG. 28 is a schematic diagram illustrating the torsional stiffness of the carrier in side view.

The torsional stiffness of the gearbox carrier is defined with reference to FIGS. 27 to 31. FIG. 27 illustrates a close up view of the planet carrier provided in the gearbox of any arrangement of the engine described herein. As already described, the planet carrier 34 holds the planet gears 32 in place. In planetary gearboxes 30, there may be relatively large centrifugal forces to be reacted by the carrier 34. In star gearboxes, the centrifugal forces to react may be negligible or zero as there is no carrier rotation.

In the described arrangement, the planet carrier 34 comprises a forward plate 34a and a rearward plate 34b, and pins 33 extending between the plates, as illustrated in FIG. 27. The pins 33 are arranged to be parallel to the engine axis 9. In alternative embodiments, a plate 34b may be provided on only one side-no plate or only a partial plate may be provided on the other side of the carrier 34.

Figure 31:
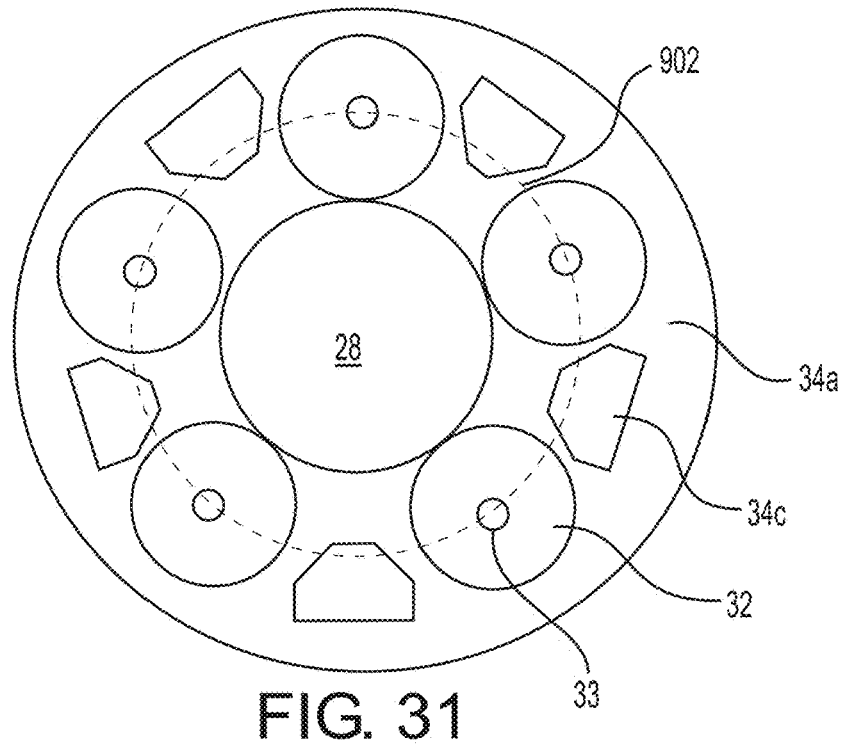
FIG. 31 is a schematic diagram illustrating a front view of a carrier comprising lugs.

In the arrangement shown in FIG. 31, the carrier 34 additionally comprises lugs 34c, which may also be referred to as wedges or a web, between the forward and rearward plates 34a, 34b. The lugs 34c may increase the overall stiffness of the carrier 34.

The stiffness of the carrier 34 is selected to be relatively high to react centrifugal forces and/or to maintain gear alignment. The skilled person would appreciate that stiffness is a measure of the displacement that results from any applied forces or moments, and may not relate to strength of the component. Hence to react a high load, any stiffness is acceptable so long as the resulting displacement is tolerable. How high a stiffness is desired to keep a displacement within acceptable limits therefore depends on position and orientation of the gears, which is generally referred to as gear alignment (or mis-alignment).

Carrier torsional stiffness is a measure of the resistance of the carrier 34 to an applied torque, τ, as illustrated in FIG.

Figure 29:
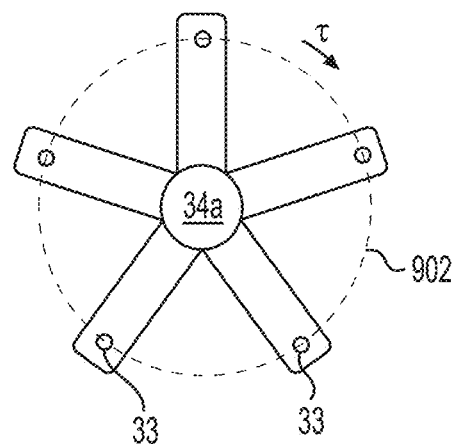
FIG. 29 is a schematic diagram illustrating torsional stiffness of an alternative carrier in front view.
Figure 30:
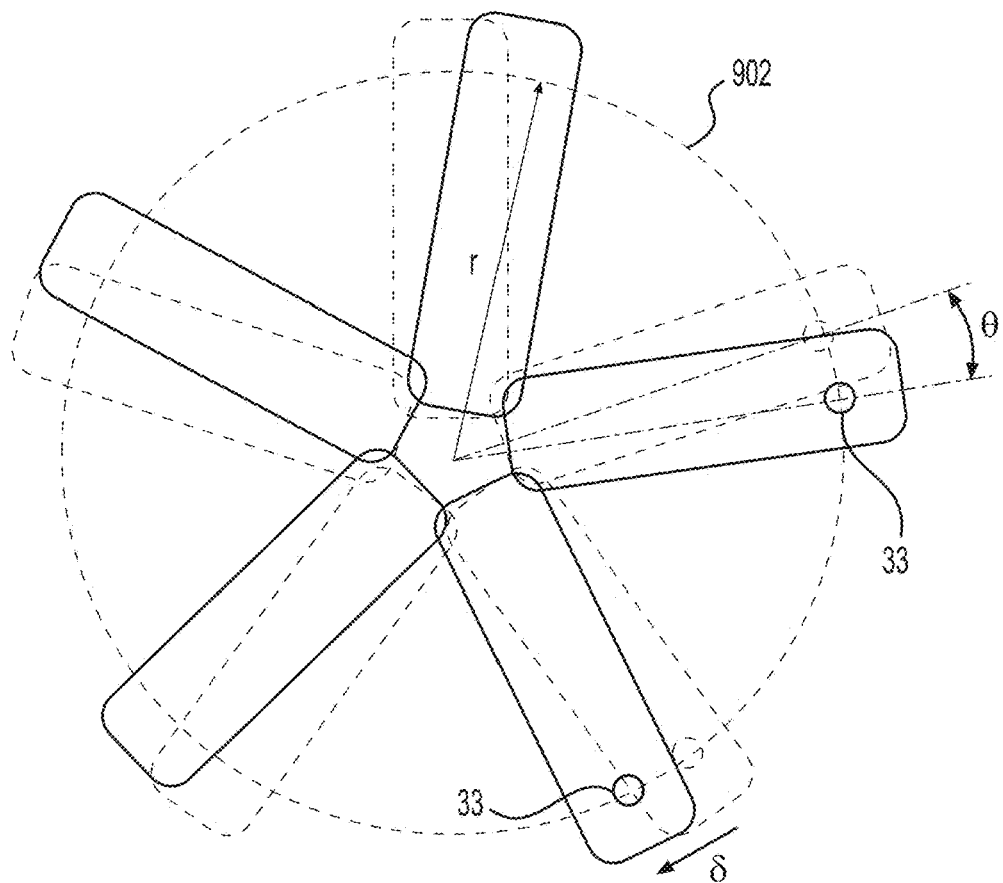
FIG. 30 is a schematic diagram illustrating torsional stiffness of the carrier of FIG. 29.

28 (axial cross-section) and FIGS. 29 to 31 (a radial cross-section). The axis of the torque is parallel to the engine axis 9.

The diagonal lining of the plate 34*b* at the rearward end of the carrier 30 indicates that plate 34*b* being treated as rigid and non-rotating (as for a cantilever beam mounting). In embodiments with only one plate 34*a*, the ends of the pins 33 (and of the lugs 34*c* if present) further from the single plate 34*a* are held in place instead.

A torque, t, is applied to the carrier 34 (at the position of the axial mid-point of the forward plate 34*a*) and causes a rotational deformation, θ (e.g. twist) along the length of the carrier 34. The twist causes the carrier 34 to "wind up" as the ends of the pins 33 (and of the lugs 34*c* if present) are held at a fixed radius on the carrier plates 34*a*, 34*b*.

The angle through which a point on an imaginary circle 902 on the forward plate 34*a* passing through the rotation axis of each pin 33 moves is θ where θ is the angle measured in radians. The imaginary circle 902 may be referred to as the pin pitch circle diameter (pin PCD). The pin PCD may be in the range from 0.38 m to 0.65 m, for example being equal to 0.4 m or 0.55 m. An effective linear torsional stiffness can therefore be defined for the carrier 34 as described above, using the radius r of the imaginary circle 902 (e.g. as illustrated in FIG. 30).

In various embodiments, the torsional stiffness of the carrier 34 is greater than or equal to $1.60 \times 10^8$ Nm/rad, and optionally greater than or equal to $2.7 \times 10^8$ Nm/rad.

In some embodiments, for example in embodiments in which the fan diameter is in the range from 240 to 280 cm, the torsional stiffness of the carrier 34 may be greater than or equal to $1.8 \times 10^8$ Nm/rad, and optionally may be greater than or equal to $2.5 \times 10^8$ Nm/rad (and optionally may be equal to $4.83 \times 10^8$ Nm/rad). In some embodiments, for example in embodiments in which the fan diameter is in the range from 330 to 380 cm, the torsional stiffness of the carrier 34 may greater than or equal to $6.0 \times 10^8$ Nm/rad and optionally may be greater than or equal to $1.1 \times 10^9$ Nm/rad (and optionally may be equal to $2.17 \times 10^9$ Nm/rad).

In various embodiments, the torsional stiffness of the carrier 34 is in the range from $1.60 \times 10^8$ Nm/rad to $1.00 \times 10^{11}$ Nm/rad, and optionally in the range from $2.7 \times 10^8$ Nm/rad to $1 \times 10^{10}$ Nm/rad.

In some embodiments, for example in embodiments in which the fan diameter is in the range from 240 to 280 cm, the torsional stiffness of the carrier 34 may be in the range from $1.8 \times 10^8$ Nm/rad to $4.8 \times 10^9$ Nm/rad, and optionally may be in the range from $2.5 \times 10^8$ Nm/rad to $6.5 \times 10^8$ Nm/rad (and optionally may be equal to $4.83 \times 10^8$ Nm/rad). In some embodiments, for example in embodiments in which the fan diameter is in the range from 330 to 380 cm, the torsional stiffness of the carrier 34 may be in the range from $6.0 \times 10^8$ Nm/rad to $2.2 \times 10^{10}$ Nm/rad and optionally may be in the range from $1.1 \times 10^9$ to $3.0 \times 10^9$ Nm/rad (and optionally may be equal to $2.17 \times 10^9$ Nm/rad).

In various embodiments, the effective linear torsional stiffness of the carrier 34 may be greater than or equal to $7.00 \times 10^9$ N/m, and optionally greater than or equal to $9.1 \times 10^9$ N/m. In some embodiments, for example in embodiments in which the fan diameter is in the range from 240 to 280 cm, the effective linear torsional stiffness of the carrier 34 may be greater than or equal to $7.70 \times 10^9$ N/m. In other such embodiments, the effective linear torsional stiffness of the carrier 34 may be greater than or equal to $9.1 \times 10^9$ N/m, optionally greater than or equal to $1.1 \times 10^{10}$ N/m (and optionally may be equal to $1.26 \times 10^{10}$ N/m). In some embodiments, for example in embodiments in which the fan diameter is in the range from 330 to 380 cm, the effective linear torsional stiffness of the carrier 34 may be greater than or equal to $1.2 \times 10^{10}$ N/m and optionally may be greater than or equal to $2.1 \times 10^{10}$ N/m (and optionally may be equal to $2.88 \times 10^{10}$ N/m).

In various embodiments, the effective linear torsional stiffness of the carrier 34 may be in the range from $7.00 \times 10^9$ to $1.20 \times 10^{11}$ N/m, and optionally in the range from $9.1 \times 10^9$ N/m to $8.0 \times 10^{10}$ N/m.

In some embodiments, for example in embodiments in which the fan diameter is in the range from 240 to 280 cm, the effective linear torsional stiffness of the carrier 34 may be in the range from $9.1 \times 10^9$ to $6.0 \times 10^{10}$ N/m, and optionally may be in the range from $7 \times 10^9$ N/m to $2 \times 10^{10}$ N/m, or from $8.5 \times 10^9$ N/m to $2 \times 10^{10}$ N/m (and optionally may be equal to $1.26 \times 10^{10}$ N/m). In some embodiments, for example in embodiments in which the fan diameter is in the range from 330 to 380 cm, the effective linear torsional stiffness of the carrier 34 may be in the range from $1.2 \times 10^{10}$ N/m to $1.2 \times 10^{11}$ N/m and optionally may be in the range from $1.0 \times 10^{10}$ N/m to $5.0 \times 10^{10}$ N/m (and optionally may be equal to $2.88 \times 10^{10}$ N/m).

The torsional stiffness of the carrier 34 may be controlled so as to be within a desired range by adjusting one or more parameters, including carrier material(s), carrier geometry, and the presence or absence of lugs.

Parameter Ratios

The inventor has discovered that the ratios (and/or products) of some properties have a considerable impact on the operation of the gearbox and its inputs/outputs/support structure. Some or all of the below may apply to any embodiment:

A system radial bending stiffness is defined by combining the radial bending stiffness of the fan shaft mounting structure 503 and the radial bending stiffness of the fan shaft 36 at the output of the gearbox in series. The system radial bending stiffness is defined as:

$$\frac{1}{(1/K1) + (1/K2)}$$

Where K1 is the radial bending stiffness of the fan shaft mounting structure, and K2 is radial bending stiffness of the fan shaft 36 at the output of the gearbox as defined elsewhere herein.

In various embodiments, the system radial bending stiffness may be greater than or equal to $3.90 \times 10^6$ N/m and optionally greater than or equal to $3.6 \times 10^7$ N/m.

In some embodiments, for example in embodiments in which the fan diameter is in the range from 240 to 280 cm, the system radial bending stiffness may be greater than or equal to $3.6 \times 10^7$ N/m. In some embodiments, for example in embodiments in which the fan diameter is in the range from 330 to 380 cm, the system radial bending stiffness may be greater than or equal to $4.1 \times 10^7$ N/m or greater than or equal to $5.8 \times 10^7$ N/m.

In various embodiments, the system radial bending stiffness may be in the range from $3.90 \times 10^6$ N/m to $1.40 \times 10^9$ N/m, and optionally in the range from $3.6 \times 10^7$ N/m to $6.8 \times 10^8$ N/m.

In some embodiments, for example in embodiments in which the fan diameter is in the range from 240 to 280 cm, the system radial bending stiffness may be in the range from 3.6×10⁷ N/m to 4.0×10⁸ N/m and optionally in the range from 3.6×10⁷ N/m to 4.9×10⁷ N/m (and may be equal to 3.9×10⁷ N/m).

In some embodiments, for example in embodiments in which the fan diameter is in the range from 330 to 380 cm, the system radial bending stiffness may be in the range from 4.1×10⁷ N/m to 1.4×10⁹ N/m, and optionally in the range from 5.8×10⁷ N/m to 7.8×10⁷ N/m (and may be equal to 6.8×10⁷ N/m).

A fan shaft mounting radial bending stiffness ratio can be defined as:

$$\frac{\text{the system radial bending stiffness}}{\text{the radial bending stiffness of the fan shaft mounting structure (503)}}$$

In various embodiments, the fan shaft mounting radial bending stiffness ratio may be greater than or equal to $1.0 \times 10^{-3}$ optionally greater than or equal to $5.0 \times 10^{-3}$, or further optionally greater than or equal to $2.0 \times 10^{-2}$.

In various embodiments, the fan shaft mounting radial bending stiffness ratio may be in the range from $1.0 \times 10^{-3}$ to $4.0 \times 10^{-1}$, and optionally in the range from $5.0 \times 10^{-3}$ to $1.5 \times 10^{-1}$, in the range from $5.0 \times 10^{-3}$ to $2.0 \times 10^{-2}$ or in the range from $2.0 \times 10^{-2}$ to $1.5 \times 10^{-1}$.

In some embodiments, for example in embodiments in which the fan diameter is in the range from 240 to 280 cm, the fan shaft mounting radial bending stiffness ratio may be in the range from $2.2 \times 10^{-2}$ to $3.2 \times 10^{-2}$ (and may be equal to $2.7 \times 10^{-2}$).

In some embodiments, for example in embodiments in which the fan diameter is in the range from 330 to 380 cm, the fan shaft mounting radial bending stiffness ratio may be in the range from $2.6 \times 10^{-2}$ to $3.6 \times 10^{-2}$ (and may be equal to $3.1 \times 10^{-2}$).

In various embodiments, in addition to or alternatively to the fan shaft mounting radial bending stiffness ratio, a product of the parameters making up the fan shaft mounting radial bending stiffness ratio may be defined. This product (referred to as the fan shaft mounting radial bending stiffness product) may be defined as:

$$\text{the system radial bending stiffness} \times \text{the radial bending stiffness of the fan shaft mounting structure (503)}$$

In various embodiments, the fan shaft mounting radial bending stiffness product may be greater than or equal to $2.7 \times 10^{15}$ (N/m)², and optionally greater than or equal to $4.0 \times 10^{15}$ (N/m)².

In some embodiments, for example in embodiments in which the fan diameter is in the range from 240 to 280 cm, the fan shaft mounting radial bending stiffness product may be greater than or equal to $4.3 \times 10^{16}$ (N/m)². In some embodiments, for example in embodiments in which the fan diameter is in the range from 330 to 380 cm, the fan shaft mounting radial bending stiffness product may be greater than or equal to $4.3 \times 10 \times 10^{16}$ (N/m)².

In various embodiments, the fan shaft mounting radial bending stiffness product may be in the range from $2.7 \times 10^{15}$ (N/m)² to $9.0 \times 10^{19}$ (N/m)², and optionally in the range from $4.0 \times 10^{15}$ (N/m)² to $1.5 \times 10^{19}$ (N/m)².

In some embodiments, for example in embodiments in which the fan diameter is in the range from 240 to 280 cm, the fan shaft mounting radial bending stiffness product may be in the range from $4.3 \times 10^{16}$ (N/m)² to $3.0 \times 10^{18}$ (N/m)².

In some embodiments, for example in embodiments in which the fan diameter is in the range from 330 to 380 cm, the fan shaft mounting radial bending stiffness product may be in the range from $4.3 \times 10^{16}$ (N/m)² to $9.0 \times 10^{19}$ (N/m)².

A system tilt stiffness is defined by combining the tilt stiffness of the fan shaft mounting structure 503 and the tilt stiffness of the fan shaft 36 at the output of the gearbox in series. The system tilt stiffness is defined as:

$$\frac{1}{(1/K3) + (1/K4)}$$

Where K3 is the tilt stiffness of the fan shaft mounting structure, and K4 is the tilt stiffness of the fan shaft 36 at the output of the gearbox as defined elsewhere herein.

In various embodiments, the system tilt stiffness may be greater than or equal to $1.10 \times 10^5$ Nm/rad and optionally greater than or equal to $8.5 \times 10^5$ Nm/rad.

In some embodiments, for example in embodiments in which the fan diameter is in the range from 240 to 280 cm, the system tilt stiffness may be greater than or equal to $8.5 \times 10^5$ Nm/rad. In some embodiments, for example in embodiments in which the fan diameter is in the range from 330 to 380 cm, the system tilt stiffness may be greater than or equal to $1.5 \times 10^6$ Nm/rad or greater than or equal to $2.9 \times 10^6$ Nm/rad.

In various embodiments, the system tilt stiffness may be in the range from $1.10 \times 10^5$ Nm/rad to $6.80 \times 10^7$ Nm/rad, and optionally in the range from $8.5 \times 10^5$ Nm/rad to $3.4 \times 10^7$ Nm/rad.

In some embodiments, for example in embodiments in which the fan diameter is in the range from 240 to 280 cm, the system tilt stiffness may be in the range from $8.5 \times 10^5$ Nm/rad to $1.2 \times 10^7$ Nm/rad and optionally in the range from $8.5 \times 10^5$ Nm/rad to $1.7 \times 10^6$ Nm/rad (and may be equal to $1.2 \times 10^6$ Nm/rad).

In some embodiments, for example in embodiments in which the fan diameter is in the range from 330 to 380 cm, the system tilt stiffness may be in the range from $1.5 \times 10^6$ Nm/rad to $6.8 \times 10^7$ Nm/rad, and optionally in the range from $2.9 \times 10^6$ Nm/rad to $3.9 \times 10^6$ Nm/rad (and may be equal to $3.4 \times 10^6$ Nm/rad).

In various embodiments, a fan shaft mounting tilt stiffness ratio is defined as:

$$\frac{\text{the system tilt stiffness}}{\text{tilt stiffness of the fan shaft mounting structure (503)}}$$

In various embodiments, the fan shaft mounting tilt stiffness ratio may be greater than or equal to $1.5 \times 10^{-3}$, and optionally greater than or equal to $6.0 \times 10^{-3}$ and further optionally greater than or equal to $2.5 \times 10^{-2}$.

In various embodiments, the fan shaft mounting tilt stiffness ratio may be in the range from $1.5 \times 10^{-3}$ to $5.0 \times 10^{-1}$, and optionally in the range from $6.0 \times 10^{-3}$ to $2.0 \times 10^{-1}$, in the range from $6.0 \times 10^{-3}$ to $2.5 \times 10^{-2}$ or in the range from $2.5 \times 10^{-2}$ to $2.0 \times 10^{-1}$.

In some embodiments, for example in embodiments in which the fan diameter is in the range from 240 to 280 cm, the fan shaft mounting tilt stiffness ratio may be in the range from $3.0 \times 10^{-2}$ to $4.0 \times 10^{-2}$ (and may be equal to $3.5 \times 10^{-2}$).

In some embodiments, for example in embodiments in which the fan diameter is in the range from 330 to 380 cm, the fan shaft mounting tilt stiffness ratio may be in the range from $3.7\times10^{-2}$ to $4.7\times10^{-2}$ (and may be equal to $4.2\times10^{-2}$).

In various embodiments, in addition to or alternatively to the fan shaft mounting tilt stiffness ratio, a product of the parameters making up that ratio may be defined. This product (referred to as the fan shaft mounting tilt stiffness product) may be defined as:

$$\text{the system tilt stiffness} \times \text{the tilt stiffness of the fan shaft mounting structure (503)}$$

In various embodiments, the fan shaft mounting tilt stiffness product may be greater than or equal to $1.7\times10^{12}$ (Nm/rad)$^2$, and optionally greater than or equal to $1.6\times10^{13}$ (Nm/rad)$^2$.

In some embodiments, for example in embodiments in which the fan diameter is in the range from 240 to 280 cm, the fan shaft mounting tilt stiffness product may be greater than or equal to $1.9\times10^{13}$ (Nm/rad)$^2$. In some embodiments, for example in embodiments in which the fan diameter is in the range from 330 to 380 cm, the fan shaft mounting tilt stiffness product may be greater than or equal to $3.0\times10^{13}$ (Nm/rad)$^2$.

In various embodiments, the fan shaft mounting tilt stiffness product may be in the range from $1.7\times10^{12}$ (Nm/rad)$^2$ to $3.0\times10^{17}$ (Nm/rad)$^2$, and optionally in the range from $1.6\times10^{13}$ (Nm/rad)$^2$ to $3.0\times10^{16}$ (Nm/rad)$^2$.

In some embodiments, for example in embodiments in which the fan diameter is in the range from 240 to 280 cm, the fan shaft mounting tilt stiffness product may be in the range from $1.9\times10^{13}$ (Nm/rad)$^2$ to $1.5\times10^{16}$ (Nm/rad)$^2$.

In some embodiments, for example in embodiments in which the fan diameter is in the range from 330 to 380 cm, the fan shaft mounting tilt stiffness product may be in the range from $3.0\times10^{13}$ (Nm/rad)$^2$ to $3.0\times10^{17}$ (Nm/rad)$^2$.

A fan shaft radial bending stiffness ratio is defined as:

$$\frac{\text{the radial bending stiffness of the fan shaft (36) at the input to fan (23)}}{\text{the radial bending stiffness of the fan shaft (36) at the output of the gearbox (30)}}$$

In various embodiments, the fan shaft radial bending stiffness ratio may be greater than or equal to $6.0\times10^{-3}$, and optionally greater than or equal to 0.015.

In some embodiments, for example in embodiments in which the fan diameter is in the range from 240 to 280 cm, the fan shaft radial bending stiffness ratio may be greater than or equal to 0.03 or greater than or equal to 0.07. In some embodiments, for example in embodiments in which the fan diameter is in the range from 330 to 380 cm, the fan shaft radial bending stiffness ratio may be greater than or equal to 0.02 or greater than or equal to 0.04.

In various embodiments, the fan shaft radial bending stiffness ratio may be in the range from $6.0\times10^{-3}$ to $2.5\times10^{1}$, and optionally in the range from 0.015 to 2.5.

In some embodiments, for example in embodiments in which the fan diameter is in the range from 240 to 280 cm, the fan shaft radial bending stiffness ratio may be in the range from 0.03 to 0.85 and optionally in the range from 0.07 to 0.27 (and may be equal to 0.17).

In some embodiments, for example in embodiments in which the fan diameter is in the range from 330 to 380 cm, the fan shaft radial bending stiffness ratio may be in the range from 0.02 to 1.5, and optionally in the range from 0.04 to 0.24 (and may be equal to 0.14).

In various embodiments, in addition to or alternatively to the fan shaft radial bending stiffness ratio, a product of the parameters making up that ratio may be defined. This product (referred to as the fan shaft radial bending stiffness product) may be defined as:

$$\text{the radial bending stiffness of the fan shaft (36) at the input to the fan (23)} \times \text{the radial bending stiffness of the fan shaft (36) at the output of the gearbox (30)}$$

In various embodiments, the fan shaft radial bending stiffness product may be greater than or equal to $1.2\times10^{13}$ (N/m)$^2$, and optionally greater than or equal to $2.4\times10^{14}$ (N/m)$^2$.

In some embodiments, for example in embodiments in which the fan diameter is in the range from 240 to 280 cm, the fan shaft radial bending stiffness product may be greater than or equal to $2.4\times10^{14}$ (N/m)$^2$. In some embodiments, for example in embodiments in which the fan diameter is in the range from 330 to 380 cm, the fan shaft radial bending stiffness product may be greater than or equal to $5.0\times10^{13}$ (N/m)$^2$.

In various embodiments, the fan shaft radial bending stiffness product may be in the range from $1.2\times10^{13}$ (N/m)$^2$ to $3.0\times10^{18}$ (N/m)$^2$, and optionally in the range from $2.4\times10^{14}$ (N/m)$^2$ to $3.0\times10^{17}$ (N/m)$^2$.

In some embodiments, for example in embodiments in which the fan diameter is in the range from 240 to 280 cm, the fan shaft radial bending stiffness product may be in the range from $2.4\times10^{14}$ (N/m)$^2$ to $2.7\times10^{15}$ (N/m)$^2$.

In some embodiments, for example in embodiments in which the fan diameter is in the range from 330 to 380 cm, the fan shaft radial bending stiffness product may be in the range from $5.0\times10^{13}$ (N/m)$^2$ to $3.0\times10^{18}$ (N/m)$^2$.

A fan shaft tilt stiffness ratio is defined as:

$$\frac{\text{the tilt stiffness of the fan shaft (36) at the input to the fan (23)}}{\text{the tilt stiffness of the fan shaft (36) at the output of the gearbox (30)}}$$

In various embodiments, the fan shaft tilt stiffness ratio may be greater than or equal to $2.5\times10^{-2}$, and optionally greater than or equal to 0.05.

In some embodiments, for example in embodiments in which the fan diameter is in the range from 240 to 280 cm, the fan shaft tilt stiffness ratio may be greater than or equal to 0.2 or greater than or equal to 0.5. In some embodiments, for example in embodiments in which the fan diameter is in the range from 330 to 380 cm, the fan shaft tilt stiffness ratio may be greater than or equal to 0.1 or greater than or equal to 0.2.

In various embodiments, the fan shaft tilt stiffness ratio may be in the range from $2.5\times10^{-2}$ to $3.7\times10^{2}$, and optionally in the range from 0.05 to $4.0\times10^{1}$.

In some embodiments, for example in embodiments in which the fan diameter is in the range from 240 to 280 cm, the fan shaft tilt stiffness ratio may be in the range from 0.2 to 5.0 and optionally in the range from 0.5 to 1.5 (and may be equal to 1.00).

In some embodiments, for example in embodiments in which the fan diameter is in the range from 330 to 380 cm, the fan shaft tilt stiffness ratio may be in the range from 0.1 to $1.0\times10^{1}$, and optionally in the range from 0.2 to 1.4 (and may be equal to 0.98).

In various embodiments, in addition to or alternatively to the fan shaft tilt stiffness ratio, a product of the parameters making up that ratio may be defined. This product (referred to as the fan shaft tilt stiffness product) may be defined as:

the tilt stiffness of the fan shaft (36) at the input to the fan (23)×the tilt stiffness of the fan shaft (36) at the output of the gearbox (30)

In various embodiments, the fan shaft tilt stiffness product may be greater than or equal to $3.5\times10^{10}$ (Nm/rad)$^2$, and optionally greater than or equal to $7.2\times10^{11}$ (Nm/rad)$^2$.

In some embodiments, for example in embodiments in which the fan diameter is in the range from 240 to 280 cm, the fan shaft tilt stiffness product may be greater than or equal to $7.2\times10^{11}$ (Nm/rad)$^2$. In some embodiments, for example in embodiments in which the fan diameter is in the range from 330 to 380 cm, the fan shaft tilt stiffness product may be greater than or equal to $3.5\times10^{11}$ (Nm/rad)$^2$.

In various embodiments, the fan shaft tilt stiffness product may be in the range from $3.5\times10^{10}$ (Nm/rad)$^2$ to $5.0\times10^{16}$ (Nm/rad)$^2$, and optionally in the range from $7.2\times10^{11}$ (Nm/rad)$^2$ to $5.0\times10^{15}$ (Nm/rad)$^2$.

In some embodiments, for example in embodiments in which the fan diameter is in the range from 240 to 280 cm, the fan shaft tilt stiffness product may be in the range from $7.2\times10^{11}$ (Nm/rad)$^2$ to $1.5\times10^{13}$ (Nm/rad)$^2$.

In some embodiments, for example in embodiments in which the fan diameter is in the range from 330 to 380 cm, the fan shaft tilt stiffness product may be in the range from $3.5\times10^{11}$ (Nm/rad)$^2$ to $5.0\times10^{16}$ (Nm/rad)$^2$.

In various embodiments, a first bearing separation ratio is defined as:

$$\frac{\text{the first bearing separation distance (d}_1\text{)}}{\text{the axial distance between the fan input position and the gearbox output position (d}_4\text{)}}$$

In various embodiments, the first bearing separation ratio may be greater than or equal to $1.6\times10^{-1}$, and optionally greater than or equal to $1.8\times10^{-1}$, greater than or equal to $1.6\times10^{-1}$ or greater than or equal to $2.2\times10^{-1}$.

In various embodiments, the first bearing separation ratio may be in the range from $1.6\times10^{-1}$ to $3.3\times10^{-1}$, and optionally in the range from $1.8\times10^{-1}$ to $3.0\times10^{-1}$, in the range from $1.6\times10^{-1}$ to $2.2\times10^{-1}$, or in the range from $2.2\times10^{-1}$ to $3.3\times10^{-1}$. The values in this and the previous paragraph may, for example, apply to embodiments in which the fan diameter is in the range from 240 to 280 cm or in the range from 330 cm to 380 cm.

In some embodiments, for example in embodiments in which the fan diameter is in the range from 240 to 280 cm or in the range from 330 cm to 380 cm, the bearing separation ratio may be in the range from $2.5\times10^{-1}$ to $2.9\times10^{-1}$ (and may be equal to $2.7\times10^{-1}$).

In various embodiments, in addition to or alternatively to the first bearing separation ratio, a product of the parameters making up that ratio may be defined. This product (referred to as the first bearing separation product) may be defined as:

the first bearing separation distance (d$_1$)×the axial distance between the fan input position and the gearbox output position (d$_4$)

In various embodiments, the first bearing separation product may be greater than or equal to $5.2\times10^{-2}$ m$^2$, and optionally greater than or equal to $5.7\times10^{-2}$ m$^2$, or optionally greater than or equal to $7.5\times10^{-2}$ In some embodiments, for example in embodiments in which the fan diameter is in the range from 240 to 280 cm, the first bearing separation product may be greater than or equal to $5.2\times10^{-2}$ m$^2$. In some embodiments, for example in embodiments in which the fan diameter is in the range from 330 to 380 cm, the first bearing separation product may be greater than or equal to $7.5\times10^{-2}$ m$^2$.

In various embodiments, the first bearing separation product may be in the range from $5.2\times10^{-2}$ m$^2$ to $2.6\times10^{-1}$ m$^2$, and optionally in the range from $5.7\times10^{-2}$ m$^2$ to $2.4\times10^{-1}$ m$^2$, and optionally in the range from $7.5\times10^{-2}$ m$^2$ to $2.6\times10^{-1}$ m$^2$ In some embodiments, for example in embodiments in which the fan diameter is in the range from 240 to 280 cm, the first bearing separation product may be in the range from $5.2\times10^{-2}$ m$^2$ to $1.4\times10^{-1}$ m$^2$.

In some embodiments, for example in embodiments in which the fan diameter is in the range from 330 to 380 cm, the first bearing separation product may be in the range from $7.5\times10^{-2}$ m$^2$ to $2.6\times10^{-1}$ m$^2$.

For embodiments in which there is at least a first and second supporting bearing forward of the gearbox (and rearward of the fan input position) a second bearing separation ratio is defined as:

$$\frac{\text{the first bearing separation distance (d}_1\text{)}}{\text{the bearing axial separation (d}_3\text{)}}$$

In various embodiments, the second bearing separation ratio may be greater than or equal to $4.1\times10^{-1}$, and optionally greater than or equal to $4.5\times10^{-1}$, and further optionally greater than or equal to $6.0\times10^{-1}$.

In various embodiments, the second bearing separation ratio may be in the range from $4.1\times10^{-1}$ to $8.3\times10^{-1}$, and optionally in the range from $4.5\times10^{-1}$ to $7.7\times10^{-1}$, or in the range from $4.1\times10^{-1}$ to $6.0\times10^{-1}$, or in the range $6.0\times10^{-1}$ to $8.3\times10^{-1}$. The values in this and the previous paragraph may, for example, apply to embodiments in which the fan diameter is in the range from 240 to 280 cm or in the range from 330 cm to 380 cm.

In some embodiments, for example in embodiments in which the fan diameter is in the range from 240 to 280 cm or in the range from 330 cm to 380 cm, or in other various embodiments, the second bearing separation ratio may be in the range from $6.4\times10^{-1}$ to $7.0\times10^{-1}$ (and may be equal to $6.7\times10^{-1}$).

In various embodiments, in addition to or alternatively to the second bearing separation ratio, a product of the parameters making up that ratio may be defined. This product (referred to as the second bearing separation product) may be defined as:

the first bearing separation distance (d$_1$)×the bearing axial separation (d$_3$)

In various embodiments, the second bearing separation product may be greater than or equal to $2.0\times10^{-2}$ m$^2$, and optionally greater than or equal to $2.3\times10^{-2}$ m$^2$ and further optionally greater than or equal to $3.5\times10^{-2}$ m$^2$.

In some embodiments, for example in embodiments in which the fan diameter is in the range from 240 to 280 cm, the second bearing separation product may be greater than or equal to $2.0\times10^{-2}$ m$^2$. In some embodiments, for example in embodiments in which the fan diameter is in the range from 330 to 380 cm, the second bearing separation product may be greater than or equal to $3.5\times10^{-2}$ m$^2$.

In various embodiments, the second bearing separation product may be in the range from $2.0\times10^{-2}$ m$^2$ to $1.1\times10^{-1}$ m², and optionally in the range from $2.3 \times 10^{-2}$ m² to $8.5 \times 10^{-2}$ m², or may be in the range from $3.5 \times 10^{-2}$ m² to $1.1 \times 10^{-1}$ m².

In some embodiments, for example in embodiments in which the fan diameter is in the range from 240 to 280 cm, the second bearing separation product may be in the range from $2.0 \times 10^{-2}$ m² to $5.6 \times 10^{-2}$ m².

In some embodiments, for example in embodiments in which the fan diameter is in the range from 330 to 380 cm, the second bearing separation product may be in the range from $3.5 \times 10^{-2}$ m² to $1.1 \times 10^{-1}$ m².

In various embodiments, a first planet carrier stiffness ratio may be defined as:

$$\frac{\text{the effective linear torsional stiffness of the planet carrier (34)}}{\text{radial bending stiffness of the fan shaft mounting structure (503)}}$$

In various embodiments, the first planet carrier stiffness ratio may be greater than or equal to $7.0 \times 10^{-3}$, and optionally greater than or equal to $7.0 \times 10^{-2}$.

In some embodiments, for example in embodiments in which the fan diameter is in the range from 240 to 280 cm, the first planet carrier stiffness ratio may be greater than or equal to 6.9 or may be greater than or equal to 7.0 or 4.0. In some embodiments, for example in embodiments in which the fan diameter is in the range from 330 to 380 cm, the first planet carrier stiffness ratio may be greater than or equal to 7.0 or greater than or equal to $1.0 \times 10^1$ or 5.0

In various embodiments, the first planet carrier stiffness ratio may be in the range from $7.0 \times 10^{-3}$ to $1.9 \times 10^3$, and optionally in the range from $7.0 \times 10^{-2}$ to $9.0 \times 10^1$.

In some embodiments, for example in embodiments in which the fan diameter is in the range from 240 to 280 cm, the first planet carrier stiffness ratio may be in the range from 6.9 to $1.2 \times 10^2$ and optionally in the range from 7.0 to 11.0 (and may be equal to 8.5). In some embodiments, for example in embodiments in which the fan diameter is in the range from 240 to 280 cm, the first planet carrier stiffness ratio may be in the range from in the range from 4.0 to 6.0 (and may be equal to 5.2)

In some embodiments, for example in embodiments in which the fan diameter is in the range from 330 to 380 cm, the first planet carrier stiffness ratio may be in the range from 7.0 to $1.9 \times 10^3$ and optionally in the range from $1.0 \times 10^1$ to $2.0 \times 10^1$ (and may be equal to $1.33 \times 10^1$). In some embodiments, for example in embodiments in which the fan diameter is in the range from 330 to 380 cm, the first planet carrier stiffness ratio may be in the range from 5.0 to 9.0 (and may be equal to 7.1).

In various embodiments, a first planet carrier stiffness product may be defined as:

$$\text{(the effective linear torsional stiffness of the planet carrier (34))} \times \text{(radial bending stiffness of the fan shaft mounting structure (503))}$$

In various embodiments, the first planet carrier stiffness product may be greater than or equal to $2.9 \times 10^{18}$ (N/m)², and optionally greater than or equal to $5.0 \times 10^{18}$ (N/m)².

In some embodiments, for example in embodiments in which the fan diameter is in the range from 240 to 280 cm, the first planet carrier stiffness product may be greater than or equal to $8.0 \times 10^{18}$ (N/m)² or greater than or equal to $9.0 \times 10^{18}$ (N/m)². In some embodiments, for example in embodiments in which the fan diameter is in the range from 330 to 380 cm, the first planet carrier stiffness product may be greater than or equal to $1.0 \times 10^{19}$ (N/m)² or $2.0 \times 10^{19}$ (N/m)² or $5.0 \times 10^{19}$ (N/m)².

In various embodiments, the first planet carrier stiffness product may be in the range from $2.9 \times 10^{18}$ (N/m)² to $8.0 \times 10^{22}$ (N/m)², and optionally in the range from $5.0 \times 10^{18}$ (N/m)² to $8.0 \times 10^{21}$ (N/m)².

In some embodiments, for example in embodiments in which the fan diameter is in the range from 240 to 280 cm, the first planet carrier stiffness product may be in the range from $8.0 \times 10^{18}$ (N/m)² to $8.0 \times 10^{21}$ (N/m)² and optionally in the range from $9.0 \times 10^{18}$ (N/m)² to $3.0 \times 10^{19}$ (N/m)² (and may be equal to $1.1 \times 10^{19}$ (N/m)² or may be equal to $1.9 \times 10^{19}$ (N/m)²).

In some embodiments, for example in embodiments in which the fan diameter is in the range from 330 to 380 cm, the first planet carrier stiffness product may be in the range from $1.0 \times 10^{19}$ (N/m)² to $8.0 \times 10^{22}$ (N/m)² and optionally in the range from $2.0 \times 10^{19}$ (N/m)² to $4.0 \times 10^{19}$ (N/m)² (and may be equal to $3.3 \times 10^{19}$ (N/m)²), or optionally in the range from $5.0 \times 10^{19}$ (N/m)² to $8.0 \times 10^{19}$ (N/m²) (and may be equal to $6.2 \times 10^{19}$ (N/m)²).

In various embodiments, a second planet carrier stiffness ratio may be defined as:

$$\frac{\text{the torsional stiffness of the planet carrier (34)}}{\text{tilt stiffness of the fan shaft mounting structure (503)}}$$

In various embodiments, the second planet carrier stiffness ratio may be greater than or equal to $6.0 \times 10^{-3}$, and optionally greater than or equal to $6.0 \times 10^{-2}$.

In some embodiments, for example in embodiments in which the fan diameter is in the range from 240 to 280 cm, the second planet carrier stiffness ratio may be greater than or equal to $1.36 \times 10^1$ or 7.9. In some embodiments, for example in embodiments in which the fan diameter is in the range from 330 to 380 cm, the second planet carrier stiffness ratio may be greater than or equal to $1.5 \times 10^1$ or greater than or equal to $1.7 \times 10^1$ or $0.4 \times 10^1$.

In various embodiments, the second planet carrier stiffness ratio may be in the range from $6.0 \times 10^{-3}$ to $7.0 \times 10^3$, and optionally in the range from $6.0 \times 10^{-2}$ to $7.0 \times 10^2$.

In some embodiments, for example in embodiments in which the fan diameter is in the range from 240 to 280 cm, the second planet carrier stiffness ratio may be in the range from $1.36 \times 10^1$ to $7.0 \times 10^2$ and optionally in the range from $1.36 \times 10^1$ to $2.4 \times 10^1$ (and may be equal to $1.4 \times 10^1$). In some embodiments, for example in embodiments in which the fan diameter is in the range from 240 to 280 cm, the second planet carrier stiffness ratio may be in the range from 7.9 to 9.9 (and may be equal to 8.9)

In some embodiments, for example in embodiments in which the fan diameter is in the range from 330 to 380 cm, the second planet carrier stiffness ratio may be in the range from $1.5 \times 10^1$ to $7.0 \times 10^3$ and optionally in the range from $1.7 \times 10^1$ to $3.7 \times 10^1$ (and may be equal to $2.7 \times 10^1$). In some embodiments, for example in embodiments in which the fan diameter is in the range from 330 to 380 cm, the second planet carrier stiffness ratio may in the range from $0.4 \times 10^1$ to $2.4 \times 10^1$ (and may be equal to $1.4 \times 10^1$).

In various embodiments, a second planet carrier stiffness product may be defined as:

$$\text{(the torsional stiffness of the planet carrier (34))} \times \text{(tilt stiffness of the fan shaft mounting structure (503))}$$

In various embodiments, the second planet carrier stiffness product may be greater than or equal to $2.4 \times 10^{15}$ (Nm/rad)$^2$, and optionally greater than or equal to $4.9 \times 10^{15}$ (Nm/rad)$^2$.

In some embodiments, for example in embodiments in which the fan diameter is in the range from 240 to 280 cm, the second planet carrier stiffness product may be greater than or equal to $4.9 \times 10^{15}$ (Nm/rad)$^2$ or $7.9 \times 10^{15}$ (Nm/rad)$^2$ or $1.0 \times 10^{16}$ (Nm/rad)$^2$. In some embodiments, for example in embodiments in which the fan diameter is in the range from 330 to 380 cm, the second planet carrier stiffness product may be greater than or equal to $9.0 \times 10^{15}$ (Nm/rad)$^2$ or $7.4 \times 10^{16}$ (Nm/rad)$^2$ or $1.0 \times 10^{17}$ (Nm/rad)$^2$.

In various embodiments, the second planet carrier stiffness product may be in the range from $2.4 \times 10^{15}$ (Nm/rad)$^2$ to $2.7 \times 10^{21}$ (Nm/rad)$^2$, and optionally in the range from $4.9 \times 10^{15}$ (Nm/rad)$^2$ to $2.0 \times 10^{20}$ (Nm/rad)$^2$.

In some embodiments, for example in embodiments in which the fan diameter is in the range from 240 to 280 cm, the second planet carrier stiffness product may be in the range from $4.9 \times 10^{15}$ (Nm/rad)$^2$ to $9.0 \times 10^{19}$ (Nm/rad)$^2$ and optionally in the range from $7.9 \times 10^{15}$ (Nm/rad)$^2$ to $1.2 \times 10^{16}$ (Nm/rad)$^2$ (and may be equal to $9.9 \times 10^{15}$ (Nm/rad)$^2$), or optionally in the range from $1.0 \times 10^{16}$ (Nm/rad)$^2$ to $1.2 \times 10^{16}$ (Nm/rad)$^2$ (and may be equal to $1.6 \times 10^{16}$ (Nm/rad)$^2$).

In some embodiments, for example in embodiments in which the fan diameter is in the range from 330 to 380 cm, the second planet carrier stiffness product may be in the range from $9.0 \times 10^{15}$ (Nm/rad)$^2$ to $2.7 \times 10^{21}$ (Nm/rad)$^2$ and optionally in the range from $7.4 \times 10^{16}$ (Nm/rad)$^2$ to $1.1 \times 10^{17}$ (Nm/rad)$^2$ (and may be equal to $9.4 \times 10^{16}$ (Nm/rad)$^2$), or optionally in the range from $1.0 \times 10^{17}$ (Nm/rad)$^2$ to $2.6 \times 10^{17}$ (Nm/rad)$^2$ (and may be equal to $1.8 \times 10^{17}$ (Nm/rad)$^2$).

Figure 32:
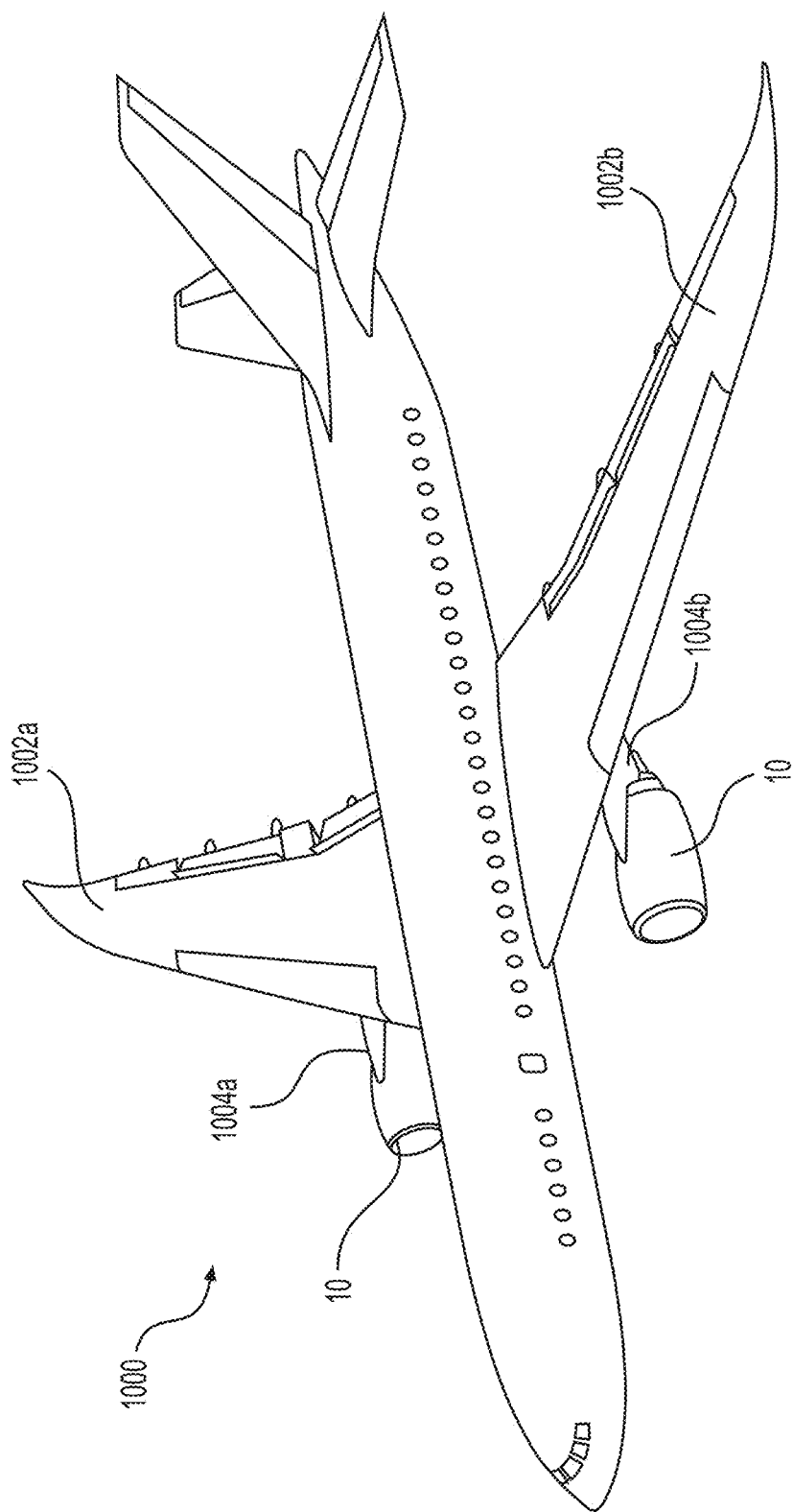
FIG. 32 shows an aircraft having a gas turbine engine attached to each wing.

FIG. 32 illustrates an example aircraft 1000 having a gas turbine engine 10 attached to each wing 1002a, 1002b thereof. Each gas turbine engine 10 is attached via a respective pylon 1004a, 1004b. The gas turbines 10 may be that of any embodiment described herein. The aircraft shown in FIG. 32 is to be understood as the aircraft for which the gas turbine engine 10 of any embodiment or aspect disclosed herein has been designed to be attached. The aircraft 1000 has a cruise condition corresponding to the cruise conditions defined elsewhere herein and a max take-off condition corresponding to the MTO conditions defined elsewhere herein.

Figure 33:
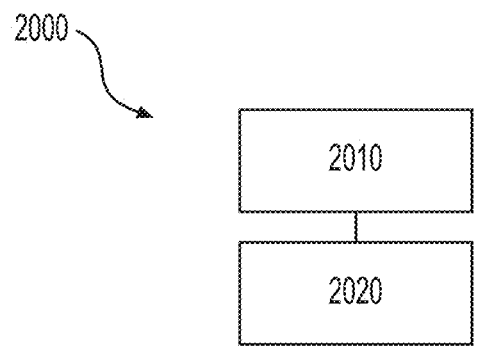
FIG. 33 shows a method of operating a gas turbine engine on an aircraft.

The present disclosure also relates to a method 2000 of operating a gas turbine engine on an aircraft (e.g. the aircraft of FIG. 32). The method 2000 is illustrated in FIG. 33. The method 2000 comprises operating 2010 the gas turbine engine 10 described elsewhere herein to provide propulsion for the aircraft to which it is mounted under maximum take-off conditions. The method further comprises operating 2020 the gas turbine engine to provide propulsion during cruise conditions. The gas turbine engine is operated such that any of the parameters or ratios defined herein are within the specified ranges. Cruise conditions and max-take off conditions are as defined elsewhere herein.

The torque on the core shaft 26 may be referred to as the input torque, as this is the torque which is input to the gearbox 30. The torque supplied by the turbine 19 to the core shaft (i.e. the torque on the core shaft) at cruise conditions may be greater than or equal to 10,000 Nm, and optionally greater than or equal to 11,000 Nm. In some embodiments, for example in embodiments in which the fan diameter is in the range from 240 to 280 cm, the torque on the core shaft 26 at cruise conditions may be greater than or equal to 10,000 or 11,000 Nm (and optionally may be equal to 12,760 Nm). In some embodiments, for example in embodiments in which the fan diameter is in the range from 330 to 380 cm, the torque on the core shaft 26 at cruise conditions may be greater than or equal to 25,000 Nm, and optionally greater than or equal to 30,000 Nm (and optionally may be equal to 34,000 Nm).

The torque on the core shaft at cruise conditions may be in the range from 10,000 to 50,000 Nm, and optionally from 11,000 to 45,000 Nm. In some embodiments, for example in embodiments in which the fan diameter is in the range from 240 to 280 cm, the torque on the core shaft 26 at cruise conditions may be in the range from 10,000 to 15,000 Nm, and optionally from 11,000 to 14,000 Nm (and optionally may be equal to 12,760 Nm). In some embodiments, for example in embodiments in which the fan diameter is in the range from 330 to 380 cm, the torque on the core shaft 26 at cruise conditions may be in the range from 25,000 Nm to 50,000 Nm, and optionally from 30,000 to 40,000 Nm (and optionally may be equal to 34,000 Nm).

Under maximum take-off (MTO) conditions, the torque on the core shaft 26 may be greater than or equal to 28,000 Nm, and optionally greater than or equal to 30,000 Nm. In some embodiments, for example in embodiments in which the fan diameter is in the range from 240 to 280 cm, the torque on the core shaft 26 under MTO conditions may be greater than or equal to 28,000, and optionally greater than or equal to 35,000 Nm (and optionally may be equal to 36,300 Nm). In some embodiments, for example in embodiments in which the fan diameter is in the range from 330 to 380 cm, the torque on the core shaft 26 under MTO conditions may greater than or equal to 70,000 Nm, and optionally greater than or equal to 80,000 or 82,000 Nm (and optionally may be equal to 87,000 Nm).

Under maximum take-off (MTO) conditions, the torque on the core shaft 26 may be in the range from 28,000 Nm to 135,000 Nm, and optionally in the range from 30,000 to 110,000 Nm. In some embodiments, for example in embodiments in which the fan diameter is in the range from 240 to 280 cm, the torque on the core shaft 26 under MTO conditions may be in the range from 28,000 to 50,000 Nm, and optionally from 35,000 to 38,000 Nm (and optionally may be equal to 36,300 Nm). In some embodiments, for example in embodiments in which the fan diameter is in the range from 330 to 380 cm, the torque on the core shaft 26 under MTO conditions may be in the range from 70,000 Nm to 135,000 Nm, and optionally from 80,000 to 90,000 Nm or 82,000 to 92,000 Nm (and optionally may be equal to 87,000 Nm).

Torque has units of [force]×[distance] and may be expressed in units of Newton metres (N·m), and is defined in the usual way as would be understood by the skilled person.

Figure 34:
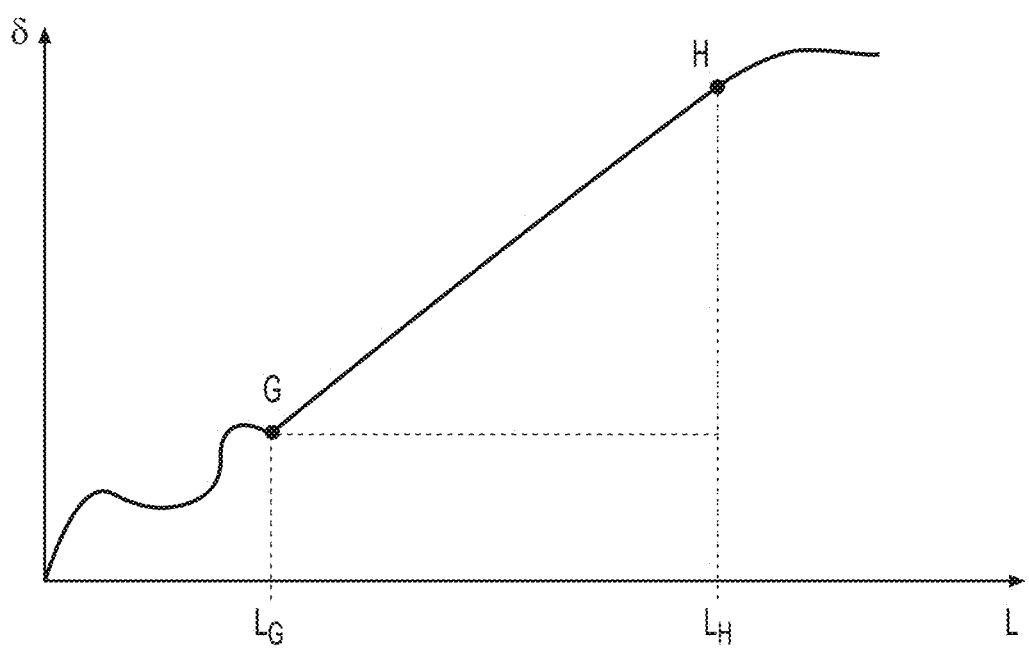
FIG. 34 shows a graph of applied load against displacement to illustrate measurement of the stiffness of a component.

FIG. 34 illustrates how the stiffnesses defined herein may be measured. FIG. 34 shows a plot of the displacement δ resulting from the application of a load L (e.g. a force, moment or torque) applied to a component for which the stiffness is being measured. At levels of load from zero to LG there is a non-linear region in which displacement is caused by motion of the component (or relative motion of separate parts of the component) as it is loaded, rather than deformation of the component; for example moving within clearance between parts. At levels of load above $L_H$ the elastic limit of the component has been exceeded and the applied load no longer causes elastic deformation-plastic deformation or failure of the component may occur instead. Between points G and H the applied load and resulting displacement have a linear relationship. The stiffnesses defined herein may be determined by measuring the gradient of the linear region between points G and H (with the stiffness being the inverse of that gradient). The gradient may be found for as large a region of the linear region as possible to increase the accuracy of the measurement by providing a larger displacement to measure. For example, the gradient may be found by applying a load equal to or just greater than LG and equal to or just less than $L_H$. Although the displacement is referred to as 8 in this description, the skilled person would appreciate that equivalent principles would apply to a linear or angular displacement.

The stiffnesses defined herein, unless otherwise stated, are for the corresponding component(s) when the engine is off (i.e. at zero speed/on the bench) The stiffnesses generally do not vary over the operating range of the engine; the stiffness at cruise conditions of the aircraft to which the engine is used (those cruise conditions being as defined elsewhere herein) may therefore be the same as for when the engine is not in use. However, where the stiffness varies over the operating range of the engine, the stiffnesses defined herein are to be understood as being values for when the engine is at room temperature and unmoving.

Anything described herein with reference to a planetary type gearbox can apply equally to a star type gearbox unless otherwise stated or where it is apparent that a feature is specific to a particular gearbox type.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine, a compressor, and a core shaft connecting the turbine to the compressor;
a fan located upstream of the engine core, the fan comprising a plurality of fan blades;
a gearbox that is configured to:
receive an input from the core shaft, and
output drive to a fan shaft via an output of the gearbox so as to drive the fan at a lower rotational speed than the core shaft; wherein a product of: (a radial bending stiffness of the fan shaft at the input to the fan)×(a radial bending stiffness of the fan shaft at the output of the gearbox)

is greater than or equal to $1.2 \times 10^{13}$ $(N/m)^2$.

2. The gas turbine engine according to claim 1, wherein the product of:

(the radial bending stiffness of the fan shaft at the input to the fan)×(the radial bending stiffness of the fan shaft at the output of the gearbox)

is greater than or equal to $2.4 \times 10^{14}$ $(N/m)^2$.

3. The gas turbine engine according to claim 1, wherein the product of:

(the radial bending stiffness of the fan shaft at the input to the fan)×(the radial bending stiffness of the fan shaft at the output of the gearbox)

is less than or equal to $3.0 \times 10^{18}$ $(N/m)^2$.

4. The gas turbine engine according to claim 1, wherein the product of:

(the radial bending stiffness of the fan shaft at the input to the fan)×(the radial bending stiffness of the fan shaft at the output of the gearbox)

is less than or equal to $3.0 \times 10^{17}$ $(N/m)^2$.

5. The gas turbine engine according to claim 1, wherein the gearbox has a gear ratio of greater than 3.6.

6. The gas turbine engine according to claim 1, wherein the gearbox has a gear ratio in a range of 3.7 and 4.4.

7. The gas turbine engine according to claim 1, further comprising a bypass duct radially outside the engine core,
wherein a bypass ratio, which is defined as the ratio of a mass flow rate of the flow through the bypass duct to a mass flow rate of the flow through the engine core, is in a range of 13 to 17 at cruise conditions.

8. The gas turbine engine according to claim 1, wherein at least one of the following is satisfied:
the moment of inertia of the fan is in a range from $7.40 \times 10^7$ $kgm^2$ to $9.00 \times 10^8$ $kgm^2$;
the fan comprises 18 or 20 fan blades;
each fan blade comprises a carbon-fibre or aluminium based body with a titanium leading edge; and
the material from which the fan shaft is made has a Young's modulus in a range from 105 to 215 GPa.

9. The gas turbine engine according to claim 1, further comprising a bypass duct radially outside the engine core, wherein:
the gearbox has a gear ratio in a range of 3.6 and 4.4;
a bypass ratio, which is defined as the ratio of a mass flow rate of the flow through the bypass duct to a mass flow rate of the flow through the engine core, is in a range of 13 to 16 at cruise conditions;
a fan tip loading defined as $dH/U_{tip}^2$, where dH is an enthalpy rise across the fan and $U_{tip}$ is a translational velocity of the fan tip, is in a range from 0.29 to 0.35 at cruise conditions; and
an overall pressure ratio defined as the ratio of a stagnation pressure upstream of the fan to a stagnation pressure at the exit of a highest pressure compressor section of the compressor is in a range of 45 to 60 at cruise conditions.

10. The gas turbine engine according to claim 9, wherein at least one of the following is satisfied:
the fan has a diameter in a range of 220 cm to 230 cm;
a maximum net thrust of the gas turbine engine at standard atmospheric conditions at sea level plus 15 degrees C. with the engine static is no greater than 170 kN; and
a specific thrust of the gas turbine engine, defined as a net thrust of the engine divided by a total mass flow through the engine, is in a range from 80 $Nkg^{-1}s$ to 90 $Nkg^{-1}s$ at cruise conditions.

11. The gas turbine engine according to claim 1, wherein at least one of the following is satisfied: the radial bending stiffness of the fan shaft at the input to the fan is in a range from $3.00 \times 10^6$ N/m to $2.00 \times 10^9$ N/m; and the radial bending stiffness of the fan shaft at the output of the gearbox is in a range from $4.00 \times 10^6$ N/m to $1.5 \times 10^9$ N/m.

12. The gas turbine engine according to claim 1, wherein a product of: (a tilt stiffness of the fan shaft at the input to the fan)×(a tilt stiffness of the fan shaft at the output of the gearbox) is greater than or equal to $3.5 \times 10^{10}$ $(Nm/rad)^2$.

13. The gas turbine engine according to claim 1, further comprising a fan shaft mounting structure arranged to mount the fan shaft within the engine, the fan shaft mounting structure comprising at least two supporting bearings connected to the fan shaft, wherein at least one of the following is satisfied:

an axial distance between an input to the fan and a closest bearing of the at least two supporting bearings in a rearward direction from the fan is in a range from 0.12 m to 0.40 m; and an axial distance between a fan input position and a gearbox output position is in a range from 0.43 m to 0.95 m.

14. A gas turbine engine for an aircraft comprising:

an engine core comprising a turbine, a compressor, and a core shaft connecting the turbine to the compressor;

a fan located upstream of the engine core, the fan comprising a plurality of fan blades;

a gearbox that is configured to:
receive an input from the core shaft, and
output drive to a fan shaft via an output of the gearbox so as to drive the fan at a lower rotational speed than the core shaft; wherein a product of:

(a tilt stiffness of the fan shaft at the input to the fan)×(a tilt stiffness of the fan shaft at the output of the gearbox)

is greater than or equal to $3.5 \times 10^{10}$ $(Nm/rad)^2$.

15. The gas turbine engine according to claim 14, wherein the product of:

(the tilt stiffness of the fan shaft at the input to the fan)×(the tilt stiffness of the fan shaft at the output of the gearbox)

is less than or equal to $5.0 \times 10^{16}$ $(Nm/rad)^2$.

16. The gas turbine engine according to claim 14, wherein the gearbox has a gear ratio in a range of 3.6 and 4.4.

17. The gas turbine engine according to claim 14, further comprising a bypass duct radially outside the engine core, wherein a bypass ratio, which is defined as the ratio of a mass flow rate of the flow through the bypass duct to a mass flow rate of the flow through the engine core, is in a range 13 to 16 at cruise conditions.

18. The gas turbine engine according to claim 14, wherein at least one of the following is satisfied:

the tilt stiffness of the fan shaft at the input to the fan is in a range from $5.00 \times 10^5$ Nm/rad to $7.00 \times 10^8$ Nm/rad; and the tilt stiffness of the fan shaft at the output of the gearbox is in a range from $7.00 \times 10^4$ Nm/rad to $7.00 \times 10^7$ Nm/rad.

19. The gas turbine engine according to claim 14, wherein:

the fan comprises 16, 18, 20 or 22 fan blades;

each fan blade comprises a carbon-fibre or aluminium based body with a titanium leading edge;

the material from which the fan shaft is made has a Young's modulus in a range from 105 to 215 GPa;

the ratio of the radius of a fan blade at its hub to the radius of the fan blade at its tip is in a range from 0.25 to 0.31;

the gas turbine engine comprises a bypass duct radially outside the engine core and a bypass ratio is defined as the ratio of a mass flow rate of the flow through the bypass duct to a mass flow rate of the flow through the engine core is in a range of 13 to 16 at cruise conditions;

the gearbox has a gear ratio in a range of 3.6 and 4.4;

a specific thrust of the gas turbine engine, defined as a net thrust of the engine divided by a total mass flow through the engine, is in a range from 80 $Nkg^{-1}s$ to 90 $Nkg^{-1}s$ at cruise conditions;

an overall pressure ratio defined as a ratio of the stagnation pressure upstream of the fan to a stagnation pressure at the exit of a highest pressure compressor section of the compressor is in a range of 45 to 60 at cruise conditions; and a temperature of a flow at an exit to a combustor of the gas turbine engine is greater than 1600K at cruise conditions.

20. The gas turbine engine according to claim 19, further comprising a fan shaft mounting structure arranged to mount the fan shaft within the engine, the fan shaft mounting structure comprising at least two supporting bearings connected to the fan shaft, wherein:

an axial distance between an input to the fan and a closest bearing of the at least two supporting bearings in a rearward direction from the fan is in a range from 0.12 m to 0.40 m; and an axial distance between a fan input position and a gearbox output position is in a range from 0.43 m to 0.95 m.

* * * * *